United States Patent [19]

JongeVos

[11] Patent Number: 4,672,532
[45] Date of Patent: Jun. 9, 1987

[54] SOFTWARE/HARDWARE INTEGRATION CONTROL SYSTEM

[75] Inventor: Hendrik JongeVos, Tigard, Oreg.

[73] Assignee: Tektronix, Inc., Beaverton, Oreg.

[21] Appl. No.: 817,770

[22] Filed: Jan. 9, 1986

Related U.S. Application Data

[63] Continuation of Ser. No. 387,729, Jun. 14, 1982, abandoned.

[51] Int. Cl.⁴ .............................................. G06F 15/20
[52] U.S. Cl. ...................................... 364/200; 364/300
[58] Field of Search ... 364/200 MS File, 900 MS File, 364/300 MS File

[56] References Cited

U.S. PATENT DOCUMENTS

| | | | |
|---|---|---|---|
| 4,156,926 | 5/1979 | Hartman | 364/900 |
| 4,204,253 | 5/1980 | Hanenberg et al. | 364/200 |
| 4,244,032 | 1/1981 | Oliver | 364/900 |
| 4,277,827 | 7/1981 | Carlson | 364/200 |
| 4,315,315 | 2/1982 | Kossiakoff | 364/300 |
| 4,441,164 | 4/1984 | Pavan et al. | 364/200 |
| 4,450,525 | 5/1984 | Demuth | 364/200 |
| 4,455,619 | 6/1984 | Masui et al. | 364/900 |

*Primary Examiner*—David Y. Eng
*Attorney, Agent, or Firm*—Allston L. Jones; Robert S. Hulse

[57] ABSTRACT

A method and control system for integrating machine independent software written in a high level language with the hardware and software characteristics of a selected processor system to generate an executable load module in the same high level language with selected machine codes merged therewith to be run on the selected processor system. The method and system includes the interactive preparation of a source file containing software, hardware and interrupt configuration specifications of the selected processor system in response to designer inputs. Also included is the processing of the source file to generate a linker command file and a configuration object file. Additionally, the machine independent software is linked with the configuration object file under control of the linker command file to generate the executable load module for the selected processor system.

10 Claims, 2 Drawing Figures

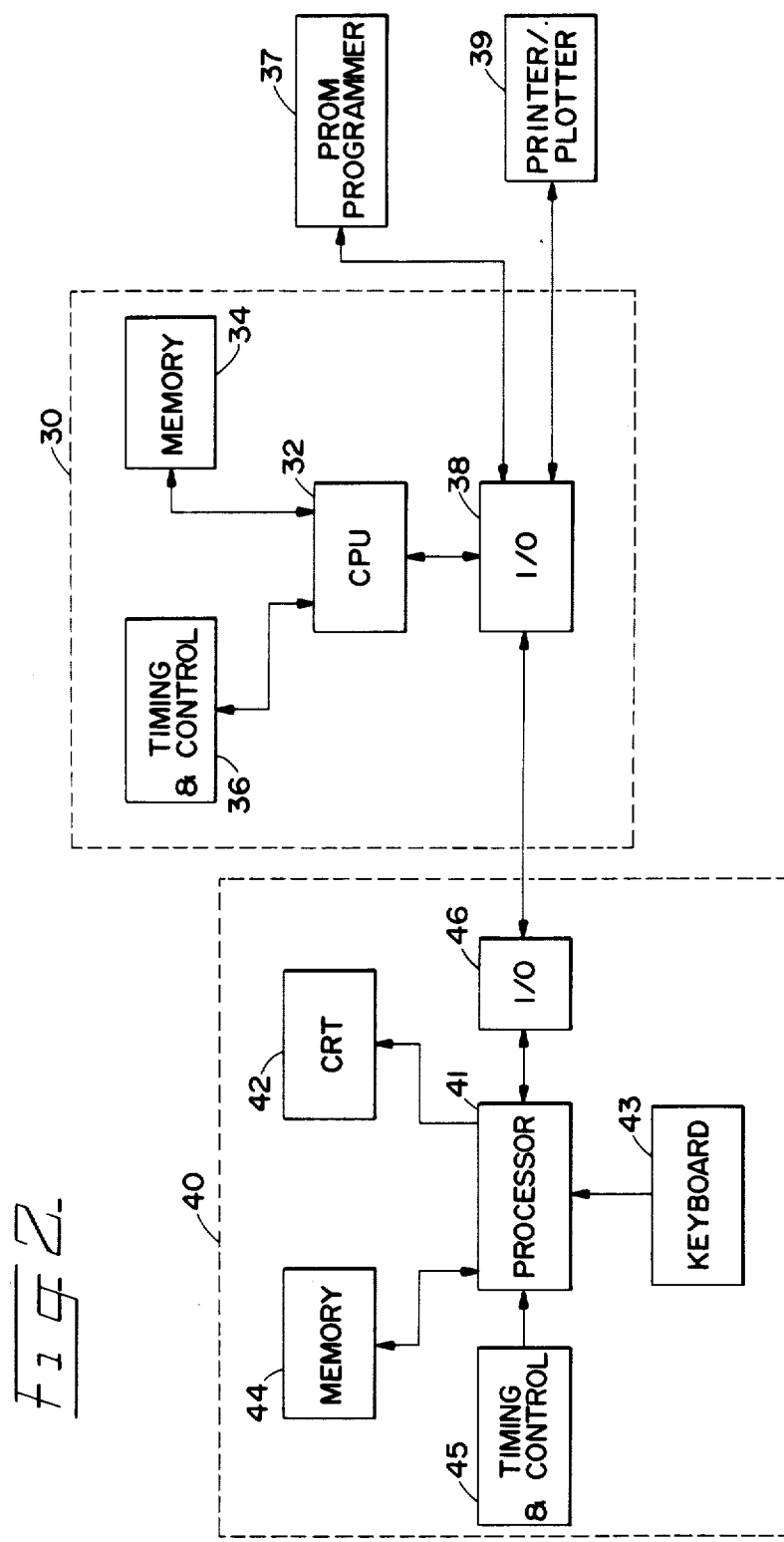

SOFTWARE/HARDWARE INTEGRATION CONTROL SYSTEM

This is a continuation of application Ser. No. 387,729, filed June 14, 1982 and now abandoned.

BACKGROUND OF THE INVENTION

This invention relates to the interfacing of software to hardware, more specifically to a system for translating hardware/software interface specifications simultaneously into specific microprocessor executable code and commands for the linker/loading system of a selected hardware configuration.

Computer based instruments are in fact systems of mechanical and electronic components interacting with the computer program stored in those hardware components. The task of correctly interfacing hardware and software has always been a rather intricate one and very time consuming. The system of the present invention allows the instrument designer to specify the hardware/software interface in a high order language in an interactive way. That system then translates those specifications into code executable by the instrument computer as well as other commands to be executed by the program linking/loading systems. It thus reduces to minutes a development process that might otherwise take up to several days or even weeks.

When a high order language, such as Pascal is used the program is machine independent by virtue of the nature of the language. Pascal source programs do not vary, regardless of the process or host computer on which it is to be used. However, with conventional Pascal, there's no direct way to specify implementation-dependent requirements such as interrupt vectors, restart routines, or memory configuration.

You could develop a large assembly language routine (to connect your Pascal program with the prototype hardware) and a linker command file (to specify your memory configuration). To do this, you would need detailed knowledge of the assembler, the linker, and the Pascal interface requirements. The task is time-consuming, and with so many low-level details to keep track of, errors are inevitable. There are no known prior art systems for generating the linker commands and the configuration object files automatically.

It would be desirable to have a system which provides you with a list of the items you need to specify in order to configure a program to a prototype—everything from the name of your compiled object program to the address where the program begins execution. Then, based on your responses, generates the configuration object file and linker commands needed to configure your prototype.

If such a system used high-level language directives, you could describe your prototype more quickly and with fewer errors. And the system could also check the validity of your statements, thus saving you from errors that would not be caught until later. It is believed that the present invention embodies such a system.

SUMMARY OF THE INVENTION

In accordance with the illustrated embodiment, the disclosed integration control system (ICS) relieves the computer based instrument designer from having to design and debug hundreds to thousands of lines of computer level code as well as having to familiarize himself with increasingly complex linker/loading systems requiring dozens of specific commands in a special linker command language.

The present invention provides a method and a system for integrating a high level language program together with the hardware limitations of a selected prototype processor. This is accomplished automatically by interacting with the designer to prepare a source file which includes software, hardware and interrupt configuration specifications for a selected prototype processor. It also includes processing of the source file generated above to generate a linker command file and a configuration object file.

The linker command file controls the linking process of the high level language program with the configuration object file to generate a load module executable by the prototype processor. During linking selected routines from the run-time library for the particular high level language may also be included as necessary.

The interaction with the designer includes the prompting of the designer for necessary inputs as to software and prototype processor hardware and interrupt specifications, then, in response to those inputs a source file is created.

The configuration object file referred to above includes interrupt vectors, interrupt service routines, a reset routine and a program initialization routine for the prototype processor.

BRIEF DESCRIPTION OF THE DRAWINGS

FIG. 2 is a simplified block diagram of a terminal interconnected with a host computer representing the embodiment of the present invention.

DESCRIPTION OF THE PREFERRED EMBODIMENT

Figure 1:
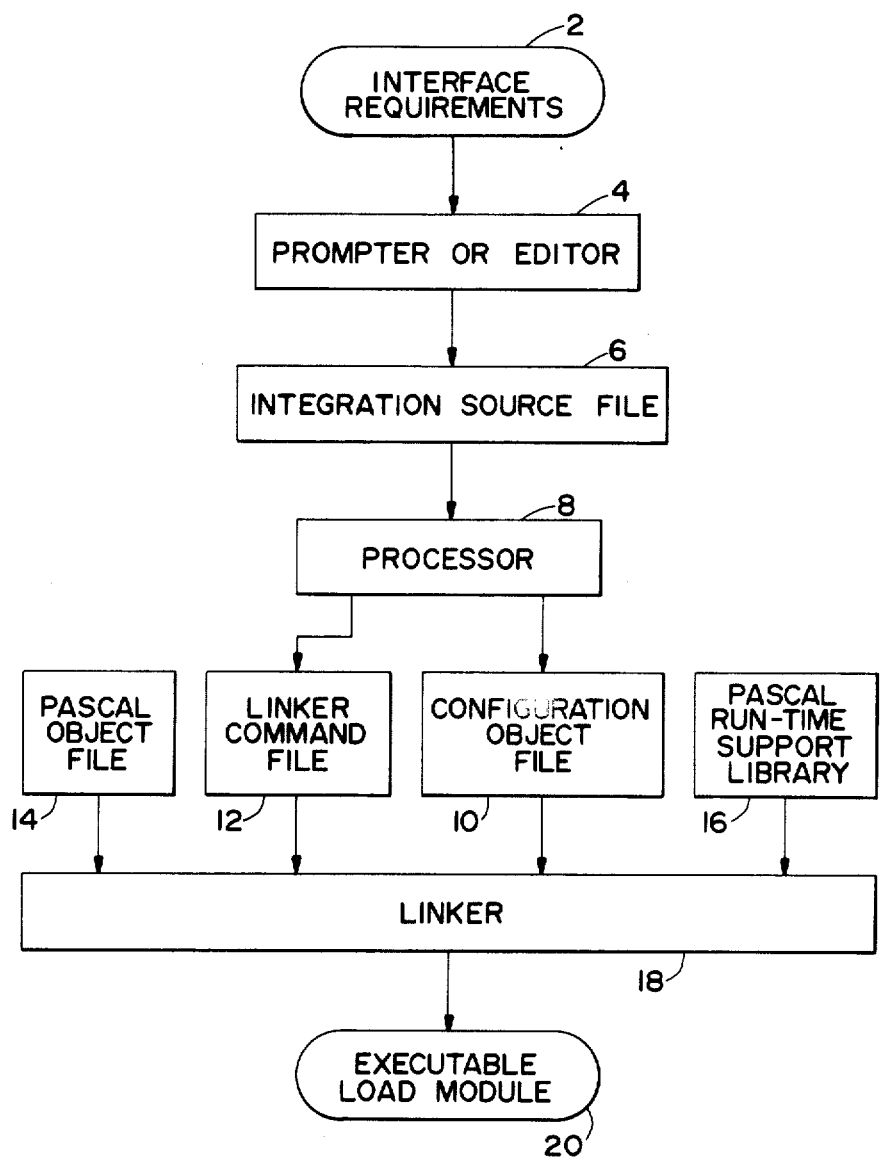
FIG. 1 shows a flow diagram of the integration control system present invention.

When a high order language, such as Pascal, is utilized to generate a machine independent program the code produced by the compiler cannot be executed directly. The proper codes in the run-time library must be linked with the compiled code. Depending on the hardware and the software needs of the prototype processor system, the prototype processor system must be initialized for the program. The linker must be told where to store the generated code in the memory of the prototype processor system.

The software/hardware integration control system of the present invention functions generally as shown in the flow chart of FIG. 1. Block 2 represents the designer's interactive specifications of the hardware, software and interrupt configurations of the prototype in response to prompts from the prompter of block 4. Those specifications are then utilized by prompter 4 to generate the integration source file of block 6. The source file of block 6 is processed by the processor (block 8) producing the linker command file (block 12) and the configuration object file (block 10).

The Pascal object file (block 14), the software to be run on the prototype processor system, together with the Pascal run-time support library (block 16), the configuration object file (block 10), and the linker command file (block 12) are applied to linker 18. In linker 18, the configuration object file is linked to the Pascal object files and the run-time support library. Under the control of the linker command file, linker 18 will produce a load file (block 20) which can be executed by the prototype processor system specified in response to prompter 4.

The configuration object file (block 10) includes interrupt vectors, interrupt service routines, a reset routine and program initialization routine for the prototype processor system specified. The linker command file (block 12) generated for the particular prototype processor system ties together the Pascal object code (block 14), the configuration object file (block 10), and the appropriate run-time support libraries. The linker command file (block 12) also arranges the object code in accordance with the prototype processor system's memory layout as specified in response to prompter 4.

In order for the ICS to function it is necessary that the basics of various prototype processor systems be included as working parameters. These parameters include information such as maximum memory size and configurations, interrupt procedures, etc. For purposes of the following discussion examples will be included of an ICS system which can interface a Pascal language program with any of the following microprocessors: 8086, 8086/8087, 8088, and 8088/8087.

Before the Pascal object code (block 14) produced by a compiler can be executed, it must be supplemented with configuration object code (block 10) produced by ICS. If the designer/programmer already knows the details of the prototype processor system he can create and process an ICS integration source file (block 6) even before he begins programming in Pascal. In fact, the ICS integration source file (block 6) provides a concise, human-readable description of the hardware/software interface, and can be used as a design document.

It is likely, however, that the software will be developed in parallel with the hardware, and that parts of the program will be tested before the entire program is developed. In testing parts of the program in emulation mode, the default ICS configuration object file and linker command file can be used. As interrupt processing routines are added to the program and it is moved to the prototype processor system, the ICS integration source file (block 6) will be created and modified to match the program's changing environment.

When the ICS system is initiated, prompter 4 queries the user for information as to the prototype processor system configuration. Table 1 shows a typical set of prompts, user responses, and a comment field forming a typical integration source file (block 6).

The ICS prompter (block 4) is an interactive program that creates the ICS integration source file. Prompter 4 asks questions about the prototype processor system, object files and interrupt configuration, and builds the file according to the responses.

When ICS is invoked prompter 4 introduces itself and displays a menu of options to choose from. In the "question mode", prompter 4 begins asking questions and building the integration source file. Immediately after ICS is invoked, prompter 4 first creates a default integration source file as shown in Table 3 and then modifies it according to the designer's specifications.

As discussed above, the integration source file is applied to processor 8 to generate the linker command file (block 12) and the configuration object file (block 10). Table 2 is a typical linker command file which would be generated from the integration source file of Table 1.

When ICS processor 8 finishes reading the integration source file (block 6), it invokes the assembler of the host computer to create the configuration (block 10) and listing from the integration source file (block 6) is automatically deleted after the assembler finishes.

If ICS processor 8 finds any errors in the ICS integration source file, it does not produce the linker command file or configuration object file, and the listing shows only the ICS directives and the associated error messages.

The ICS configuration object code (block 10) performs the following tasks:
sets up interrupt vectors;
sets up interrupt service routines;
sets up a reset routine; and
sets up program initialization routines.

ICS produces two types of code to carry out these tasks:

Interrupt handling code—Interrupt vectors and the register save/restore routines that may be used in interrupt handling.

Initialization and reset code—Code that initializes the segment registers (CS, DS, SS, ES), the stack pointer, the heap pointers, the BP register, the 8087, and the floating point status word variable. This code may also include a routine called COPYVECTORS that copies the interrupt vectors from ROM to RAM, and also a RESET vector which creates the reset code (a JMPS instruction) at location FFFF0.

Most of the code in an ICS configuration object file may be used for interrupt handling. A total of 256 interrupt types, are possible and each type may have a different interrupt service routine. Each interrupt type may need to save and restore the registers of the 8086 and 8087. The actual code generated by ICS depends upon the ICS integration source file choices for each interrupt type.

Two sections are generated simultaneously for interrupt servicing code; a section to contain the interrupt vectors (ICS.VROM) and a section to contain the executable code (ICS.INSTR). (The "RESUME" assembler directive acts as a switch, first declaring some code in one section and then some code in the other section.)

Each interrupt service routine has a portion of code devoted to its handling. The assembly code for handling each interrupt type follows a general pattern.

The general pattern shown below represents a portion of the ICS listing. Uppercase words are either actual assembler directives or instructions. Lowercase words are a description of the function of the assembler code and represent one or more lines from the listing.

| | |
|---|---|
| ;VECTOR | INTSERVE,m |
| | RESUME ICS.INSTR |
| VECTOR$ | SET $ |
| | save some registers and preserve traceback |
| | call interrupt servicing routine |
| | restore registers |
| | IRET |
| | RESUME ICS.VROM |
| | create interrupt vector in memory |

In the first listing line, ;VECTOR is the ICS directive that declares the interrupt service routine and the type(s) handled by that routine. INTSERVE represents the routine that services the interrupt type number "m".

The SET directive causes VECTOR$ to become a pointer. VECTOR$ points to the beginning of the interrupt handling code for this interrupt type.

The "save some registers and preserve traceback" code performs two functions: saves selected registers and allows the runtime error checking routines to trace the source of runtime errors.

The "call interrupt service routine" code calls the routine that services the interrupt type.

The "restore registers" code restores those registers that were saved. (Refer to Table 4 for a list of ICS subroutines that are used to save and restore registers.)

The IRET instruction returns control to the interrupted routine.

The RESUME ICS.VROM directive causes any lines of code that follow the directive to be placed in the ICS.VROM section.

Next, ("create interrupt vector in memory") a vector is created in memory pointing to the beginning of the interrupt handling code. This is done with two assembler directives (an example is shown in the sample ICS listing). The first defines the location where the interrupt vector is to be placed. The second creates the value of the interrupt vector in that location.

The sample ICS listing, later in this section, shows the particular code produced for each of the interrupt types in a sample ICS source file.

Table 4 lists the subroutines that may be included in the ICS object code.

Interrupt types specified with the INTERRUPTS_TYPES_USED directive, but not mentioned in a VECTOR directive, are referred to as undefined interrupt types. The FAULT_NOTIFICATION directive is used to specify the interrupt handling routine for these undefined types. The RESTART_LABEL directive generates interrupt vectors for these undefined interrupts. See the sample ICS listing, shown later in this section, for an example.

If the INTERRUPT_CONFIGURATION is RAM, the interrupt vectors must be created (in CONSTANTS_ROM) and then transferred to the interrupt vector area (ICS.VRAM) at runtime. The FAULT_NOTIFICATION directive reserves the appropriate areas in ICS.VRAM for the interrupt vectors and sets up the code to transfer the vectors there during program initialization.

The table created in ICS.VROM has the form shown in Table 5.

The program initialization code is created by the RESTART_LABEL directive starting at the location PASCAL_BEGIN. The initialization code is executed at runtime and performs the following tasks:
sets the DS, SS, and ES registers to the base of the data segment (DATABASEQQ);
sets the stack pointer value to STKBASEQQ minus DATABASEQQ;
initializes the heap pointers at HEAPBASEQQ;
if necessary, calls COPYVECTORS$ to copy the interrupt vectors from ICS.VROM to ICS.VRAM;
if necessary, initializes the 8087 by doing an FINIT and initializing the control word;
clears the global variable floating point status word;
clears the BP register so that the traceback routine knows that this is the main program; and
jumps to the main program's entry point MAINQQ.

The reset code is a JMPS instruction, placed at location FFFF0H, pointing to the intialization code. After the microprocessor is reset, this JMPS instruction causes the initialization code to be executed.

The RESTART_LABEL directive also includes the code for any interrupt-related subroutines that are needed (as listed in Table 4.)

If the configuration object code generated by ICS does not fit the prototype processor system application the code ICS produces may be modified.

When ICS is invoked, if the -l (listing) or -o (object code) option if specified, and the ICS integration source file contains no errors, ICS generates a temporary assembly language source file from the ICS directives. If the o-option is included, ICS invokes the 8086 assembler to create the object file (filename.io) and assembler listing (filename.il). The assembler invocation that ICS uses looks something like this:

| asm filename.io | filename.il | /lib/ 8086/ics.mc | /tmp/ XXXXXTnnnnTnn |
|---|---|---|---|
| \| | \| | \| | \| |
| object file | listing file (if requested) | ICS macro definitions | temporary assembly language source file |

The input to the assembler consists of two files, which are processed as if they were concatenated into a single file. The first file, /lib/8086/ics.mc, consists mostly of assembler macro definitions that are used by the second file. The second file is the temporary assembly language source file that ICS has just created. After the assembler finishes, the temporary file is automatically deleted.

If the -o option is omitted, the temporary assembly language source file is saved as the listing file (filename.il). If the designer would like to modify the code that ICS produces, he can edit this source file or create a modified version of the ICS macro file. However, modifying the code that ICS produces may cause your program to be linked, loaded, or executed incorrectly.

For example, suppose the designer wants to change the code that saves and restores 8086 registers. This code is found in ics.mc, in macros SAV-86-INLINE$, RES-86-INLINE$, and SAVE-RESTORE-86$. He creates his own copy of ics.mc and modifies those three macros:

| cp/lib/8086/ics.mc mymacros | [Make a copy of the ICS macros.] |
|---|---|
| ed mymacros | [Modify his copy.] |

Each time he invokes ICS, he can create the assembly language source file but skip the assembly step:

| ics −l myprog.is | [Generate assembly language source file in myprog.il.] |
|---|---|
| Then he assembles the source file using his own macros: | |
| asm myprog.io myprog.list mymacros myprog.il | [Generate the object file myprog.io and listing file myprog.list] |

This assembly command line effectively concatenates his macro definitions (mymacros) with the ICS produced myprog.il and then assembles this file.

Table 6 lists the assembly language macros in the ics.ms file and their functions.

The ICS listing file produced by ICS from a hypothetical ICS integration source file is now shown. By examining the ICS listing file the ICS configuration object code that is linked into the executable load module that runs on the prototype processor system can be understood.

ICS creates a temporary file from the ICS integration source file. This file is assembled and produces the ICS configuration object file and an assembly listing called the ICS listing file.

Table 7 is an actual listing produced by ICS.

The following is an explanation of the listing of Table 7.

During assembly, the assembler uses macro definitions from the file /lib/8086/ics.mc. The macro definitions and their line numbers from the ics.mc file are not shown in the listing.

Lines 1-187 are from ics.mc; the remaining lines in the listing are the ICS directives and the assembly language statements they create. (Lines 11-186 are the macro definitions from ics.mc, which are not listed.)

Lines 4-9 set up section ICS.INSTR and the standard global symbols, and associate the value DATABASEQQ with the DS register.

Line 202 sets up section ICS.VROM, which will contain the interrupt vectors.

The VECTOR directive on line 207 generates lines 208-238. Lines 211-235 save the 8086 registers in-line, call the interrupt service routine (called NMI), restore the registers, and return from the interrupt.

Lines 236-238 create an interrupt vector at address 0008 that points to the beginning of the register save code (line 212). This spot was marked by the "VECTOR$ SET $" directive on line 210.

Lines 237 and 238 (ORG and WORD assembler directives) are typical of lines that create an interrupt vector. ORG defines the location of the vector. This code is placed in the interrupt vector table at address 8H (for interrupt type 2). WORD creates the interrupt vector. The first word created is VECTOR$-CODEBASEQQ. This word is the offset from the CS register which points to the code that saves registers (starting at location 0, lines 212). The second word created, BITS(CODEBASEQQ,4,16) contains the top 16 bits of CODEBASEQQ (which has 20 bits). These 16 bits will be placed in the CS register when the interrupt occurs.

The VECTOR directive on line 239 generates lines 240-249. This directive code is similar to the previous code (lines 211-235), except that the 8086 registers are not saved and restored in-line. Instead, they are saved and restored using the subroutines SAV.86$ and RES.86$, the code for which will be generated by the RESTART_LABEL directive.

The VECTOR directive invocation on line 250 generates the lines 251-262. Since the SAVE-FLOATING_POINT and EXCEPT$_{13}$ FOR directives direct ICS to save the floating point registers for interrupt types 32 and 34, lines 255-257 save the FPSWQQ variable and the 8087 status on the stack before the call to the interrupt service routine, and restore them afterward.

The VECTOR directive on line 263 generates lines 264-275. This directive is essentially the same as the previous directive.

The VECTOR directive on line 276 generates lines 277-282. Because of the OWN_CODE parameter, no register save and restore code is generated. The four interrupt vectors that are generated all vector directly to TIMER (lines 279-282).

All remaining code is generated in response to the RESTART_LABEL directive (line 283).

The FAULT_NOTIFICATION directive (back at line 206) specified that undefined interrupts are to be handled by the interrupt service routine called BAD_INTERRUPT. Since interrupt types 33 and 35 are undefined (not listed in any VECTOR directives), lines 284-291 generate the code necessary to save the 8086 registers, call BAD_INTERRUPT, and restore the registers. Lines 292-296 generate interrupt vectors to this code for types 33 and 35.

Lines 298-352 generate the code for the 8086 and 8087 register save and restore routines: SAV.86$, RES.86$, SAV.87$, and RES.87$.

The program initialization code starts at label PASCAL_BEGIN (line 356). Lines 357-361 initialize DS, SS, and SP. Lines 362-366 initialize the heap pointers. Lines 368-374 initialize the 8087. Lines 377-381 initialize ES and BP. Line 384 jumps to the main Pascal program.

Lines 386-391 set up the RESET vector FFFF0.

Table 8 shows the interrupt type, the name of the interrupt service routine for that type, the ICS code that saves and restores registers after an interrupt, and the line numbers of the code in the ICS listing.

To create an executable load file, the linker is involved, specifying only the linker command file that ICS has created and the load file to be created.

Table 9 is a sample listing of the prompter (block 4) routine and Table 10 is a sample listing of the processor (block 8) routine. Referring now to FIG. 2 there is shown a computer terminal 40 and a host computer 30. Terminal 40 includes a CRT 42, keyboard 43, processor 41, memory 44 and timing and control 45. In addition, terminal 40 includes I/0 46 to enable two way communication between the terminal and host computer 30. Host computer 30 includes CPU 32 which operates under the control of timing and control 36. In addition, host computer 30 includes memory 34 and I/0 38. I/0 38 is the communications link between host computer 30 and the peripherals, i.e. terminal 40, printer/plotter 39 and PROM programmer 37.

In operation, the prompter and processor routines, like those included in Tables 9 and 10, are initially stored in memory 34. When the designer, via keyboard 43 of terminal 40, initiates the ICS system the prompter routine is called up by CPU 32 from memory 34. The individual prompts are then transmitted to the CRT of terminal 40 via I/Os 38 and 46. The designer enters his responses via keyboard 43 which are then transmitted back to CPU 32 where the prompter routine formulates the integration source file (FIG. 1, block 6).

Next the processor routine is called-up by CPU 32 to convert the integration source to the linker command file and the configuration object file as discussed above.

When these steps are completed, the machine independent program to be conditioned for use on the prototype processor system is loaded into host computer 30, together with the standard run-time support library for the language in which that program is written. If host computer 30 includes a compiler for the language, the machine independent program can be entered in either source or object form. In the above example the language of the desired program was to be Pascal.

With the four above-identified files, the linker routine of host computer 30, under the control of the linker command file, links the configuration object file, the Pascal object file, and selected as necessary routines of the Pascal runtime library to create the executable load module (FIG. 1, block 20). The executable load module includes, in machine language, the information and locations in the ROMs of the prototype processor system for that system to operate as per the program included in the Pascal object file.

With the proper peripherals, the host computer 30 can list the executable load module, via printer/plotter 39, or program test PROMs, via PROM programmer 37.

| PROMPTS | USER RESPONSES | COMMENTS |
|---|---|---|
| ; This first directive is just a title. | | |
| PASCAL_CONFIGURATION | BETTER_MOUSETRAP | |
| | | |
| ; These directives describe the processor configuration | | |
| ; and memory layout. | | |
| HARDWARE_CONFIGURATION | 8086-8087 | ; 8086 CPU with 8087 NDP |
| INSTRUCTIONS_ROM | [00400H,07FFFH] | ; 31K for executable code |
| CONSTANTS_ROM | [08000H,08FFFH] | ; 4K for ROMable data |
| GLOBAL_VAR_RAM | [09000H,0CFFFH] | ; 16K for variable data |
| HEAP_STACK_RAM | [0D000H,0EFFFH] | ; 8K for heap and stack |
| RESET_MEMORY | YES | ; also memory at FFFF0 |
| | | |
| ; This directive tells whether the program uses OS/40 SVCs. | | |
| SERVICE_CALLS | NONE | |
| | | |
| ; These directives specify the object and library files that make | | |
| ; up the program. | | |
| SOFTWARE_CONFIGURATION | /usr/thomase/mousetrap/main.po | |
| MODULE | /usr/thomase/mousetrap/cheesemod.po | |
| MODULE | /usr/thomase/mousetrap/firstaid.po | |
| LIBRARY | /usr/horatioa/mouselib | |
| FILE_SUPPORT | NONE | |
| | | |
| ; These directives describe the interrupt configuration, if any. | | |
| INTERRUPT_CONFIGURATION | ROM | ; Set up interrupt vectors |
| INTERRUPT_TYPES_USED | 2,4,[32,39] | ; in ROM for types 2,4,32-39. |
| SAVE_FLOATING_POINT | NO | ; Generate 8087 save and re- |
| EXCEPT_FOR | 32,34 | ; store code for types 32,34. |
| FAULT_NOTIFICATION | BAD_INTERRUPT | ; List interrupt |
| VECTOR | NMI,IN_LINE,2 | ; service routines |
| VECTOR | OVERFLOW,4 | ; and associated |
| VECTOR | ADJUST_CHEESE,32 | ; interrupt types. |
| VECTOR | ADJUST_SPRING,34 | ; BAD_INTERRUPT |
| VECTOR | TIMER,OWN_CODE,[36,39] | ; handles 33,35. |
| | | |
| ; This directive tells where program execution begins. | | |
| RESTART_LABEL | PASCAL_BEGIN | |
| END | | |

TABLE 1

TYPICAL INTEGRATION SOURCE FILE LISTING (Note: A(;) is used to preceed each comment field)

| Linker Commands | Added Comments |
|---|---|
| -O mouse.io | Link in ICS object file. |
| -D STKBASEQQ=0EFFFH | Define boundaries for |
| -D HEAPBASEQQ=0D000H | stack and heap. |

```
-m INSTRQQ.ROM=00400H-07FFFH            Define memory areas.
-m CONSTQQ.ROM=08000H-08FFFH
-m DATAQQ.RAM=09000H-0CFFFH
-L class=INSTRQQ range INSTRQQ.ROM      Assign program sections
-L class=CONSTQQ range CONSTQQ.ROM      to their memory areas.
-L class=DATAQQ range DATAQQ.RAM
-O /usr/thomase/mousetrap/main.po       Link in user's object
-O /usr/thomase/mousetrap/cheesemod.po  files and library.
-O /usr/thomase/mousetrap/firstaid.po
-O /usr/horatioa/mouselib
-D CODEBASEQQ=0400H                     Define code segment and
-D DATABASEQQ=08000H                    data segment.
-O /lib/8086/pas.fp87.scsd              Link in Pascal runtime
-O /lib/8086/pas.rts.scsd               support libraries.
-O /lib/8086/pas.err.scsd
-O /lib/8086/pas.noio.scsd
-O /lib/8086/pas.conv.scsd
-x PASCAL_BEGIN                         Define transfer address.
```

TABLE 2

TYPICAL LINKER COMMAND FILE LISTING

| Prompts | Default Integration Source File |
|---|---|
| PASCAL_CONFIGURATION | Default Configuration |
| HARDWARE_CONFIGURATION | 8086 |
| INSTRUCTIONS_ROM | [00060H,07FFFH] |
| CONSTANTS_ROM | [08000H,08FFFH] |
| GLOBAL_VAR_RAM | [09000H,0D7FFH] |
| HEAP_STACK_RAM | [0D800H,0FFFFH] |
| RESET_MEMORY | NO |
| SERVICE_CALLS | DEFAULT |
| SOFTWARE_CONFIGURATION | NONE |
| MODULE | NONE |
| LIBRARY | NONE |
| FILE_SUPPORT | DEFAULT |
| INTERRUPT_CONFIGURATION | NONE |
| RESTART_LABEL | PASCAL_BEGIN |
| END | |

TABLE 3

TYPICAL DEFAULT INTEGRATION SOURCE FILE

| Name | Function |
|---|---|
| SAV.86$ | Saves 8086 registers on stack |
| SAV.87$ | Saves floating point status word (global variable FPSWQQ) and 94-byte state of 8087 on stack |

| | |
|---|---|
| RES.86$ | Restores 8086 registers from stack |
| RES.87$ | Restores FPSWQQ and 8087 state from stack |
| COPYVECTORS$ | Copies interrupt vectors from ROM to RAM |

TABLE 4

SUBROUTINES IN ICS OBJECT CODE

| Address relative to beginning of ICS.VROM | Contents |
|---|---|
| 0—1 | address where first vector is to be stored |
| 2—5 | first interrupt vector |
| 6—7 | address where second vector is to be stored |
| 8—8 | second interrupt vector |
| | address where last vector is to be stored |
| | last interrupt vector |
| | end-of-vectors flag (400H) |

TABLE 5

INTERRUPT VECTORS IN ICS.VROM

| Name | Function |
|---|---|
| COPY_VECTORS$ | Code for subroutine COPYVECTORS$. |
| INITIALIZE_87$ | Initializes 8087. |
| JUMP_TO_PASCAL$ | Completes program initialization and jumps to main program. |
| REPORT_FAULT$ | Calls runtime error routine to report undefined interrupt. |
| RESET_VECTOR$ | Sets up reset vector at FFFF0. |
| RESTOREFPSW$ | Restores FPSWQQ from stack. |
| RES_86_INLINE$ | In-line code for restoring 8086 registers. |

| | |
|---|---|
| RES_87_INLINE$ | In-line code for restoring FPSWQQ and 8087 state. |
| SAVEFPSW$ | Saves FPSWQQ on stack. |
| SAVE_RESTORE_86$ | Code for subroutines SAV.86$ and RES.86$. |
| SAVE_RESTORE_87$ | Code for subroutines SAV.87$ and RES.87$ |
| SAV_86_INLINE$ | In-line code for saving 8086 registers on stack. |
| SAV_87_INLINE$ | In-line code for saving FPSWQQ and 8087 state on stack. |
| START_PROGRAM$ | Begins program initialization. |

TABLE 6

ASSEMBLY LANGUAGE MACROS USED BY ICS

```
1              ICS macro definitions for 8086: X02.00-00
2              Copyright (C) 1982 Tektronix, Inc.
3                       NAME      ICS.Module
4                       SECTION   ICS.INSTR,CLASS-INSTROQ
5                       GLOBAL    HEAPBASEQQ,STKBASEQQ
6                       GLOBAL    CODEBASEQQ,DATABASEQQ
7                       GLOBAL    PASCAL_BEGIN,MAINQQ
8                       GLOBAL    FPSWQQ
9                       ASSUME    DS:DATABASEQQ
10                      NOLIST
187                     LIST
188            ;PASCAL_CONFIGURATION     BETTER_MOUSETRAP
189            ;HARDWARE_CONFIGURATION   8086-8087
190            ;INSTRUCTIONS_ROM         [00400H,07FFFH]
191            ;CONSTANTS_ROM            [08000H,08FFFH]
192            ;GLOBAL_VAR_RAM           [09000H,0CFFFH]
193            ;HEAP_STACK_RAM           [0D000H,0EFFFH]
194            ;RESET_MEMORY             YES
195            ;SERVICE_CALLS            NONE
196            ;SOFTWARE_CONFIGURATION   /usr/thomase/mousetrap/main.po
197            ;MODULE                   /usr/thomase/mousetrap/cheesemos.po
198            ;MODULE                   /usr/thomase/mousetrap/firstaid.po
199            ;LIBRARY                  /usr/horatioa/mouselib
200            ;FILE_SUPPORT             NONE
201            ;INTERRUPT_CONFIGURATION  ROM
202                     SECTION ICS.VROM,ABSOLUTE
203            ;INTERRUPT_TYPES_USED     2,4,[32,39]
204            ;SAVE_FLOATING_POINT      NO
205            ;EXCEPT_FOR               32,34
206            ;FAULT_NOTIFICATION       BAD_INTERRUPT
207            ;VECTOR                   NMI,IN_LINE,2
208                     GLOBAL NMI
209                     RESUME ICS.INSTR
210        D R VECTOR$  BET  $
211          M          SAV_86_INLINE$
```

```
212  00000000 50        M         PUSH   AX
213  00000001 55        M         PUSH   BP
214  00000002 53        M         PUSH   BX
215  00000003 51        M         PUSH   CX
216  00000004 52        M         PUSH   DX
217  00000005 56        M         PUSH   SI
218  00000006 57        M         PUSH   DI
219  00000007 1E        M         PUSH   DS
220  00000008 06        M         PUSH   ES
221  00000009 BD0000    M         MOV    BP,#0   ;Traceback steps at this interrupt.
222                               END
```

TABLE 7
SAMPLE ICS CONFIGURATION OBJECT FILE LISTING
(PART 1 OF 5)

T7-1

```
223  0000000C EBF1FF   RU         CALL NMI
224                    M          RES_86_INLINE$
225  0000000F 07       M          POP    ES
226  00000010 1F       M          POP    DS
227  00000011 5F       M          POP    DI
228  00000012 5E       M          POP    SI
229  00000013 5A       M          POP    DX
230  00000014 59       M          POP    CX
231  00000015 5B       M          POP    BX
232  00000016 5D       M          POP    BP
233  00000017 58       M          POP    AX
234                               ENDM
235  00000018 CF                  IRET
236                               RESUME ICS.VROM
237           8                   ORG  4*2
238  00000008 00000000 RU         WORD VECTOR$-CODEBASEQQ,BITS(CODEBASEQQ,4,16);vector for interrupt type 2
239                    ;VECTOR                OVERFLOW,4
240                               GLOBAL OVERFLOW
241                               RESUME ICS.INSTR
242          19       R  VECTOR$  SET  $
243  00000019 E83100              CALL SAV.86$
244  0000001C E8E1FF   RU         CALL OVERFLOW
245  0000001F E83D00              CALL RES.86$
246  00000022 CF                  IRET
247                               RESUME ICS.VROM
248          10                   ORG  4*4
249  00000010 19000000 RU         WORD VECTOR$-CODEBASEQQ,BITS(CODEBASEQQ,4,16);vector for interrupt type 4
250                    ;VECTOR                ADJUST_CHEESE,32
251                               GLOBAL ADJUST_CHEESE
252                               RESUME ICS.INSTR
253          23       R  VECTOR$  SET  $
254  00000023 E82700              CALL SAV.86$
255  00000026 E84500              CALL SAV.87$
256  00000029 E8D4FF   RU         CALL ADJUST_CHEESE
257  0000002C E85500              CALL RES.87$
258  0000002F E82D00              CALL RES.86$
259  00000032 CF                  IRET
260                               RESUME ICS.VROM
261          80                   ORG  4*32
262  00000080 23000000 RU         WORD VECTOR*-CODEBASEQQ,BITS(CODEBASEQQ,4,16);vector for interrupt type 32
263                    ;VECTOR                ADJUST_SPRING,34
264                               GLOBAL ADJUST_SPRING
265                               RESUME ICS.INSTR
266          33       R  VECTOR$  SET  $
267  00000033 E81700              CALL SAV.86$
268  00000036 E83500              CALL SAV.87$
```

TABLE 7
SAMPLE ICS CONFIGURATION OBJECT FILE LISTING
(PART 2 OF 5)

T7-2

```
269  00000039 E8C4FF     RU           CALL ADJUST_SPRING
270  0000003C E84500                  CALL RES.87$
271  0000003F E81D00                  CALL RES.86$
272  00000042 CF                      IRET
273                                   RESUME ICS.VROM
274           88                      ORG 4*34
275  00000088 33000000   RU           WORD VECTOR*-CODEBASE@@,BITS(CODEBASE@@,4,16);vector for interrupt type 34
276                           ;VECTOR              TIMER,OWN_CODE,[36,39]
277                                   GLOBAL TIMER
278           90                      ORG 4*36
279  00000090 00000000   RU           WORD TIMER-CODEBASE@@,BITS(CODEBASE@@,4,16);vector for interrupt type 36
280  00000094 00000000   RU           WORD TIMER-CODEBASE@@,BITS(CODEBASE@@,4,16);vector for interrupt type 37
281  00000098 00000000   RU           WORD TIMER-CODEBASE@@,BITS(CODEBASE@@,4,16);vector for interrupt type 38
282  0000009C 00000000   RU           WORD TIMER-CODEBASE@@,BITS(CODEBASE@@,4,16);vector for interrupt type 39
283                           ;   RESTART_LABEL       PASCAL_BEGIN
284                           ;   The following code handles interrupt types that aren't mentioned in VECTOR directives.
285                                   RESUME ICS.INSTR
286           43        R    FAULT$   EQU  $
287                                   GLOBAL BAD_INTERRUPT
288  00000043 E80700                  CALL SAV.86$
289  00000046 E8B7FF     RU           CALL BAD_INTERRUPT
290  00000049 E81300                  CALL RES.86$
291  0000004C CF                      IRET
292                                   RESUME ICS.VROM
293           84                      ORG 4*33
294  00000084 43000000   RU           WORD FAULT$-CODEBASE@@,BITS(CODEBASE@@,4,16);vector for interrupt type 33
295           8C                      ORG 4*35
296  0000008C 43000000   RU           WORD FAULT$-CODEBASE@@,BITS(CODEBASE@@,4,16);vector for interrupt type 35
297                                   RESUME ICS.INSTR
298                           M       SAVE_RESTORE_86$
299                           M   ;   SAV.86 saves the 8086 registers on the stack and RES.86 retrieves them.
300                           M   ;   The Flags word, the CS, and the IR are saved and restored by normal
301                           M   ;   interrupt processing; the SP and SS are also not saved.
302  0000004D 55          M   SAV.86$  PUSH BP
303  0000004E 8BEC        M            MOV  BP,SP;  Cram (AX) into the stack
304  00000050 874602      M            XCHG AX,2[BP]; and save the return address in AX.
305  00000053 53          M            PUSH BX
306  00000054 51          M            PUSH CX
307  00000055 52          M            PUSH DX
308  00000056 56          M            PUSH SI
309  00000057 57          M            PUSH DI
310  00000058 1E          M            PUSH DS
311  00000059 06          M            PUSH ES
312  0000005A BD0000      M            MOV  BP,#0      ;Traceback steps at this interrupt.
313  0000005D 50          M            PUSH AX
314  0000005E C3          M            RET
```

TABLE 7
SAMPLE ICS CONFIGURATION OBJECT FILE LISTING
(PART 3 OF 5)

T7-3

```
315  0000005F 58         M   RES.86$  POP  AX       ;Return address to AX
316  00000060 07         M            POP  ES
317  00000061 1F         M            POP  DS
318  00000062 5F         M            POP  DI
319  00000063 5E         M            POP  SI
320  00000064 5A         M            POP  DX
```

```
321  00000065 59         M            POP     CX
322  00000066 5B         M            POP     BX
323  00000067 8BEC       M            MOV     BP,SP       ;Cram the return address into the stack.
324  00000069 874602     M            XCHG    AX,2[BP]    ;and rasters the saved contents of AX.
325  0000006C 5D         M            POP     BP
326  0000006D C3         M            RET
327                      M            ENDM
328                      M       SAVE_RESTORE_87$
329                      M  ;SAV.87 saves the 8087 contest using an FNSAVE instruction (EDC 2EH).
330                      M  ;RES.87 restores the 8087 contest using an FRSTOR instruction (E8C 2CH).
331                      M  ;Save area = top of stack.
332  0000006E 5B         M  SAV.87$   POP     AX          ;Return address to AX
333                      M       SAVEFPSW$
334  0000006F FF360000   MRU          PUSH    FPSWQQ
335  00000073 C7060000   MRU          MOVW    FPSWQQ,#0   ;Clear FP status word for RTS routines.
     0000                M
336                      M            ENDM
337  00000079 83EC5E     M            SUB     SP,#94      ;Make room on the stack.
338  0000007C 8BEC       M            MOV     BP,SP
339  0000007E DD7600     M            ESC     #2EH,[BP]   ;FNSAVE
340  00000081 9B         M            WAIT
341  00000082 50         M            PUSH    AX
342  00000083 C3         M            RET
343  00000084 58         M  RES.87$   POP     AX;         ;Return address to AX
344  00000085 8BEC       M            MOV     BP,SP
345  00000087 DD6600     M            ESC     #2CH,[BP]   ;FRSTOR
346  0000008A 83C45E     M            ADD     SP,#94      ;Clear restored contest from stack.
347                      M       RESTOREFPSW$
348  0000008D BF060000   MRU          POP     FPSWQQ
349                      M            ENDM
350  00000091 50         M            PUSH    AX
351  00000092 C3         M            RET
352                      M            ENDM
353                      M       START_PROGRAM$
354                      M  ;  Code to be executed at RESET starts here.
355                      M  ;  Initialize the stack painter, heap pointers, and segment registers.
356              93      MR   PASCAL_BEGIN EQU $
357  00000093 B80000     MRU          MOV     AX,#BITS(DATABASEQQ,4,16);Initialize segment registers.
358  00000096 8ED8       M            MOV     DS,AX
359  00000098 8ED0       M            MOV     SS,AX
```

TABLE 7
SAMPLE ICS CONFIGURATION OBJECT FILE LISTING
(PART 4 OF 5)

T7-4

```
360  0000009A BC0000     MRU          MOV     SP,#(STKBASEQQ-DATABASEQQ);Initialize stack pointer.
361  0000009D 81E4FEFF   M            AND     SP,#0FFFEH   ;SP must be even.
362  000000A1 BE0000     MRU          MOV     SI,#(HEAPBASEQQ-DATABASEQQ);Initialize heap pointers.
363  000000A4 8BC6       M            MOV     AX,SI
364  000000A6 050400     M            ADD     AX,#4
365  000000A9 8904       M            MOV     [SI],AX
366  000000AB C74402FF   M            MOVW    2[SI],#0FFFFH
     FF                  M
367                      M            ENDM
368                      M       INITIALIZE_87$
369                      M  ;  Initialize the 8087
370  000000B0 DBE3       M            ESC     #1CH,BX     ;FINIT
371  000000B2 8BEC       M            MOV     BP,SP       ;Load 03BF into control word...
372  000000B4 C746FEBF   M            MOVW    -2[BP],#03BFH  ;using top of stack.
     03                  M
373  000000B9 D96EFE     M            ESC     #0DH,-2[BP] ;FLDCW
374                      M            ENDM
375                      M       JUMP_TO_PASCAL$
```

```
376 000000BC C7060000  MRU        MOVW    FP8WQQ,#0        ;Clear floating point status word.
              0000     M
377                    M    ;  Set the ES register equal to DS and SS.
378 000000C2 8CD8      M          MOV     AX,DS
379 000000C4 8EC0      M          MOV     ES,AX
380                    M    ;  Clear BP.
381 000000C6 BD0000    M          MOV     BP,#0
382                    M    ;  All done. Start Pascal program.
383                    M    ;  The JMPS instruction initializes the CS register.
384 000000C9 EA000000  MRU        JMPS    MAINQQ,CODEBASEQQ    ;Jump to Pascal program.
              00       MRU
385                               ENDM
386                    M          RESET_VECTOR$ PASCAL_BEGIN
387                    M    ;  Finally, generate the RESET vector.
388                    M          SECTION ICS.RESET,ABSOLUTE
389           FFFF0    M          ORG     OFFFF0H
390 000FFFF0 EA930000  MSR        JMPS    PASCAL_BEGIN,CODEBASEQQ  ;RESET vectors to this jump.
              00       MRU
391                               ENDM
392                        ;  END
393                               END
```

TABLE 7
SAMPLE ICS CONFIGURATION OBJECT FILE LISTING
(PART 5 OF 5)

| Interrupt Type | Interrupt Service Routine | Save and Restore Registers by: | Code Lines in Fig. 9-2 |
|---|---|---|---|
| 2 | NMI | IN_LINE | 207--238 |
| 4 | OVERFLOW | SAV.86$, RES.86$ | 239--249 |
| 32 | ADJUST_CHEESE | SAV.86$, SAV.87$, RES.86$, RES.87$ | 250--262 |
| 34 | ADJUST_SPRING | SAV.86$, SAV.87$, RES.86$ RES.87$ | 263--275 |
| 36--39 | TIMER | OWN_CODE | 276--282 |
| 33,35 | BAD_INTERRUPT | SAV.86$, RES.86$ | 284--296 |

TABLE 8

INTERRUPT SERVICING ROUTINES
FOR SAMPLE ICS SOURCE FILE

TABLE 9

SAMPLE PROMPTER ROUTINE

```
{$I listoption}
program icsp;
{ ICS Prompter -- written by Jim Keniston
  Copyright (C) 1982 Tektronix, Inc.
    historical note: Until SDC (late Jan. 1982), ICS was referred to as
       "PINT" and ICSP was referred to as "PIP" -- hence the use of "pip"
       and "pint" in certain variable names and comments.
    demo (with bugs) 12/4/81
    bug fixing 12/7/81
    more bug fixing; adding uppercase,dirtype,dirname, and defaultparams to
       convbinfile 12/14/81
    miscellaneous cleanup 12/17/81
    updated to match revised PINT 1/11/82
    modified to be installable on 8560 1/21/82
    handling of omitted lines in edit mode changed 1/21/82
    conversion to ICS/ICSP nomenclature 2/2/82
    archived 2/2/82 version for use in V2: 2/17/82
    modified 2/17/82 to delete directives RTS_SUPPORT, ERROR_HANDLING,
       and FILE_SUPPORT.  Version number goes to Y01.02.
    modified 2/26/82 to put FILE_SUPPORT back in and to complain
       about null responses.  Version number goes to Y01.03.
    modified 3/11/82 to reflect revision of FILE_SUPPORT.
       Version number goes to X01.04.
    modified 4/5/82 to add error check via system call to ICS.
       Version number goes to X01.05.
    modified 4/9/82 to accomodate change in ICS to recognize lowercase
       directive names and keywords.  Version number goes to X01.06.
    modified 4/13/82 so that error check does not produce a listing.
       Version number goes to X01.07.
  Version number goes to V01.00 5/11/82. } const
    ndirmax = 35;  { maximum number of directives we can handle }
    misclength = 25;  { maximum length of string segment }
    plabellength = 20;  { maximum length of a paragraph title }
    { These next three are types of responses looked for by procedure
      getanswer. }
    yesno = -1;  { Y or N }
    anyanswer = 0;  { anything except a null string }
    evennothing = -2;  { anything, even a null string }
    noinfo = '';  { no info available in response to a "?" }
    maxaddr = 20000;  { max number of characters of text in bin menu file }
    pmargin = 24;  {parameter field starts in column 25}
    maxparag = 70;  { max number of paragraphs }
    omitmsg = '<omitted>';
{$I pathnames} type
    miscstring = string[misclength];
    dirindex = (pas_con,hw_con,instr_rom,const_rom,global_ram,heap_ram,
       reset_mem,svcs,sw_con,mod_list,lib_list,
       file_sup,intrpt_con,intrpt_types,save_float,
       except_list,fault_not,vector_list,restart_label,end_dir,comments);
    typeofdir = (singleline,multiline);
    linerecptr=^linerec;
    paramptr=^paramrec;
    linerec=record
        nextline,lastline : linerecptr;
        paramlist : paramptr;
        directive : dirindex
      end;
    paramrec=record
        paramstring : miscstring;
        moreparams : paramptr
      end;
    textline = string[100];
    textaddress = 0..maxaddr;
    plabel = string[plabellength];  {label of a paragrah from the menu file}
    paragraph=record
        startaddress : textaddress;
```

```
        nlines : integer;
        paraglabel : plabel;
      end;
    paragindex = 0..maxparag;
    conversation = record
        parag : array [paragindex] of paragraph;
        nparag : paragindex;
        txt : packed array [textaddress] of char;
        uppercase,omittable : array [dirindex] of boolean;
        dirtype : array [dirindex] of typeofdir;
        dirname,defaultparams : array [dirindex] of miscstring
      end;

var
    convbinfile : file of conversation; {binary menu file}
    convfile : text; {ASCII menu file -- used to create convbinfile if it
       doesn't already exist}
    pintsource : text; {the ICS source file we're creating or modifying}
    filename : string[80]; {the name of the ICS source file} done : boolean;
    infochanged : boolean;

{ Pseudo-constants firstdir and omitflag are initialized in procedure
       initvalues because they don't fit into CONST statements. }
    firstdir : dirindex;   {= pas_con}
    omitflag : string[1];  {= NUL character}

{Here are the pointers into the list of ICS source lines.}
    firstline,finalline : array [dirindex] of linerecptr;
    PINTfirstline,PINTlastline : linerecptr;

stilldefault : array [dirindex] of boolean;
    blankfill : array [dirindex] of miscstring;

{****************************************}
{*** Auxiliary procedures start here. ***}
{****************************************} procedure internalerror(message:string);
    { crashes the program on an error not caused by the user. }
    begin
      writeln('** ICSP internal error: ',message);
      writeln('Please report this error to your Tektronix service rep.');
      exit(program)
    end {internalerror};

function badname(filename:string) : boolean;
    { Returns TRUE if the name does not end in ".is" }
    begin
      badname:=(length(filename)<4) or
        (pos('.is',filename)<>length(filename)-2);
    end {badname};

procedure stripblanks(var strng:string);
    {Removes blanks from the beginning and end of the specified string.}
    begin
      while pos(' ',strng)=1 do delete(strng,1,1);
      if length(strng) > 0 then
        while strng[length(strng)]=' ' do
          delete(strng,length(strng),1)
    end {stripblanks};

function decimalnum(strng:string) : integer;
    { converts the specified string to a decimal number. }
    var
      i,num,ndigits : integer;
      badnumber : boolean;
    begin
      ndigits:=length(strng);
      badnumber:=(ndigits<1) or (ndigits>4);
      num:=0;
```

```
   if not badnumber then
     for i:=1 to ndigits do
       if strng[i] in ['0'..'9']
         then num:=num*10 + ord(strng[i])-ord('0')
         else badnumber:=true;
   if badnumber
     then decimalnum:=-1
     else decimalnum:=num
end {decimalnum};

procedure capitalize(var strng:string);
{Capitalizes all the letters in the specified string up to the first
 semicolon.}
var i,n : integer;
begin
  n:=pos(';',strng);
  if n=0 then n:=length(strng);
  if n > 0 then
    for i:=1 to n do
      if strng[i] in ['a'..'z'] then strng[i]:=chr(ord(strng[i])-32)
end {capitalize};

function commentline(sourceline:string) : boolean;
{ commentline=true if the line passed is a blank line or a comment.}
begin
  stripblanks(sourceline);
  if (sourceline='') or (pos(';',sourceline)=1)
    then commentline:=true
    else commentline:=false
end {commentline};

procedure divide(sourceline:string; VAR dir,params:string);
{Divides an ICS source line into its directive and parameter fields.}
var firstblank:0..255;
begin
  stripblanks(sourceline);
  firstblank:=pos(' ',sourceline);
  if firstblank=0
    then
      begin
        dir:=sourceline;
        params:=''
      end
    else
      begin
        dir:=copy(sourceline,1,firstblank-1);
        delete(sourceline,1,firstblank-1);
        stripblanks(sourceline);
        params:=sourceline
      end;
  capitalize(dir);
end {divide};

procedure display(paragname:plabel);
{ displays the paragraph whose label is paragname }
var
  p : paragindex;
  i : integer;
  nextaddr : textaddress;

procedure displayline;
  { called by display to display the line that begins at nextaddr }
  var
    line : textline;
    j,nchar : integer;
    ch : string[1];  {ch is kludge required in building string from chars.}
  begin
  with convbinfile^ do begin
    ch:='X';
    nchar:=ord(txt[nextaddr]);
    line:='';
```

```
   if nchar>0 then for j:=1 to nchar do
     begin
       nextaddr:=nextaddr+1;
       ch[1]:=txt[nextaddr];
       line:=concat(line,ch)
     end;
   nextaddr:=nextaddr+1; {Move to start of next line.}
   writeln(line)
 end {with}
end {displayline};

begin {display}
  { Find the label in the list.}
with convbinfile^ do
  begin
    if length(paragname)>plabellength
      then paragname:=copy(paragname,1,plabellength);
    parag[nparag+1].paraglabel:=paragname;
    p:=1;
    while paragname<>parag[p].paraglabel do p:=p+1;
    if p=nparag+1
    then {We went all the way through the list without finding it.}
      internalerror(concat(paragname,': cannot find text to be displayed'))
    else with parag[p] do
      begin
        nextaddr:=startaddress;
        for i:=1 to nlines do displayline
      end
  end {with}
end {display};

function omitted(p:linerecptr) : boolean;
{Tells whether line p is omitted.}
begin
  if p^.paramlist^.paramstring=omitflag
    then omitted:=true
    else omitted:=false
end;

procedure insertline(previousline:linerecptr; var p:linerecptr);
{ inserts a line record after the record pointed to by previousline.
  A parameter record is also allotted. p points to the new line.}
begin
  new(p);
  with p^ do
    begin
      new(paramlist);
      paramlist^.moreparams:=nil;
      nextline:=previousline^.nextline;
      lastline:=previousline;
      lastline^.nextline:=p;
      nextline^.lastline:=p
    end
end {insertline};

procedure waitforcr;
begin
  write('[Press the RETURN key to continue.]');
  readln
end {waitforcr};

procedure dointro;
{ called by initialize and by mainmenu to display the intro to ICSP. }
begin
  display('screen1'); waitforcr;
  display('screen2'); waitforcr;
  display('screen3'); waitforcr;
  display('screen4'); waitforcr
end {dointro};

procedure copyparams(sourcestring:string; destline:linerecptr);
{ Copies sourcestring into the node (or node list) pointed to by
  destline.  If sourcestring is more than misclength characters
```

```
   long, then more than one node is required.  A list of nodes may
   already have been allotted for this line. }
var destlist : paramptr;
begin
  destlist:=destline^.paramlist;
  while length(sourcestring) > misclength do
    with destlist^ do
      begin
        paramstring:=copy(sourcestring,1,misclength);
        delete(sourcestring,1,misclength);
        if moreparams=nil then new(moreparams);
        destlist:=moreparams
      end;
  with destlist^ do
    begin
      paramstring:=sourcestring;
      moreparams:=nil
    end;
  stilldefault[destline^.directive]:=false;
  infochanged:=true
end {copyparams};

procedure writeline(var outfile:text; p:linerecptr; defaultflag:boolean);
{Writes out the line pointed to by p.  If the line is a directive with
 default values, and defaultflag is true, then then tag <default> is
 added to the end of the line.}
var parmptr : paramptr;
begin
  with p^ do
    begin
      { Write the directive name. }
      if directive<>comments then write(outfile,
        convbinfile^.dirname[directive],blankfill[directive]);
      { Write the parameters field. }
      if omitted(p)
        then write(outfile,omitmsg)
        else
          begin
            parmptr:=paramlist;
            while parmptr<>nil do with parmptr^ do
              begin
                write(outfile,paramstring);
                parmptr:=moreparams
              end;
          end;
      { Write the <default> flag. }
      if (directive<>comments) and stilldefault[directive]
        and defaultflag then write(outfile,'  <default>');
      writeln(outfile)
    end {with}
end {writeline};

procedure writefile(var outfile:text; rewriteflag:boolean);
{Writes the ICS source file from memory to the specified file.}
var
  p : linerecptr;
  nlines : integer;
begin {writefile}
  if rewriteflag then
    begin
      {$I-}
      rewrite(outfile,filename);
      {$I+}
      if ioresult<>0 then
        begin
          writeln('ICSP: Error - cannot write to ',filename,'.');
          exit(program)
        end
    end;
  nlines:=0;
  p:=PINTfirstline^.nextline;
  while p<>PINTlastline do
```

```
      begin
        if not omitted(p) then
          begin
            writeline(outfile,p,false);
            nlines:=nlines+1
          end;
        p:=p^.nextline
      end;
    if rewriteflag then close(outfile,lock);
    writeln(nlines:1,' lines')
  end {writefile};

{*******************************************}
{*** Procedure initialize starts here. ***}
{*******************************************} procedure initialize;
  { called by main program to do all initialization prior to first
    display of main menu. }
  var
    newfile : boolean;
    previousline : linerecptr;
    answerstring : string;

{* doheading *} procedure doheading;
    { called by initialize }
    begin
      write('ICS Prompter    ');
      writeln('8086/8088 V01.00-00   (8560)');
      writeln('Copyright (C) 1982 Tektronix, Inc.');
      writeln
    end {doheading};

{* initfile *} procedure initfile (var newfile:boolean);
    { called by initialize to open the specified ICS source file.} procedure getfilename(var filename:string);

procedure getpipparam(var filename:string);
        { Called by getfilename to pick the filename parameter (if any)
          out of the icsp command line. The unitread procedure reads the
          pas.int.command line into array pblock.pchar and stores the
          number of parameters (should be 2 or 3) in pblock.pnum. Parameters
          are delimited with NULs. }
        const
          pblockreq = 5;
          buffererror = 35;
        var
          pblockptr : integer;
          pblock : packed record
              nump : integer;
              pchar : packed array[1..190] of char
            end;

procedure getparam;
          { Picks a parameter out of the command line and stores it in
            filename. }
          var ch : string[1];
          begin {getparam}
            ch:='X';
            filename:='';
            while pblock.pchar[pblockptr]<>chr(0) do
              begin
                ch[1]:=pblock.pchar[pblockptr];
                filename:=concat(filename,ch);
                pblockptr:=pblockptr+1;
              end;
            pblockptr:=pblockptr+1; {Move past NUL to next param.}
          end {getparam};
```

```
begin {getpipparam}
  {$R- }
  unitread(0,pblock,0,0,pblockreq);
  if ioresult=buffererror
    then internalerror('icsp command line overflow')
    else
      begin
        filename:='';   {leave name nil if it's not provided}
        if pblock.nump>3
          then writeln('ICSP: Warning - too many parameters; ',
            'all parameters ignored')
          else if pblock.nump=3 then
            begin
              pblockptr:=1;
                getparam; {Skip interpreter name.}
                getparam; {Skip pcode file name.}
                getparam; {Get ICS source file name.}
              end; {3 params}
      end; {no error}
  {$R+ }
end {getpipparam};

begin {getfilename}
  getpipparam(filename);
  {Get the file name if none was supplied in the command line.}
  while filename='' do
    begin
      writeln('What is the name of the ICS source file that you ',
        ,'want to create or modify?');
      writeln('To be compatible with ICS, the name should end ',
        'in ".is".');
      readln(filename);
      stripblanks(filename);
      if badname(filename) then
        { Name doesn't end in .is.  Go ahead and edit it
          if it already exists.}
        begin
          {$I-}
          reset(pintsource,filename);
          {$I+}
          if ioresult=0
            then close(pintsource)  { File exists.}
            else filename:='';   { New file -- reject name.}
        end;
    end;
  {Complain if name doesn't end in ".is".}
  if badname(filename) then
    begin
      writeln('Before you run this file through ICS, be sure to');
      writeln('rename the file so that it ends ih ".is".');
    end
end {getfilename};

begin {initfile}
  getfilename(filename);
  {$I-}
  reset(pintsource,filename);
  {$I+}
  if ioresult=0
    then newfile:=false
    else {Specified file does not already exist.  Create it.}
      begin
        {$I-}
        rewrite(pintsource,filename);
        {$I+}
        if ioresult=0
          then
            begin
              newfile:=true;
              close(pintsource)
            end
          else
```

```
              begin
                writeln('ICSP: Error - cannot create file ',filename);
                exit(program)
              end
          end
    end {initfile};

{* initvalues *} procedure initvalues;
    { called by initialize to do miscellaneous initialization of variables
      and pseudo-constants. }
    var d : dirindex;
    begin
      omitflag:='X';   { Set omitflag length to 1 char. }
      omitflag[1]:=chr(0);   { A single NUL character flags an omitted line. }
      firstdir:=pas_con;
      {Set up the list of ICS source lines.}
      new(PINTfirstline);
      new(PINTlastline);
      PINTfirstline^.nextline:=PINTlastline;
      PINTlastline^.lastline:=PINTfirstline;
      for d:=firstdir to comments do
        begin
          firstline[d]:=nil;
          finalline[d]:=nil
        end
    end {initvalues};

procedure addline(d:dirindex; sourceline:string);
    { called by getdefaultparams or getoldparams to create a new line
      consisting of the string sourceline. }
    var newline : linerecptr;
    begin
      insertline(previousline,newline);
      if d<>comments then
        begin
          finalline[d]:=newline;
          if firstline[d]=nil then firstline[d]:=newline
        end;
      newline^.directive:=d;
      copyparams(sourceline,newline);
      previousline:=newline
    end {addline};

{* getdefaultparams *} procedure getdefaultparams;
    { called by initialize to create the memory image of the ICS source
      file using default parameters. }
    var d : dirindex;
    begin
      writeln('Creating ',filename,' with default parameters...');
      for d:=firstdir to end_dir do
        begin
          addline(d,convbinfile^.defaultparams[d]);
          stilldefault[d]:=true
        end;
      writefile(pintsource,true);
      infochanged:=false
    end {getdefaultparams};

{* getoldparams *} procedure getoldparams;
    { called by initialize to read the existing ICS source file into
      memory. }
    var
      sourceline,dir,params : string;
      haveline,errors : boolean;
      d,currentdir : dirindex;

procedure readline;
```

```
{ called by getoldparams to read in a line from the ICS source
  file and add it to the list. }
begin
  readln(pintsource, sourceline);
  if commentline(sourceline)
    then addline(comments, sourceline)
  else if currentdir=comments
    then
      begin
        writeln('ICSP: Error - extraneous directive following END');
        errors:=true
      end
  else
    begin {Process the line as a ICS directive.}
      divide(sourceline, dir, params);
      {Resynch if the directive is not what we expect.}
      if dir<>convbinfile^.dirname[currentdir] then
        begin
          if haveline then currentdir:=succ(currentdir);
          while convbinfile^.omittable[currentdir] and
            (dir <> convbinfile^.dirname[currentdir]) do
            begin  {Skip over legally omitted directives.}
              addline(currentdir, omitflag);
              currentdir:=succ(currentdir)
            end
        end;
      {Now we should have the right directive.}
      if dir=convbinfile^.dirname[currentdir]
        then
          begin
            addline(currentdir, params);
            haveline:=true;
            if convbinfile^.dirtype[currentdir]=singleline then
              begin
                currentdir:=succ(currentdir);
                haveline:=false
              end
          end
        else {directive name doesn't match}
          begin
            write('ICSP: Error - directive misspelled,');
            writeln(' duplicated, missing, or out of order');
            errors:=true
          end
    end {ICS directive processing}
  end {readline};

begin {getoldparams}
  writeln('Reading ', filename, '...');
  for d:=firstdir to comments do stilldefault[d]:=false;
  errors:=false;
  currentdir:=firstdir;
  haveline:=false;
  while not (errors or eof(pintsource)) do readline;
  {Add an END directive if it's not there.}
  if currentdir=end_dir then
    begin
      addline(end_dir, '');
      currentdir:=comments
    end;
  if (not errors) and (currentdir<>comments)
    then
      begin
        writeln('ICSP: Error - incomplete ICS source file');
        errors:=true
      end;
  if errors then
    begin
      writeln(sourceline);
      writeln;
      writeln('ICSP has stopped due to an error in your ICS source file. ')
      write('For a more detailed list of errors, run this file through');
```

```
            writeln(' ICS --');
            writeln('      ics ',filename);
            exit(program)
          end;
        close(pintsource);
        infochanged:=false
      end {getoldparams};

{* getconversation *} procedure getconversation;
    {Reads the conversation text, menus, etc. in from the binary file,
     if it exists, or from the text file otherwise.}
    const blanks = '                              ';
    var
      havebin : boolean;
      d : dirindex;

procedure initconvbin(var havebin:boolean);
      begin
          {$I-}
      reset(convbinfile,binpathname);
      {$I+}
      if ioresult=0
        then havebin:=true
        else {Binary file doesn't exist. Create it.}
          begin
            {$I-}
            rewrite(convbinfile,binpathname);
            {$I+}
            if ioresult=0
              then havebin:=false
              else
                begin
                  internalerror('Can''t open binary menu file.');
                  exit(program)
                end
          end
end {initconvbin};

procedure getdirectiveinfo;
{Reads various info about each directive from the start of the
 conversation file.}
var
  d : dirindex;
  line : textline;
begin
with convbinfile^ do begin
  for d:=firstdir to comments do
    begin
      readln(convfile,line);
      if line[1]='M'
        then dirtype[d]:=multiline
        else dirtype[d]:=singleline;
      if line[2]='U'
        then uppercase[d]:=true
        else uppercase[d]:=false;
      if line[3]='O'
        then omittable[d]:=true
        else omittable[d]:=false;
      delete(line,1,4);
      divide(line,dirname[d],defaultparams[d]);
      if defaultparams[d]=omitmsg then defaultparams[d]:=omitflag;
    end;
end {with}
end {getdirectiveinfo};

procedure gettext;
{ called by getconversation to read in the text from ASCII menu file.
  It's needed only if the info isn't already available in binary form.}
var
  nextaddr : textaddress;
  line : textline;
```

```
procedure readparagraph;
{ called by gettext to read the next paragraph into memory and
  create a label node for it.  The line buffer already contains
  the label of the next paragraph. }
var i : integer;
begin
with convbinfile^ do begin
   nparag:=nparag+1;
   if nparag>=maxparag then internalerror('Too many menus.');
   delete(line,1,1);    {Delete the leading #.}
   stripblanks(line);
   if length(line)>plabellength then line:=copy(line,1,plabellength);
   with parag[nparag] do
      begin
         paraglabel:=line;
         startaddress:=nextaddr;
         nlines:=0;
         readln(convfile,line);
         while pos('#',line)<>1 do
            begin
               nlines:=nlines+1;
               txt[nextaddr]:=chr(length(line));
               nextaddr:=nextaddr+1;
               if line<>'' then
                  for i:=1 to length(line) do
                     begin
                        txt[nextaddr]:=line[i];
                        nextaddr:=nextaddr+1
                     end;
               readln(convfile,line)
            end {while}
      end {with parag[nparag]};
   end {with convbinfile^}
end {readparagraph};

begin {gettext}
with convbinfile^ do begin
   nextaddr:=1;
   nparag:=0;
   {Skip over any lines that precede the first label.}
   repeat readln(convfile,line) until pos('#',line)=1;
   while line<>'#end of text' do readparagraph;
end {with}
end {gettext};

begin {getconversation}
   writeln('Reading menus...');
   initconvbin(havebin);
   if havebin
      then
         begin
            get(convbinfile);
            close(convbinfile)
         end
      else
         begin
            {$I-}
            reset(convfile,asciipathname);
            {$I+}
            if ioresult<>0 then internalerror('Can''t open ASCII menu file.');
            getdirectiveinfo;
            gettext;
            close(convfile);
            writeln('Saving menus in binary form...');
            put(convbinfile);
            close(convbinfile,lock)
         end;
   {Get the blank-fill needed for each directive to keep the parameter margin
   even.}
   with convbinfile^ do for d:=firstdir to comments do
      blankfill[d]:=copy(blanks,1,pmargin-length(dirname[d]))
end {getconversation};
```

{* giveadvice *}

```
  procedure giveadvice;
  {Called by initialize after the user has read the ICSP intro.}
  begin
    writeln;
    writeln('Now you can select an action from ICSP''s main menu.');
    if newfile
      then
        begin
          writeln('If this is your first time using ICSP, you should probably choose');
          writeln('question mode (choice 1).')
        end
      else
        begin
          writeln('Since you are modifying an existing file, edit mode (choice 2)');
          writeln('may be more appropriate than question mode.')
        end
  end {giveadvice};
```

{* initialize *}

```
  begin {initialize}
    doheading;
    initfile(newfile);
    initvalues;
    getconversation;
    previousline:=PINTfirstline;
    if newfile
      then getdefaultparams
      else getoldparams;
    writeln;
    writeln('Do you want an introduction to ICSP?');
    repeat
      writeln('(Type "Y" for yes or "N" for no.)');
      readln(answerstring);
      if answerstring='y' then answerstring:='Y'
      else if answerstring='n' then answerstring:='N'
    until (answerstring='Y') or (answerstring='N');
    if answerstring='Y' then
      begin
        dointro;
        giveadvice
      end;
  end {initialize};
```

{*******************************************}
{* Procedure mainmenu starts here. *}
{*******************************************}

```
  procedure mainmenu;
  {Called by main program to display the main menu and perform the selected
  task.}
  var
    answernum : integer;
    answerstring : string;

procedure getanswer(nchoices:integer; questiontext:plabel);
    {Called after a question has been displayed. Prompts the user for a
    response until an acceptable one is supplied. questiontext is the
    label of the paragraph to be displayed if the user types a ?.
    If the answer is numeric, it is returned in answernum; otherwise
    it is returned in answerstring.}
    var gotanswer,moreinfo,trouble : boolean;
    begin
      gotanswer:=false;
      moreinfo:=questiontext<>noinfo;
      trouble:=false;
      repeat
        {Display the prompt.}
        if nchoices=yesno then writeln('Type Y or N.')
        else if nchoices=2 then writeln('Select by typing 1 or 2.')
```

```
            else if nchoices>2 then writeln('Select by entering a number ',
              'from 1 to ',nchoices:1,'.');
            if trouble then
              begin
                writeln('You may type ! to escape to the main menu.');
                if moreinfo then
                  writeln('You may type ? for more information.');
              end;
            {Get the answer.}
            readln(answerstring);
            stripblanks(answerstring);
            if answerstring='!' then exit(mainmenu)
            else if answerstring='?'
              then if questiontext=noinfo
                then writeln('ICSP has no more information about this topic.')
                else
                  begin
                    display(questiontext);
                    moreinfo:=false
                  end
            else if nchoices=yesno then
              begin
                capitalize(answerstring);
                gotanswer:=(answerstring='Y') or (answerstring='N')
              end
            else if nchoices=evennothing then gotanswer:=true
            else if nchoices=anyanswer then
              if answerstring<>''
                then gotanswer:=true
                else writeln('Please type in your information.')
            else
              begin
                answernum:=decimalnum(answerstring);
                gotanswer:=(answernum>=1) and (answernum<=nchoices)
              end;
            if not gotanswer then trouble:=true
          until gotanswer
        end {getanswer};

procedure replacedir(d:dirindex; strng:string);
        {Deletes all lines associated with directive d except for the first
        one, and stores strng as the parameter field of that first line.}
        begin
          copyparams(strng,firstline[d]);
          firstline[d]^.nextline:=finalline[d]^.nextline;
          firstline[d]^.nextline^.lastline:=firstline[d];
          finalline[d]:=firstline[d]
        end {replacedir};

function findstartdir : dirindex;
{called by questionmode or editmode to find out where in the file the user
wants to start.}
type dirnumbers = 0..ndirmax;
var
   i,ndir,left,right,halfway : dirnumbers;
   dirof : array [dirnumbers] of dirindex;  { number-to-dir conversion table }
   d:dirindex;
begin
   { Display the list of directives as a 2-column, numbered menu. }
   writeln('Where in the file do you want to start?');
   { Build a number-to-directive conversion table. }
   ndir:=0;
   for d:=firstdir to pred(end_dir) do
     begin
       ndir:=ndir+1;
       dirof[ndir]:=d;
     end;
   halfway:=(ndir+1) div 2;
   { Print out the directives. }
   with convbinfile^ do
     for left:=1 to halfway do
       begin
         write(left:2,') ',dirname[dirof[left]]);
```

```
            right:=left+halfway;
            if right<=ndir then
               write(blankfill[dirof[left]],right:2,') ',dirname[dirof[right]]);
            writeln;
         end;
      getanswer(ndir,noinfo);
      {Translate the number into a directive index.}
      d:=firstdir;
      if answernum>1 then for i:=2 to answernum do d:=succ(d);
         findstartdir:=d
      end {findstartdir};

procedure check_for_errors;
   { Called by mainmenu to invoke ICS to check the file for errors.}
   var
      listingname : string;
      ics_cmd_line : string;
   begin
      writeln;
      if badname(filename)
         then
            begin
         writeln('Sorry -- ICS cannot check this file for errors because the name');
         writeln('of the file does not end in ".is".');
            end
         else { name is ok }
            begin
               if infochanged then
                  begin
                     writeln('Saving latest changes...');
                     writefile(pintsource,true);
                     infochanged:=false;
                  end;
               listingname:=concat(copy(filename,1,length(filename)-3),
                  '.il');
               writeln('Invoking ICS to check for errors...');
               writeln;
               ics_cmd_line:=concat(ics_command,' -vc /dev/null ',
                  filename,' ');
               unitread(1,ics_cmd_line,0,0,11);
               if ioresult=0
                  then display('no_errors')
                  else
                     begin
                        display('some_errors');
         writeln('To obtain a listing (with error messages) in ',listingname,',');
         writeln('exit ICSP and type "ics -l ',filename,'".');
                        waitforcr;
                     end;
            end;
   end {check_for_errors};

{$I qmode.text}
   {$I emode.text}

{* mainmenu *} begin {mainmenu}
      display('mainmenu');
      getanswer(8,'mainmenu_info');
      case answernum of
         1 : questionmode;
         2 : editmode;
         3 : begin
                writefile(output,false);
                waitforcr
             end;
         4 : check_for_errors;
         5 : begin
                writefile(pintsource,true);
                infochanged:=false
             end;
```

```
      6 : begin
            if infochanged then
              begin
                writeln('Do you want to save your latest changes?');
                getanswer(yesno,noinfo);
                if answerstring='Y' then writefile(pintsource,true)
              end;
            done:=true
          end;
      7 : begin
            display('editmode_intro');
            waitforcr;
          end;
      8 : dointro
    end {case}
  end {mainmenu};

{********************}
{*** main program ***}
{********************} begin
  done:=false;
  initialize;
  while not done do mainmenu
end.
{********************}
{*** questionmode ***}
{********************} procedure questionmode;
{ Jim Keniston 4/9/82 }
{called by mainmenu}
type
  modifytype=(handsoff,replace,append);
var
  param : string;
  nextdir : dirindex;
  action : modifytype;

{*********************************************************}
{*** questionmode auxiliary procedures start here.    ***}
{*********************************************************} procedure findqstart(var startdir:dirindex);
  {called by questionmode to figure out where to start.}
  var
    juststarting : boolean;
    d : dirindex;
  begin
    {If we're just starting, start at the top.}
    juststarting:=true;
    for d:=firstdir to pred(end_dir) do
      if not stilldefault[d] then juststarting:=false;
    if juststarting
      then startdir:=firstdir
      else startdir:=findstartdir
  end {findqstart};

procedure writerange(startline,endline:linerecptr);
  {displays all the lines in the specified range.}
  var p : linerecptr;
  begin
    p:=startline;
    repeat
      writeline(output,p,true);
      p:=p^.nextline
    until p=endline^.nextline
  end {writerange};

procedure writedirective(d:dirindex);
  {displays all the lines associated with the specified directive.}
  begin
```

```
      writerange(firstline[d],finalline[d])
    end {writedirective};

function checkinfo(d:dirindex) : modifytype;
  {finds out whether user wants to modify directive d.}
  begin
    writedirective(d);
    if stilldefault[d] or omitted(firstline[d]) or
        ((firstline[d]=finalline[d]) and (firstline[d]^.paramlist^.paramstring
     ='NONE')) then checkinfo:=replace
    else if convbinfile^.dirtype[d]=singleline then
      begin
        writeln('Do you want to modify this line?');
        getanswer(yesno,noinfo);
        if answerstring='Y'
          then checkinfo:=replace
          else checkinfo:=handsoff
      end
    else {multi-line directive}
      begin
        display('multi_line_menu');
        getanswer(3,'multi_line_info');
        case answernum of
          1 : checkinfo:=handsoff;
          2 : checkinfo:=append;
          3 : checkinfo:=replace
        end {case}
      end {else}
  end {checkinfo};

procedure storeanswer(d:dirindex; answr:string);
{Stores the specified string as the first line for directive d.
 Also updates various flags and writes out the revised line.}
begin
  copyparams(answr,firstline[d]);
  stilldefault[d]:=false;
  writeline(output,firstline[d],false);
  nextdir:=succ(d)
end {storeanswer};

procedure morelines(d:dirindex; any_more,prompt:plabel);
{Adds lines for directive d, using the prompting paragraphs any_more
and prompt.}
var
  newline : linerecptr;
  no_more : boolean;
begin
  no_more:=false;
  repeat
    {Find out whether users wants to add any more lines.}
    display(any_more);
    getanswer(yesno,noinfo);
    if answerstring='Y'
      then
        begin {Yes.  Get a line.}
          display(prompt);
          getanswer(anyanswer,noinfo);
          insertline(finalline[d],newline);
          finalline[d]:=newline;
          newline^.directive:=d;
          copyparams(answerstring,newline)
        end
      else no_more:=true
  until no_more
end {morelines};
procedure zero_or_more_lines(d:dirindex; any_at_all,info_parag,prompt,
  any_more:plabel);
{Used for directives such as LIBRARY or MODULE, where there may be
one or more lines of info or a single line of "NONE".}
begin
  action:=checkinfo(d);
  if action=replace then
    begin
```

```
            {Find out whether user wants to specify any info at all.}
            display(any_at_all);
            getanswer(yesno,info_parag);
            if answerstring='Y'
              then
                begin
                  {Get the first line.}
                  display(prompt);
                  getanswer(anyanswer,noinfo);
                  replacedir(d,answerstring);
                  {Go get more lines.}
                  morelines(d,any_more,prompt)
                end
              else replacedir(d,'NONE')
          end
        else if action=append then morelines(d,any_more,prompt);
        if action<>handsoff then writedirective(d);
        nextdir:=succ(d)
      end {zero_or_more_lines};

procedure one_or_more_lines(d:dirindex; first_prompt,info_parag,
      any_more,second_prompt:plabel);
    {Used for directives such as INSTRUCTIONS_ROM, where there always
    has to be at least one line of information.}
    begin
      {Do nothing if action=handsoff.}
      if action=replace then
        begin
          {Get the first line.}
          display(first_prompt);
          getanswer(anyanswer,info_parag);
          replacedir(d,answerstring);
          {Get the rest of the lines.}
          morelines(d,any_more,second_prompt)
        end
      else if action=append then morelines(d,any_more,second_prompt)
    end {one_or_more_lines};

{*********************************************************}
{*** Directive-specific procedures begin here. ***}
{*********************************************************}

{* PASCAL_CONFIGURATION *} procedure do_pas_con;
  begin
    if checkinfo(pas_con)=replace then
      begin
        display('pas_con');
        getanswer(anyanswer,'pas_con_info');
        storeanswer(pas_con,answerstring)
      end;
    nextdir:=succ(pas_con)
  end {do_pas_con};

{* HARDWARE_CONFIGURATION *} procedure do_hw_con;
  begin
    writeline(output,firstline[hw_con],true);
    display('hw_con');
    getanswer(4,noinfo);
    case answernum of
      1 : param:='8086';
      2 : param:='8088';
      3 : param:='8086-8087';
      4 : param:='8088-8087'
    end;
    storeanswer(hw_con,param)
  end {do_hw_con};

{*** INSTRUCTIONS_ROM ***}
{*** CONSTANTS ROM     ***}
```

{* GLOBAL_VAR_RAM *}
{* HEAP_STACK_RAM *}

```
  procedure do_memory_map;
  {Handles directives INSTRUCTIONS_ROM, CONSTANTS_ROM, GLOBAL_VAR_RAM, and
   HEAP_STACK_RAM -- all at the same time.}
  var
    approved : boolean;
    d : dirindex;
  begin
    writerange(firstline[instr_rom],finalline[heap_ram]);
    writeln('These directives assign address ranges to the different types',
      ' of code in your');
    writeln('program.');
    approved:=false;
    repeat
      display('memory_menu');
      getanswer(6,noinfo);
      case answernum of
        1 : approved:=true;
        2,3,4 : begin
                  if answernum=2 then d:=instr_rom
                  else if answernum=3 then d:=const_rom
                  else d:=global_ram;
                  action:=checkinfo(d);
                  one_or_more_lines(d,'memory_prompt_1','range_syntax',
                    'any_more_memory','memory_prompt_2')
                end;
        5 : begin
              writeln('Enter a range of hex addresses.');
              getanswer(anyanswer,'range_syntax');
              replacedir(heap_ram,answerstring)
            end;
        6 : display('memory_explanation')
      end; {case}
      if not approved then
        begin
          writeln('The memory map now looks like this:');
          writerange(firstline[instr_rom],finalline[heap_ram])
        end
    until approved;
    nextdir:=succ(heap_ram)
  end {do_memory_map};
```

{* RESET_MEMORY *}

```
  procedure do_reset_mem;
  begin
    writeline(output,firstline[reset_mem],true);
    display('reset_mem');
    getanswer(2,noinfo);
    if answernum=1
      then param:='YES'
      else param:='NO';
    storeanswer(reset_mem,param);
  end {do_reset_mem};
```

{* SERVICE_CALLS *}

```
) procedure do_svcs;
  var
    approved : boolean;
    srbvector,portrange : string;
  begin
    if checkinfo(svcs)=replace then
      begin
writeln('Does your program use service calls?  (I/O procedures such as');
writeln('READLN and WRITELN use service calls.)');
        getanswer(yesno,'svc_info');
        if answerstring='N'
          then storeanswer(svcs,'NONE')
          else
            begin
```

```
                        portrange:='OFFF0H';
                        srbvector:='40H';
                        approved:=false;
                        repeat
writeln('The SRB vector starts at ',srbvector,'.');
writeln('The SVC port range starts at ',portrange,'.');
                             display('svc_menu');
                             getanswer(4,noinfo);
                             case answernum of
                                 1 : approved:=true;
                                 2 : begin
writeln('Enter the starting address of the SRB vector as a hex number.');
                                     getanswer(anyanswer,noinfo);
                                     srbvector:=answerstring;
                                     capitalize(srbvector)
                                 end;
                                 3 : begin
writeln('Enter the first port number in the SVC port range.  The number');
writeln('should be of the form 0xxx0H, where x is a hex digit.');
                                     getanswer(anyanswer,noinfo);
                                     portrange:=answerstring;
                                     capitalize(portrange)
                                 end;
                                 4 : display('vector_port_info')
                             end {case}
                        until approved;
                        if (portrange='OFFF0H') and (srbvector='40H')
                           then storeanswer(svcs, 'DEFAULT')
                           else storeanswer(svcs,concat(srbvector,',',portrange))
                    end {else}
              end {if checkinfo};
     nextdir:=succ(svcs)
  end {do_svcs};

{* SOFTWARE_CONFIGURATION *} procedure do_sw_con;
  begin
     if checkinfo(sw_con)=replace then
        begin
writeln('What is the pathname of the file that contains the object code for');
writeln('your main program?  (Example: /usr/john/controller/main.po)');
           getanswer(anyanswer, 'sw_con_info');
           storeanswer(sw_con,answerstring)
        end;
     nextdir:=succ(sw_con)
  end {do_sw_con};

{* FILE_SUPPORT *} procedure do_file_support;
  begin
     if checkinfo(file_sup)=replace then
        begin
           display('file_sup');
           getanswer(yesno,noinfo);
           if answerstring='N'
              then storeanswer(file_sup, 'NONE')
              else
                 begin
                    display('file_lib');
                    getanswer(yesno, 'file_lib_info');
                    if answerstring='Y'
                       then storeanswer(file_sup, 'DEFAULT')
                       else
                          begin
                             display('get_file_lib');
                             getanswer(anyanswer,noinfo);
                             storeanswer(file_sup,answerstring);
                          end;
                 end;
        end;
     nextdir:=succ(file_sup)
  end {do_file_sup};
```

```
{* INTERRUPT_CONFIGURATION *} procedure do_in_con;
   var
     p : linerecptr;
     d : dirindex;
     clobbering : boolean;
   begin
     writeline(output,firstline[intrpt_con],true);
     writeln('Does your program handle interrupts?');
     getanswer(yesno,noinfo);
     if answerstring='Y'
        then
           begin
              display('ram_or_rom');
              getanswer(2,noinfo);
              if answernum=1
                 then param:='ROM'
                 else param:='RAM';
              storeanswer(intrpt_con,param)
           end
        else {no interrupts}
           begin
writeln('Since there are no interrupts, the following directives will be',
' omitted:');
              writerange(firstline[intrpt_types],finalline[vector_list]);
              {Check to see whether we're clobbering any info.}
              clobbering:=false;
              for d:=intrpt_types to vector_list do
                  if not omitted(firstline[d]) then clobbering:=true;
              if clobbering {Some info has already been stored there.}
                 then
                    begin
                       writeln('Do you have any objections?');
                       getanswer(yesno,noinfo);
                       if answerstring='Y'
                          then
                             begin
                                nextdir:=intrpt_con;
writeln('In that case, your program must handle interrupts after all.');
writeln('Try again.');
                             end
                          else {no objections to clobbering existing info.}
                             begin
                                for d:=intrpt_con to vector_list do
                                    replacedir(d,convbinfile^.defaultparams[d]);
                                writerange(firstline[intrpt_con],finalline[vector_list]);
                                nextdir:=restart_label
                             end
                    end {clobbering}
                 else {not clobbering anything -- info is already correct}
                    begin
                       replacedir(intrpt_con,'NONE');
                       nextdir:=restart_label
                    end
           end {of no-interrupts case}
   end {do_in_con};

{* INTERRUPT_TYPES_USED *} procedure do_in_types;
   begin
     action:=checkinfo(intrpt_types);
     if action=replace then display('intrpt_types_intro');
     one_or_more_lines(intrpt_types,'intrpt_types_prompt','intrpt_types_info',
        'any_more_types','intrpt_types_prompt');
     if action<>handsoff then writedirective(intrpt_types);
     nextdir:=succ(intrpt_types)
   end {do_in_types};

{*** SAVE_FLOATING_POINT ***}
{*** EXCEPT_FOR              ***}
```

```
procedure do_save_float;
{Handles both SAVE_FLOATING_POINT and EXCEPT_FOR.}
var word : string[10];
begin
  writerange(firstline[save_float],firstline[except_list]^.lastline);
  action:=checkinfo(except_list);
  if action=replace then
    begin
      writeln('Does your program use real (floating point) numbers?');
      getanswer(yesno,noinfo);
      if answerstring='N'
        then
          begin
            replacedir(save_float,'NO');
            replacedir(except_list,'NONE')
          end
        else
          begin
            display('save_float_intro');
            getanswer(4,'save_float_info');
            case answernum of
              1 : begin
                    replacedir(save_float,'NO');
                    replacedir(except_list,'NONE')
                  end;
              2,3 : begin
                      if answernum=2
                        then
                          begin
                            word:=' DO ';
                            replacedir(save_float,'NO')
                          end
                        else
                          begin
                            word:=' DO NOT ';
                            replacedir(save_float,'YES')
                          end;
writeln('Please list the interrupt types that',word,'require ICS to save and')
writeln('restore floating point registers.  (You may use more than one line.')
                      one_or_more_lines(except_list,'except_prompt',
                        noinfo,'any_more_except','except_prompt')
                    end;
              4 : begin
                    replacedir(save_float,'YES');
                    replacedir(except_list,'NONE');
                  end
            end {case}
          end {have fp}
    end {action=replace}
    else if action=append then morelines(except_list,'any_more_except',
      'except_prompt');
    if action<>handsoff
      then writerange(firstline[save_float],finalline[except_list]);
    nextdir:=succ(except_list)
  end {do_save_float};

{* FAULT_NOTIFICATION *} procedure do_fault_not;
begin
  if checkinfo(fault_not)=replace then
    begin
      display('fault_not_menu');
      getanswer(3,'fault_not_info');
      case answernum of
        1 : storeanswer(fault_not,'STOP');
        2 : storeanswer(fault_not,'PASCAL_RTS');
        3 : begin
writeln('What is the name of your routine for handling unexpected interrupt ',
'types?');
              getanswer(anyanswer,'default_name_info');
              param:=answerstring;
              display('own_code_menu');
```

```
                    getanswer(2,noinfo);
                    if answernum=1
                       then storeanswer(fault_not,concat(param,',OWN_CODE'))
                       else storeanswer(fault_not,param)
                 end {case 3}
            end {case}
         end; {action=replace}
      nextdir:=succ(fault_not)
   end {do_fault_not};

{* VECTOR *} procedure do_vector_list;
   var any_more : boolean;

procedure get_the_vector(another:string);
         {Gets the information for a VECTOR line.  "another" is either the string
         "another" or the string "an".}
         var
            routinename,typeslist : string;
         begin
            writeln('Enter the name of ',another,' interrupt service routine.');
            getanswer(anyanswer,noinfo);
            routinename:=answerstring;
            writeln('Please list the interrupt types that are handled by this routine.');
            getanswer(anyanswer,'intrpt_types_prompt');
            typeslist:=answerstring;
            display('own_code_menu');
            getanswer(2,noinfo);
            if answernum=1
               then param:=concat(routinename,',OWN_CODE,',typeslist)
               else
                  begin
                     display('in_line_menu');
                     getanswer(2,noinfo);
                     if answernum=1
                        then param:=concat(routinename,',IN_LINE,',typeslist)
                        else param:=concat(routinename,',',typeslist)
                  end;
         end {get_the_vector};

procedure get_another_vector(var any_more:boolean);
      var newline : linerecptr;
      begin
         writeln;
         writeln('Do you have any more interrupt service routines?');
         getanswer(yesno,noinfo);
         if answerstring='Y'
            then
               begin
                  any_more:=true;
                  get_the_vector('another');
                  insertline(finalline[vector_list],newline);
                  finalline[vector_list]:=newline;
                  newline^.directive:=vector_list;
                  copyparams(param,newline);
                  writeline(output,finalline[vector_list],false)
               end
            else any_more:=false
      end {get_another_vector};

begin {do_vector_list}
      action:=checkinfo(vector_list);
      if action=replace then
         begin
            display('vector_intro');
            getanswer(yesno,noinfo);
            if answerstring='N'
               then storeanswer(vector_list,'NONE')
               else
                  begin
                     get_the_vector('an');
```

```
                replacedir(vector_list,param);
                writeline(output,firstline[vector_list],false);
                repeat
                   get_another_vector(any_more)
                until not any_more
              end
        end {action=replace}
      else if action=append then
        repeat
           get_another_vector(any_more)
        until not any_more;
      if action<>handsoff then writedirective(vector_list);
      nextdir:=succ(vector_list)
    end {do_vector_list};

{* RESTART_LABEL *} procedure do_restart_label;
  begin
     if checkinfo(restart_label)=replace then
        begin
           display('restart_label');
           getanswer(yesno,'restart_info');
           if answerstring='N'
              then param:='PASCAL_BEGIN'
              else
                 begin
                    display('get_restart_label');
                    getanswer(anyanswer,noinfo);
                    param:=answerstring
                 end;
           storeanswer(restart_label,param)
        end;
     nextdir:=succ(restart_label)
  end {do_restart_label};

{* questionmode *} begin {questionmode}
   findqstart(nextdir);
   repeat
      writeln;
      case nextdir of
         pas_con : do_pas_con;
         hw_con : do_hw_con;
         instr_rom,const_rom,global_ram,heap_ram : do_memory_map;
         reset_mem : do_reset_mem;
         svcs : do_svcs;
         sw_con : do_sw_con;
         mod_list : zero_or_more_lines(mod_list,'any_more_modules','module_info',
                       'module_prompt','any_more_modules');
         lib_list : zero_or_more_lines(lib_list,'any_libraries','library_info',
                       'library_prompt','any_more_libraries');
         file_sup : do_file_sup;
         intrpt_con : do_in_con;
         intrpt_types : do_in_types;
         save_float,except_list : do_save_float;
         fault_not : do_fault_not;
         vector_list : do_vector_list;
         restart_label : do_restart_label
      end
   until nextdir=end_dir;
writeln;
writeln('You have reached the end of the ICS source file.  Now you can');
writeln('select an action (edit, quit, etc.) from ICSP''s main menu. ')
end {questionmode};
```

```
{******************************************}
{*** procedure editmode starts here. ***}
{******************************************} procedure editmode;
{ Jim Keniston 3/11/82 }
var
  d : dirindex;
  currentline : linerecptr;
  nstring : string;
  nlines : integer;

procedure travel(nlines:integer; direction:char);
  {Called by editmode to move the current-line pointer.}
  begin {travel}
    if direction='+'
      then
        begin
          while (nlines>0) and (currentline<>PINTlastline) do
            begin
              currentline:=currentline^.nextline;
              nlines:=nlines-1;
            end;
          if currentline=PINTlastline then
            begin
              writeln('** end of file **   You can type ? for help.');
              currentline:=PINTlastline^.lastline
            end
        end {forward travel}
      else
        begin {backward travel}
          while (nlines>0) and (currentline<>PINTfirstline) do
            begin
              currentline:=currentline^.lastline;
              nlines:=nlines-1;
            end;
          if currentline=PINTfirstline then
            begin
              writeln('** beginning of file **   You can type ? for help.');
              currentline:=PINTfirstline^.nextline
            end
        end
  end {travel};

procedure verifycomment(var strng:string);
  begin
    if not commentline(strng) then
      begin
        writeln('** warning - ICSP is adding a ; to make this line a comment.')
        strng:=concat(';',strng)
      end
  end {verifycomment};

procedure substitute(strng:string);
  {Substitutes what the user has typed (strng) into the current line.}
  begin
    if currentline^.directive in [comments,end_dir] then verifycomment(strng);
    copyparams(strng,currentline)
  end {substitute};

procedure makeline(d:dirindex; previousline:linerecptr);
  {Adds a line of type d into the list.  If the current line is a dummy
   (omitted) line, no line is added (unless it's a comment) -- the
   dummy line is just replaced. }
  var newline : linerecptr;
  begin
    if (convbinfile^.dirtype[d]=singleline) and not omitted(currentline)
      then writeln('ICSP: Error - ',
        'There must be at most one ',convbinfile^.dirname[d],' directive.')
      else begin
```

```
      if d=comments
        then
          begin
            writeln('Enter comment line:');
            getanswer(evennothing,noinfo);
            verifycomment(answerstring);
          end
        else
          begin
            write(convbinfile^.dirname[d],blankfill[d]);
            getanswer(anyanswer,noinfo);
            if omitted(currentline)
              then newline:=currentline {replace dummy line}
              else insertline(previousline,newline);
            if firstline[d]=newline^.nextline then firstline[d]:=newline;
            if finalline[d]=previousline then finalline[d]:=newline
          end;
      copyparams(answerstring,newline);
      newline^.directive:=d;
      currentline:=newline
    end
end {makeline};

procedure deleteline(p:linerecptr);
{Deletes the line pointed to by p.}
var
  d : dirindex;
  q : linerecptr;
begin
  d:=p^.directive;
  if omitted(p) then
    begin
      writeln('You do not need to delete this line.  It will not appear in');
      writeln('your file unless you type something into the parameter field.')
    end
  else if (d<>comments) and (firstline[d]=finalline[d]) then
    if convbinfile^.omittable[d] then copyparams(omitflag,p)
    else writeln('ICSP: Error - This directive must appear at least once.')
  else begin
    infochanged:=true;
    stilldefault[d]:=false;
      if p^.nextline=PINTlastline
        then currentline:=p^.lastline
        else currentline:=p^.nextline;
      {Remove the links pointing to this line.}
      p^.lastline^.nextline:=p^.nextline;
      p^.nextline^.lastline:=p^.lastline;
      {Check to see whether this is the first or last line for directive d.}
      if d<>comments then
        if firstline[d]=p then
          begin
            q:=p^.nextline;
            while q^.directive=comments do q:=q^.nextline;
            firstline[d]:=q
          end
        else if finalline[d]=p then
          begin
            q:=p^.lastline;
            while q^.directive=comments do q:=q^.lastline;
            finalline[d]:=q
          end
    end
  end {deleteline};

{* editmode *} begin {editmode}
  {Use the menu to decide where to start.}
  currentline:=firstline[findstartdir];
  repeat
```

```
{ Print the current line and position the cursor for a response. }
writeline(output,currentline,true);
d:=currentline^.directive;
if d<>comments then write(' ':pmargin);
{ Read and process the answer. }
getanswer(evennothing,'editmode_intro');
if answerstring='--' then currentline:=PINTfirstline^.nextline
else if answerstring='++' then currentline:=PINTlastline^.lastline
else if answerstring='' then travel(1,'+') {line is approved}
else if answerstring[1] in ['-','+'] then
   begin
      nstring:=answerstring;
      delete(nstring,1,1); {Delete the - or +.}
      if nstring='' then nlines:=1
      else nlines:=decimalnum(nstring);
      if nlines = -1
         then substitute(answerstring) {not a command after all}
         else travel(nlines,answerstring[1])
   end
else if (answerstring='A') or (answerstring='a')
   then makeline(d,currentline)
else if (answerstring='AC') or (answerstring='ac')
   then makeline(comments,currentline)
else if (answerstring='I') or (answerstring='i')
   then makeline(d,currentline^.lastline)
else if (answerstring='IC') or (answerstring='ic')
   then makeline(comments,currentline^.lastline)
else if (answerstring='D') or (answerstring='d')
   then deleteline(currentline)
else substitute(answerstring)
) until false {until user types a !}
end {editmode};
SL   PASCAL_CONFIGURATION      Default Configuration
SL   HARDWARE_CONFIGURATION    8086
MU   INSTRUCTIONS_ROM          [00060H,07FFFH]
)MU  CONSTANTS_ROM             [08000H,08FFFH]
MU   GLOBAL_VAR_RAM            [09000H,0D7FFH]
SU   HEAP_STACK_RAM            [0D800H,0FFFFH]
SU   RESET_MEMORY              NO
SU   SERVICE_CALLS             DEFAULT
SL   SOFTWARE_CONFIGURATION    NONE
ML   MODULE                    NONE
ML   LIBRARY                   NONE
SL   FILE_SUPPORT              DEFAULT
SU   INTERRUPT_CONFIGURATION   NONE
MUO  INTERRUPT_TYPES_USED      <omitted>
SUO  SAVE_FLOATING_POINT       <omitted>
MUO  EXCEPT_FOR                <omitted>
SUO  FAULT_NOTIFICATION        <omitted>
MLO  VECTOR                    <omitted>
SL   RESTART_LABEL             PASCAL_BEGIN
SL   END
ML   ;                         ;
ICSP conversation (menu) file 4/13/82
Copyright (C) 1982 Tektronix, Inc.
#mainmenu

ICSP MENU

1) Enter question mode
2) Enter edit mode
3) Display the file
4) Check the file for errors
5) Save the current copy of the file
6) Quit
7) Display an introduction to edit mode
8) Display an introduction to ICSP
Remember: You can type "?" for more info or "!" to return to this menu.
#mainmenu_info
```

1) Enter question mode
   In question mode, ICSP asks you questions and modifies the file
   according to your answers. To exit from question mode, you type "!".
2) Enter edit mode
   In edit mode, you can scan the file and add, delete, or replace
   lines of text. For a description of edit mode, select item 7 in
   this menu.
3) Display the file
   ICSP keeps a copy of the file in memory and modifies this copy
   according to your instructions. This option displays the copy of
   the file that is in memory, not the disk file itself.
4) Check the file for errors
   ICSP invokes ICS to check the disk file for errors. If the disk file
   doesn't include your latest changes, it is updated before ICS is
   invoked.
5) Save the current copy of the file
   The copy of the file that is in memory is written out to disk.
6) Quit
   ICSP terminates. If the disk file doesn't include your latest changes,
   you are given the option of updating the disk file.
7) Display an introduction to edit mode
   This introduction includes a summary of edit mode commands.
8) Display an introduction to ICSP
   This is the same 4-screen introduction you had a chance to see earlier.
multi_line_menu
What do you want to do about this information?
1) Leave it unchanged.
2) Add more lines.
3) Throw away this information and get new information for this directive.
multi_line_info
If you only want to alter some of the information, try edit mode.
(Type ! to escape to the main menu.)
no_errors Congratulations -- no errors! Now back to the ICSP menu...
some_errors Welcome back to ICSP. It looks like ICS found some errors in the
file we've created.

If you understand what's wrong with your file, you might try using
edit mode to revise whatever lines are in error. If there are
error messages you don't understand, check the Prototype Setup
section of your Compiler Users Manual for explanations. Or, you
can use question mode to gain more information about the problem
areas in your file.

screen1
INTRODUCTION TO ICSP
ICSP creates or modifies an ICS source file according to your instructions.
From this source file, ICS can produce:
o  an object file that contains code to initialize your Pascal program
   and interrupt vectors; and
o  a linker command file that tells the linker how to combine the object
   files you have produced using the Pascal compiler, ICS, and (possibly)
   the 8086/8088 assembler.

INFORMATION YOU PROVIDE TO ICSP
The ICS source file provides the following types of information about
you program:
o  HARDWARE CONFIGURATION -- what kind of chips you are using; which
   areas of memory are to be RAM and which are to be ROM; whether
   your program uses service calls.
o  SOFTWARE CONFIGURATION -- the names of the object files that make up
   your program.
o  INTERRUPT CONFIGURATION -- what interrupt types (if any) your program
   must handle; the names of your interrupt service routines; how these
   routines are to be initiated.
In order to use ICSP effectively, you should have this kind of information
available.
screen2
* SAMPLE ICS SOURCE FILE *

PASCAL_CONFIGURATION    Default Configuration ;Here is what an ICS source

```
HARDWARE_CONFIGURATION   8086                  ;file looks like.  Each line
INSTRUCTIONS_ROM         [00060H,07FFFH]       ;contains an ICS directive
CONSTANTS_ROM            [08000H,08FFFH]       ;(e.g. MODULE) and one or
GLOBAL_VAR_RAM           [09000H,0D7FFH]       ;more parameters (e.g. NONE).
HEAP_STACK_RAM           [0D800H,0FFFFH]       ;The parameters shown here are
RESET_MEMORY             NO                    ;defaults: if you don't pro-
SERVICE_CALLS            DEFAULT               ;vide information about a
SOFTWARE_CONFIGURATION   NONE                  ;directive, its default para-
MODULE                   NONE                  ;meter is used.
LIBRARY                  NONE                  ;A semicolon (;) marks the
FILE_SUPPORT             DEFAULT               ;beginning of a comment.
INTERRUPT_CONFIGURATION  NONE
INTERRUPT_TYPES_USED     <omitted>             ;Certain directives that deal
SAVE_FLOATING_POINT      <omitted>             ;with interrupts are omitted
EXCEPT_FOR               <omitted>             ;if your program doesn't use
FAULT_NOTIFICATION       <omitted>             ;interrupts.
VECTOR                   <omitted>
RESTART_LABEL            PASCAL_BEGIN
END
#screen3
```

HOW ICSP WORKS

ICSP has two modes of operation: question mode and edit mode.

In question mode, ICSP asks you questions and uses your answers to
create the ICS source file.  If you are using ICSP for the first time,
you should use question mode; it will help you learn the meaning of
each ICS directive and its parameters.

In edit mode, you can scan through the ICS source file and make
simple modifications.  You can request a more detailed description
of edit mode later.

In either mode, ICSP displays the old (or default) parameters of a
directive before it is modified, and displays its new parameters
afterward.

? AND !

In either mode, any time ICSP is waiting for you to type something,
you can type a "?" or a "!".  "?" tells ICSP to provide more information
about what ICSP expects you to type in.  "!" brings up a menu of tasks
that you can ask ICSP to perform.
screen4
ERROR CHECKING In question mode, ICSP tries to give you enough information to ensure
that the file you create has the right syntax and is logically consistent.
To verify that your file is indeed correct, you can select the "Check
file for errors" option from the main menu.  ICSP invokes ICS to scan
the file; ICS reports any errors and also records them in a file.

ALTERNATIVES TO ICSP

ICSP is meant to make it easier to create and modify ICS source files.
But once you are familiar with the ICS language, you might find it
just as easy to use a standard text editor to edit your ICS file.

SYNTAX CONSIDERATIONS

Any hexadecimal number you type must begin with a decimal digit and end with
an "H". (e.g. 0FFFFH, not FFFF)

A range of numbers has the form [lonum,hinum] -- e.g. [25,30] means
25 through 30 (decimal) and [0H,0FFH] means 0 through FF (hexadecimal).
editmode_intro
EDIT MODE Edit mode has two uses:
   1) Once you have created a file (e.g. using question mode), you can
      use edit mode to scan through the file and make corrections.
   2) Once you are familiar with the ICS language, you can use edit
      mode to help you build new files from the standard ICS framework.

In edit mode, ICSP displays a line from the ICS source file. You may
press the RETURN key to approve that line and go to the next one, or you
can type in a new parameter field to replace the one shown.

Here is a summary of what you can do in edit mode:

```
command         function
--------        --------
   !            exit edit mode and return to the main menu
   ?            display this list of edit mode commands
[return]        proceed to next line
[text]          replace the text in the parameter field
   --           move to the beginning of the file
   ++           move to the end of the file
   -n           move n lines back in the file
   +n           move n lines forward in the file AC           add a comment after the current line
   IC           insert a comment before the current line
   D            delete the current line For directives that can occur more than once:

A            add a directive after the current line
   I            insert a directive before the current line
``` pas_con
Please type in a title for your ICS source file.
pas_con_info
This title may be as long as you want and may contain any characters
except double quotes ("").
hw_con
Which of the following terms best describes the type of processor(s)
you are using?
1) 8086
2) 8088
3) 8086 with 8087
4) 8088 with 8087
memory_explanation
   Your program contains "absolute" code and "relocatable" code.
   Absolute code must be placed at specific locations in memory.  (For
example, interrupt vectors must reside in locations 0-3FF.)
   The code produced by the Pascal compiler is relocatable.
ICS can direct the linker to place relocatable code wherever in memory
you specify.

The following types of code can be stored in ROM:
INSTRUCTIONS_ROM -- executable code
CONSTANTS_ROM -- other code that doesn't change during program execution --
   for example, literal strings and numeric constants The following types of code must be stored in RAM:
GLOBAL_VAR_RAM -- variables from the outer (PROGRAM or MODULE) level of
   your program
HEAP_STACK_RAM -- the area occupied by the stack and the heap.  The stack
   starts at the high end of this area and grows downward, and the heap
   starts at the low end and grows upward.  The stack holds parameters,
   return addresses, and local variables from your procedures.  The heap
   holds linked-list variables created with the standard procedure NEW.

For more information about these four ICS directives, including an
explanation of assembly language programming considerations, consult the
Prototype Setup section of your Compiler Users Manual.
memory_menu
You can:
1) approve these allocations
2) change INSTRUCTIONS_ROM
3) change CONSTANTS_ROM
4) change GLOBAL_VAR_RAM
5) change HEAP_STACK_RAM
6) display ICSP's explanation of these terms memory_prompt_1
Enter one or more ranges of hex addresses.  (You may use more than one line.)
memory_prompt_2
Enter one or more ranges of hex addresses.
any_more_memory
Do you have another line of address ranges for this directive?
range_syntax
   Any hexadecimal number you type must begin with a decimal digit and end
with an "H". (e.g. 0FFFFH, not FFFF)
   A range of numbers has the form [lonum,hinum], e.g. [25,30] means
25 through 30 (decimal) and [0H,0FFH] means 0 through FF (hexadecimal).
Two or more ranges are separated by commas: [0H,3FFH],[1000H,17FFH]
reset_mem
How does your prototype handle a RESET?
1) Memory at locations FFFF0-FFFFF contains the first instruction
   to be executed after the RESET.
2) Special hardware provides the first instruction to be executed.
   (Type "2" if your program does not handle RESETs at all.)
svc_info
A service call is a request by your program for service from your MDL's
operating system (OS/40 or DOS/50).  Pascal I/O statements (e.g., READ,
READLN, WRITE, WRITELN) are translated into service calls.  If all your
program's I/O is handled by your prototype, you can probably answer "N";
otherwise, answer "Y".  For more information on service calls, refer to
your 8540 or 8550 System Users Manual.
vector_port_info
   A service call (SVC) begins when your program executes an OUT instruction
to one of a selected range of 8 I/O ports.  The port number directs the
operating system (DOS/50 or OS/40) to an "SRB pointer", which points to
the SRB (Service Request Block) that describes the service to be performed.
   The table of 8 SRB pointers is called the "SRB vector".  The SRB vector
ordinarily occupies bytes 40-5F of memory.  If your program needs this
area of memory for other uses (such as interrupt vectors), you may select
a different location for the SRB vector.  Similarly, if your program uses
I/O ports in the default SVC port range (FFF0-FFF7), you can select a
different port range to be used for SVCs.
   SVCs are explained in detail in the 8540 and 8550 System Users Manuals.
svc_menu
You can:
1) approve these settings
2) change the location of the SRB vector
3) change the SVC port range
4) display ICSP's explanation of these terms
sw_con_info
This is the object file produced when you compiled your main program
(the one with the PROGRAM statement).  You may also specify an object
file produced by the assembler, or you can type "NONE".
any_more_modules
Are there any other object files to be linked with your program?
module_info
Such a file could be:
   o the object file produced when you compile a Pascal module that
     begins with a MODULE heading; or
   o an object file produced by the assembler.
module_prompt
Type the pathname of an object file to be linked.
(Example: /usr/john/controller/meltdown.po)
any_libraries
Does your program use any routines from libraries other than the standard
Pascal run-time support libraries?

NOTE

If you have created your own I/O handling library (to replace
pas.posi.scsd), do not include that library here.  That library
should be specified later with the FILE_SUPPORT directive.

library_info
You can use the library generator (libgen) to create libraries of your
own Pascal or assembly language routines.  If you haven't used libgen, you
should probably answer "N".
library_prompt Type the pathname of a library used by your program.
(Example: /usr/john/controller/lib)
any_more_libraries
Does your program use routines from any other libraries?
file_sup
Does your program use any of the following procedures or functions:
READ, READLN, WRITE, WRITELN, REWRITE, RESET, GET, PUT, PURGE, ASSIGN,
PAGE?
file_lib
Do you want your program to use the standard library of Pascal I/O-handling
routines?
file_lib_info
If you type "Y", the I/O-handling routines will be taken from pas.posi.scsd.
If you type "N", you must provide a library of routines to replace
pas.posi.scsd.
get_file_lib
Please type the pathname of your library of I/O-handling routines.
(Example: /usr/john/controller/io.lib)
get_io_lib
Type the pathname of your I/O library.
(Example: /usr/john/controller/iolib)
ram_or_rom
Which of the following sentences best describes how your interrupt
vectors are loaded into locations 0-3FF?
1) Locations 0-3FF are in ROM.
2) Locations 0-3FF are in RAM. The interrupt vectors are copied into
   locations 0-3FF during program initialization.
intrpt_types_intro
Please list the interrupt types (0-255) that your program will have to
deal with. (You may use more than one line.)
intrpt_types_prompt
Enter one or more decimal numbers or ranges of decimal numbers.
Example: 0,2,4,[16,31],33,[128,143]
intrpt_types_info
   Your program does not have to have an interrupt service routine for
each of these types. Using the FAULT_NOTIFICATION directive, you can
have ICS provide a routine to handle unexpected types, or you can
designate a default routine of your own. A 4-byte interrupt vector is
created for each of the interrupt types you list.
any_more_types
Do you want to add another line of interrupt types?
save_float_intro
For any interrupt type (0-255), you can have ICS automatically save
your program's floating point registers before your interrupt service
routine is called and restore the registers after your routine is done.
Of the interrupt types handled by your program, how many require ICS
to save and restore floating point registers?
1) none
2) fewer than half
3) half or more
4) all
save_float_info
   If you elect to save floating point registers, the internal Pascal
variable FPSWQQ is saved on the stack before your interrupt service
routine is called and restored afterward. If you have an 8087, your
program will also execute an FNSAVE instruction before the call and an
FRSTOR instruction afterward.
   In general, you only need to save floating point registers if the
interrupt service routine uses floating point operations.
except_prompt
Enter one or more decimal numbers or ranges of decimal numbers.
Example: 0,2,4,[16,31],33,[128,143]
any_more_except
Do you want to add another line of exceptions?
fault_not_menu
What do you want to happen if an interrupt occurs but there is
no service routine designated for that interrupt type?
1) Stop the program with a HLT instruction.
2) Issue an error message and stop the program.
3) Execute a routine that you have written.
fault_not_info This question refers to any interrupt type that is listed in the
INTERRUPT_TYPES_USED directive but is not assigned an interrupt service
routine in a VECTOR directive.
get_default_name
What is the name of your routine for handling unexpected interrupt types?
default_name_info
This name can be the name of a Pascal procedure, or it can be a global
symbol that marks the entry point of an assembly language routine.
own_code_menu
When such an interrupt occurs, should your program:
1) vector directly to your routine, which will handle the return (if any)
   from the interrupt, or
2) save registers, call your routine, restore registers, and
   return from the interrupt?
in_line_menu
Do you want the register save and restore routines to be:
1) included in-line (saves about 55 cycles on each routine), or
2) called as subroutines (saves about 6 bytes on each routine)
vector_intro
Now you will be asked to list the names of the interrupt service
routines in your program. Each name may be the name of a Pascal
procedure, or it may be a global symbol that marks the entry point
of an assembly language routine. For each routine, you will list
the interrupt type(s) that the routine handles.

Do you have any interrupt service routines to list?
restart_label
Do you have any assembly language routines that need to be executed
before your Pascal program begins?
restart_info
The stack, heap, and segment registers are automatically initialized
by ICS routines before your Pascal program begins. These routines
begin at the entry point PASCAL_BEGIN. If you have an initialization
routine that must precede the beginning of your Pascal program, answer
"Y". This routine must end with a jump to PASCAL_BEGIN.
get_restart_label
Enter the name (entry point) of the routine to be executed at restart.
This name must be a global symbol; it is used as the transfer address
of the program.
end of text

```
{                TABLE 10 - SAMPLE PROCESSOR ROUTINE
*****************************************************************
                       decl.text
*****************************************************************
this file contains the declerations for the ics system and
the forward references.
} program icssystem;

const
      version = 'V01.00-00 '; { yes, the version of this program }
      datelength = 24; { length of date string }
      templength = 13; { length of temp file names }
      userlength = 64; { length of user file names and assorted buffers }
      maxlength = 255; { the longest length possible for a string } null = 0; { just for the hell of it }
      asmfile = '/bin/8086/asm'; { where the assembler lives }
      macrofile = '/lib/8086/ics.mc'; { where the ics macros live }
      nullstr = '';

{ unitread commands }
      { These commands are hooks into the pcode interpreter that
        allow direct access to UNIX OS calls. }
      execreq = 11; { execute a program }
                    { Hand UNIX a command line to be executed with
                      the "fork" system call. The current programs waits
                      until the child process is done. The string which
                      contains the command line must have two trailing
                      blanks }
```

```
    exitreq = 6;  { terminate a program }
                  { Do a UNIX "exit" system call }
    pidreq = 10;  { get process id from os}
                  { Request the current process id from the system
                    with the "getpid" system call }
    pblockreq = 5; { get invocation line from os }
                  { places the invocation line in the specified
                    buffer. Each argument from the invocation line
                    is trailed by a null and the last argument
                    is trailed by two nulls. The number of arguments
                    is also returned. See the format of the pblock
                    record for further info. }
    timereq = 7;  { get time from os}
                  { time is returned in weird UNIX format } type
    datestr = packed array[1..datelength] of char; { contain date and time }
    tempstr = string[templength]; { temp files used by system }
    userstr = string[userlength]; { user file names and assorted buffers } var
    { files }
    ASLfile : text; { used if we must make an asm listing ourselves }
    aslname : userstr; { name of the asm listing file }
    LCfile : text; { outputfile: Linker Commands }
    lcname : userstr; { name used for linker command file }
    MCfile : text; { outputfile: Macro source }
    mcname : userstr; { name of asm input file }
    objname : userstr; { name used for object file output of asm }
    sourcefile : text; { the ics language file }
    sourcename : userstr; { name of the source file }

{ and a few extras }
    sourceline : string[maxlength]; { used for copying files }
    asmcall : string[maxlength]; { build the command line to call the assembl
    date : datestr; { todays date and time }
    error : boolean; { did we have any errors in processing the ICS source }
    errorcount : integer; { number of errors found in ICS source file }
    verboseon : boolean; { are we in verbose mode }
    liston : boolean; { do we want a listing }
    objecton : boolean; { do we want an object module } procedure ublewit(errnum:integer; literal:userstr); forward;
(*************************************************************
                    getime.text
*************************************************************
this file gets the date and time from the OS which is some ugly
format. It eventually gets converted into a nice string.
This entire file is one UCSD segment.
} segment procedure getime(var date : datestr);
      type
        ftimerec = record
                    time : longint;
                    millitm : integer;
                    timezone : integer;
                    dstflag : integer
                  end;
        tmrec = record
                    sec : integer;
                    min : integer;
                    hour : integer;
                    mday : integer;
                    mon : integer;
                    year : integer;
                    wday : integer;
                    yday : integer;
                    isdst : integer
                  end;
```

```
var
   tm : tmrec;
   daytab : array[0..3] of integer;
   mons : packed array[0..35] of char;
   days : packed array[0..20] of char;
   dmsize : array[1..12] of integer;
   i : integer;

function dysize( year : integer): integer;
   { this function just figures if its a leap year or not }
   begin
      if (year mod 4) = 0 then
         dysize := 366
      else
         dysize := 365
   end; { dysize } function sunday( var tm : tmrec; day : integer): integer;
   begin
      { this function returns the first day number >= the day number
        passed that is a sunday }
      if day = 58 then
         { need to see if this is a leap year }
         day := day + dysize(tm.year) - 365;

sunday := day - (day - tm.yday + tm.wday + 700) mod 7
   end;
procedure ftime( var timeb : ftimerec);
   var
      temp : integer;
      templong : record
                    case boolean of
                       true : (words : array[0..1] of integer);
                       false : (lint : longint)
                 end;

begin
      { just does the system call for ftime
        and swaps the words of time around so that time conforms
        to our UCSD long integer conventions }
      unitread(0,timeb,0,0,timereq);

{ now swap the words }
      templong.lint := timeb.time;
      temp := templong.words[0];
      templong.words[0] := templong.words[1];
      templong.words[1] := temp;
      timeb.time := templong.lint
   end; { ftime } procedure gmtime( time : longint; var tm : tmrec);
   var
      hms,
      day : longint;
      d0,d1 : integer;   { just temporaries } begin
      { computes Greenwich Mean Time from time passed }
      hms := time mod 86400;
      day := time div 86400;

if hms <= 0 then begin
         hms := hms + 86400;
         day := day - 1
      end;

tm.sec := hms mod 60;
      d1 := hms div 60;
      tm.min := d1 mod 60;
      d1 := d1 div 60;
      tm.hour := d1;

tm.wday := (day + 7340036) mod 7;
```

```
     if day >= 0 then begin
        d1 := 70;
        while (day >= dysize(d1)) do begin
           day := day - dysize(d1);
           d1 := d1 + 1
        end
     end
     else begin
        d1 := 70;
        while (day < 0 ) do begin
           day := day + dysize(d1);
           d1 := d1 - 1
        end
     end;

tm.year := d1;
     tm.yday := day;
     d0 := day;

if dysize(d1) = 366 then dmsize[2] := 29;

d1 := 1;
     while (d0 >= dmsize[d1]) do begin
        d0 := d0 - dmsize[d1];
        d1 := d1 + 1
     end;

dmsize[2] := 28;

tm.mday := d0 + 1;
     tm.mon := d1;
     tm.isdst := 0
  end; { gmtime } procedure localtime( var tm : tmrec );
  var
     dayno : integer;
     copytime : longint;
     dlbegin, dlend : integer;
     systime : ftimerec;

begin
     { convarts system time to local time with daylight savings included }
     ftime(systime);

copytime := systime.time - (systime.timezone * 60);
     gmtime(copytime,tm);

dayno := tm.yday;
     dlbegin := 119;
     dlend := 303;
     if tm.year in [74,75] then begin
        dlbegin := daytab[tm.year-74];
        dlend := daytab[tm.year-73]
     end;

dlbegin := sunday(tm,dlbegin);
     dlend := sunday(tm,dlend);

if (systime.dstflag = 1) and
        ((dayno > dlbegin) or ((dayno = dlbegin) and (tm.hour >= 2))) and
        ((dayno < dlend) or ((dayno = dlend) and (tm.hour < 1))) then begin
        copytime := copytime + 3600;
        gmtime(copytime,tm);
        tm.isdst := tm.isdst + 1
     end
  end; { localtime } procedure ctnumb(x : integer; var date : datestr; index : integer);
  begin
     if x >= 10 then
        date[index] := chr((x div 10) mod 10 + ord('0'))
     else
```

```
        date[index] := ' ';
        date[index+1] := chr(x mod 10 + ord('0'))
      end; { ctnumb } begin { getime }
    { initialize daytab to account for funny daylight savings during 74,75 }
    daytab[0] := 5;
    daytab[1] := 333;
    daytab[2] := 58;
    daytab[3] := 303;

{ initialize string of month names }
    mons := 'JanFebMarAprMayJunJulAugSepOctNovDec';

{ initialize string for days in month }
    days := 'SunMonTueWedThuFriSat';

{ initialize for number of days in month }
    for i := 1 to 12 do
      case i of
        1,3,5,7,8,10,12 : dmsize[i] := 31;
        4,6,9,11 : dmsize[i] := 30;
        2 : dmsize[2] := 28;
      end; { case }

{ initialize th date string to its proper format }
    date := 'Day Mon 00 00:00:00 1900';

{ get the time }
    localtime(tm);

{ put the time in the date string }
    moveleft ( days[tm.wday * 3],date[1],3);
    moveleft ( mons[(tm.mon - 1) * 3],date[5],3);
    ctnumb (tm.mday,date,9);
    ctnumb (tm.hour + 100,date,12);
    ctnumb (tm.min + 100,date,15);
    ctnumb (tm.sec + 100,date,18);

if tm.year >= 100 then begin
      date[21] := '2';
      date[22] := '0'
    end;
    ctnumb ( tm.year + 100,date,23)
  end; { getime }
{
************************************************************
               ics_main.text
************************************************************

This file contains the main program for the ics system
as well as a couple of extra utilities and the logic to
close up the files and call the assembler.
} procedure ublewit { (errnum : integer; literal:string) } ;
    { a crash and burn routine }
    { something fatal happened and we want to end the program NOW }
    begin { ublewit }
      if (errnum <> 0) then write(errorfile,'ics: ');
      case errnum of
        0 : writeln(errorfile,'Usage: ics [-c lcfile] [-l] [-o] [-v] source
        1 : writeln(errorfile,'source filename exceeds 14 characters');
        2 : writeln(errorfile,'no available temporary files');
        3 : writeln(errorfile,'duplicate filenames specified');
        4 : writeln(errorfile,'source filename does not end in ".is"');
        5 : writeln(errorfile,'cannot open ',literal,' for reading');
        6 : writeln(errorfile,'cannot open ',literal,' for writing')
        end; {case }
```

```
        error := true;
        unitread(null,error,null,null,exitreq)
    end; { ublewit } procedure delete(filename:userstr);
    var
        textfile : text;
    begin { delete }
        reset(textfile,filename);
        {$I- } { we dont care if we can't delete it }
        close(textfile,purge)
        {$I+ }
    end; { delete } procedure copy_MC_ASL;
    { a handy copy utility. We assume that MCfile is still open
        from its original creation }
    begin { copy_MC_ASL }
        close(MCfile,LOCK); { close it so we can read from it }
        reset(MCfile,mcname); { and prepare to copy }
        rewrite(ASLfile,aslname);
        while not(eof(MCfile)) do begin
            readln(MCfile,sourceline);
            writeln(ASLfile,sourceline)
            end; { while }
        close(ASLfile,LOCK); { save our list file }
        {$I- } { we dont care if we can't delete it }
        close(MCfile,purge)  { and delete our asm source file }
        {$I+ }
    end; { copy_MC_ASL } procedure finishprocessing;
    { now that were done processing the sourcefile with no errors
        we need to close all the files and call the assembler }
    var
        asm_verbose : integer; { if we are verbose then the asm is too }
    begin { finishprocessing }
        if (verboseon) then writeln(errorfile,'No source errors detected');
        close(LCfile,LOCK);
        if (objecton)
            then begin
                close(MCfile,LOCK);
                asmcall := concat('/bin/8086/pas.sys ',
                                  '/lib/8086/ics.mp ',
                                  sourcename,' ',
                                  mcname,' ');
                unitread(null,asmcall,null,null,execreq);
                error := ioresult <> 0;
                if not(error) then begin
                    asmcall := concat(asmfile,' ',
                                      objname,' ',aslname,' ',macrofile,' ',
                                      mcname,' ');
                    if verboseon
                        then asm_verbose := 0
                        else asm_verbose := 1;
                    unitread(asm_verbose,asmcall,null,null,execreq);
                    error := ioresult <> 0;
                    delete(mcname)
                    end
                end
```

```
            else if (liston) then begin
                close(MCfile,LOCK);
                asmcall := concat('/bin/8086/pas.sys ',
                                  '/lib/8086/ics.mp ',
                                  sourcename,' ',
                                  mcname,' ');
                unitread(null,asmcall,null,null,execreq);
                error := ioresult <> 0
                end
    end; { finishprocessing } procedure giveitup;
    { We had ics source errors. Delete Linker Command file.
      If liston is false then delete the list file. If liston is
      true and objecton is false then MCfile is the list file. If liston
      and objecton are both true then copy the MCfile to the list file. }
    begin { giveitup }
        if (verboseon)
            then writeln(errorfile,errorcount,' Source errors detected');
        {$I- } { we dont care if we can't delete it }
        close(LCfile,purge); { delete the linker command file }
        if (liston)
            then if (objecton)
                    then copy_MC_ASL
                    else close(MCfile,LOCK)
            else {$I- } { we dont care if we can't delete it }
                close(MCfile,purge)
                {$I+ }
    end; { giveitup } begin { icssystem }
    getime(date);
    initialize; { all one time init and option processing }
    processfile;
    if not(error)
        then finishprocessing
        else giveitup;
    unitread(null,error,null,null,exitreq)
end. { icssystem }
{
*********************************************************************
                    init.text
*********************************************************************
this does all the one time initialization. This includes handling of the
invocation line, setting up default file names and opening of files.
} segment procedure initialize;

const
        extlength = 3; { length of default extensions ".is" }
        namelength = 14; { max length file filename excluding pathname }
        slash = '/';
        minus_sign = '-';
        src_ext = '.is'; { source file extension }
        obj_ext = '.io'; { object file extension }
        lcf_ext = '.ic'; { linker command file extension }
        lst_ext = '.il'; { listing file extension }
        ptrtype = 1; { our pblock is a pointer type }
                     { we must specify this information when we
                       request the invocation line }
```

```
type
    argblock = packed record { contains arguments from invocation line }
                nump : integer; { number of arguments in block }
                { pchar is really bigger than 2 chars but we turn off
                    range checking before we use it. Its all faked by
                    the interpreter }
                pchar : packed array[1..2] of char { arguments }
            end;

var
    { buffers and associated flags and pointers }.
    gotparam : boolean; { successful return from getnextparam }
    param : userstr; { contains current argument from pblock }
    paramlength : integer; { length of current parameter }
    paramnum : integer; { the nth argument from pblock }
    pblockptr : integer; { points to start of argument in pblock }
    pblock : ^argblock; { contains arguments from invocation line } defaultname : userstr; { name used for default files }
                  { source file name less the path and extension }
    extension : string[extlength]; { when examining file name supplied
            with options it contains the extension of the file }
    optionptr : integer; { points to current option letter in param }

{ flags for occurence of option letters }
    smlc, smll, smlo, smlv : boolean;

procedure getnextparam;
    { peels the next parameter off the parameter block (pblock)
        and places it in param in the same formaty as in a pblock
        request. If no parameters were left the gotparam goes false }
    begin { getnextparam }
        {$R-} { turn off range checking for a bit }
        gotparam := paramnum <= pblock^.nump; { any left? }
        if gotparam then begin
            paramlength := 0;
            { find end of param }
            while (pblock^.pchar[pblockptr + paramlength] <> chr(null))
                do paramlength := paramlength + 1;
            { copy it into param }
            if (paramlength > userlength) then paramlength := userlength;
            moveleft(paramlength, param, 1);
            moveleft(pblock^.pchar[pblockptr], param[1], paramlength);
            { point to next param in pblock }
            pblockptr := pblockptr + paramlength + 1;
            paramnum := paramnum + 1 { next parameter for next time }
        end { if }
        {$R+} { bring back the range checking }
    end; { getnextparam } procedure checksourceparam;
    { param should contain what we think is the source file name.
        make sure the source file is everything it should be.
        Not too long, not to short, the right extension and
        make sure we can open it. } procedure checkfilenamelength;
        { 1) Assumes that "param" contains a filespec.
          2) Strips off the path.
          3) Makes sure the remaining file name is <= "namelength".
                If the file name is too long then we report an error.
          4) Strips off the extension and places the remaining file
                name in to "defaultname".
```

5) This procedure is used to process the sourcefile name in the invocation line. "defaultname" is
used only when we are looking at the source file. It is used to derive all of the other default file names for the output files. }
```
    var
        lastslashpos : integer; { pointer to find last slash }
    begin { checkfilenamelength }
        {$R-} { turn off range checking for a bit }
        { find the last slash }
        lastslashpos := paramlength + 1;
        repeat
            lastslashpos := lastslashpos - 1
        until (lastslashpos = 0) or (param[lastslashpos] = slash);

{ copy file name without ext and path }
        defaultname := copy(param,lastslashpos+1,
                            paramlength-lastslashpos-extlength);
        if ((paramlength - lastslashpos) > namelength)
            then ublewit(1,nullstr)
        {$R+} { bring back the range checking }
    end; { checkfilenamelength } begin { checksourceparam }
    {$R-- }
    checkfilenamelength;
    extension := copy(param,paramlength-(extlength-1),extlength);
    if (extension <> src_ext)
        then ublewit(4,nullstr);

sourcename := param;
    {$I--}
    reset(sourcefile,sourcename);
    {$I+}
    if (ioresult <> 0) then ublewit(5,sourcename)
    {$R+ }
end; { checksourceparam } procedure processoptions;
{ process all option letters in an option group }
{ for each file option letter we check:
  1) The option letter is stated only once
  2) The filespec, if there is one, does not start with "-" } procedure getfilename(var filename:userstr);
        { It is assumed that the next param to be gotten out of pblock
          is a filename. }
    var
        tempfile : text;
    begin { getfilename }
        { the option letter should be the last char in this param }
        if (optionptr <> paramlength)
            then ublewit(0,nullstr)
            else begin
                getnextparam;
                { file spec should not start with a "-" }
                if not((gotparam) and (param[1] <> minus_sign))
                    then ublewit(0,nullstr);
                optionptr := paramlength; { fake a used up param }
                filename := param
                end { else }
    end; { getfilename }
```

```
    procedure smallc;
        begin { smallc }
            if smlc then ublewit(0,nullstr);
            getfilename(lcname);
            smlc := true
        end; { smallc } procedure smalll;
        { just set a flag that we've seen it }
        begin { smalll }
            if smll then ublewit(0,nullstr);
            smll := true
        end; { smalll } procedure smallo;
        begin { smallo }
            if smlo then ublewit(0,nullstr);
            smlo := true
        end; { smallo } procedure smallv;
        begin { smallv }
            if smlv then ublewit(0,nullstr);
            smlv := true
        end; { smallv } begin { processoptions }
        optionptr := 2;
        if (optionptr > paramlength)
            then ublewit(0,nullstr)
            else while (optionptr <= paramlength) do begin
                    if (param[optionptr] = 'c') then smallc
                    else if (param[optionptr] = 'l') then smalll
                    else if (param[optionptr] = 'o') then smallo
                    else if (param[optionptr] = 'v') then smallv
                    else ublewit(0,nullstr);
                    optionptr := optionptr + 1
                    end { while }
    end; { processoptions }
procedure gettemp( var tempname : tempstr);
    { generates names for temporary files and checks them
      so that they don't have the same name as a file already
      being used in the system. The file names generated are
      "/tmp/TxxxxTyy"
      where xxxx = user process id
            yy = 00 - 99 }
    var
        tempfile : file;
        found : boolean;
        tempnum, position, temp : integer;
        usrpid : array [1..4] of char;

procedure getusrpid;
        { get the process id number from the os and put it in usrpid }
        type
            digitstype = record
                            case boolean of
                                true: (digits : packed array[1..4] of 0..15);
                                false: (int : integer)
                            end;
```

```
        var
            digit : integer;
            hex : digitstype;
        begin { getusrpid }
            { get process id from system }
            unitread(null,hex.int,null,null,pidreq);

for digit := 1 to 4 do
                if (hex.digits[digit] < 10)
                    then usrpid[digit] := chr(hex.digits[digit] + ord('0'))
                    else usrpid[digit] := chr(hex.digits[digit] - 10 + ord('A'
        end; { getusrpid } begin { gettemp }
        getusrpid;
        tempnum := 0;
        found := false;
        tempname:='/tmp/T####T##';
        repeat
            tempname[7] := usrpid[4];
            tempname[8] := usrpid[3];
            tempname[9] := usrpid[2];
            tempname[10] := usrpid[1];
            tempname[12] := chr((tempnum div 10) + ord('0'));
            tempname[13] := chr((tempnum mod 10) + ord('0'));

{ check to see if this file name exists }
            {$I-}
            reset(tempfile,tempname);
            {$I+}
            if (ioresult <> 0)
                then found := true
                else close(tempfile);
            tempnum := tempnum + 1
        until ((tempnum > 100) or (found));

if not(found) then ublewit(2,nullstr)
    end; { gettemp } procedure setdefaults;
    { sets the flags for option letters }
    begin { setdefaults }
        smlc := false;
        smll := false;
        smlo := false;
        smlv := false
    end; { setdefaults } procedure checkoptions;
    { setup default filenames and a few global flags } procedure checkaccess(filename:userstr);
        { make sure we can open the given file for output }
        var
            tempfile : text;
        begin { checkaccess }
            {$I- }
            rewrite(tempfile,filename);
            if (ioresult <> 0) then ublewit(6,filename);
            close(tempfile)
            {$I+ }
        end; { checkaccess }
```

```
begin { checkoptions }
    liston := smll;
    objecton := smlo;
    verboseon := smlv;

gettemp(mcname);
    objname := concat(defaultname,obj_ext);
    aslname := concat(defaultname,lst_ext);
    if not(smlc)
        then lcname := concat(defaultname,lcf_ext)
        else begin
            if (lcname = sourcename) then ublewit(3,nullstr);
                if (objecton) and (lcname = objname) then ublewit(3,nullstr)
                    if (liston) and (lcname = aslname) then ublewit(3,nullstr)
                    end;

checkaccess(lcname);
        if liston then checkaccess(aslname);
        if objecton then checkaccess(objname);

if not(liston)
            then aslname := nullstr
            else if not(objecton)
                then mcname := aslname
    end; { checkoptions }
begin { initialize }
    error := false; { no problems yet! } pblockptr := 1; { points to start of pblock }
    paramnum := 1; { start with first param }

{$R- } { turn off range checking to check buffer flag }
    { bring in invocation information and get the source file name
        in param}
    unitread(ptrtype,pblock,null,null,pblockreq); { gets the param block }
    { start processing the fields of the invocation line }
    getnextparam; { get rid of the interpreter file name }
    getnextparam; { get rid of the pcode file name }
    getnextparam; { bring in the first arg, hopefully? }
    {$R+ } setdefaults;

{$R- }
    { now process the remaining invocation line }
    while (gotparam) and
          (paramlength <> 0) and
          (param[1] = minus_sign) do begin
        processoptions;
        getnextparam
        end; { while }
    {$R+ } if not(gotparam) then ublewit(0,nullstr);
    checksourceparam;
    getnextparam;
    if gotparam then ublewit(0,nullstr);

checkoptions;

if verboseon then begin
        writeln(errorfile,'MDP Pascal 8086/8088 ICS ',version,' (B560)');
        writeln(errorfile,'Copyright (C) 1982 Tektronix, Inc. ')
        end;
    { open some files }
    if (liston or objecton) then rewrite(MCfile,mcname);
    rewrite(LCfile,lcname);

{ include this files in the link }
    writeln(LCfile,'-O ',objname)
end; { initialize }
```

```
{
*******************************************************************
                            proc_hw.text
*******************************************************************
This file handles ICS source file directives HARDWARE_CONFIGURATION
thru and including SERVICE_CALLS.
} procedure hw_config;
        { handles everything to do with the HARDWARE CONFIGURATION directive.
          here we find out if our floating point is done with software
          or hardware. We use this information later to decide which
          version of the floating point library (8087 or 8086) we need
          to bring in. }
        begin { hw_config }
            check_line(hw_state-1,hw_state-1,hw_state,not(comment));
            getoperand;
            if not(gotoperand) then sourcerror(6,null);
            if not( (operand = '8086') or (operand = '8088') or
                    (operand = '8086-8087') or (operand = '8088-8087') )
                then sourcerror(14,null)
                else have87 := (operand = '8086-8087') or
                               (operand = '8088-8087');
            getoperand;
            if gotoperand then sourcerror(7,null)
        end; { hw_config } procedure memory_map(
            memname : mem_type { type of memory eg. instr, global, ... } );
        { This routine handles Instructions, Constants,' Globals and Heap
          directives, because they all are handled the same way. Each of these
          directives can be declared several times, execpt heap, therefore
          they can be entered from the previous state or the current state.
          The heap directive can have only one address pair and only have one
          directive. All of the source lines are commented out. No address
          can be declared twice. Eventually "L" and "m" linker commands will
          be generated for Instr, Const and Globals. These commands will be
          generated at the conclusion of processing the SERVICE_CALLS
          directive. } procedure set_limits;
        { this routine sets up some linktime constants that
          are need. eg. Stack starting address, Heap starting
          address. Also saved at this point is the lo and hi
          addresses of instruction and the group of globals,
          heap_stack, and constants. These will later be checked
          against smallcode and smalldata if appropriate. }
        var
        tempptr : addrptr; { a pointer to run down the link list }
        lostr, histr : num_str; { to conver addresses back to strings }
        begin { set_limits }
            tempptr := addrroot^.next;
            while ((tempptr <> nil) and (tempptr^.class <> 'HEAPQQ')) do
                tempptr := tempptr^.next;
            if (tempptr <> nil) then begin
                convert_to_hex(tempptr^.loaddr,lostr);
                convert_to_hex(tempptr^.hiaddr,histr);
                writeln(LCfile,'-D STKBASEQQ=',histr);
                writeln(LCfile,'-D HEAPBASEQQ=',lostr)
            end; { if }

{ find the low address of const, globals, and heap }
            tempptr := addrroot^.next;
            while ((tempptr <> nil) and (tempptr^.class <> 'INSTRQQ'))
                do tempptr := tempptr^.next;
```

```
              if (tempptr <> nil) then begin
                 instrlo := tempptr^.loaddr;
                 instrhi := tempptr^.hiaddr
                 end; { if }

{ find the hi address of const, globals, and heap }
              while (tempptr <> nil) do begin
                 while ((tempptr <> nil) and (tempptr^.class <> 'INSTRQQ'))
                    do tempptr := tempptr^.next;
                 if (tempptr <> nil) then begin
                    instrhi := tempptr^.hiaddr;
                    tempptr := tempptr^.next
                    end { if }
                 end; { while }

{ find the lo instr address }
              tempptr := addrroot^.next;
              while ((tempptr <> nil) and (tempptr^.class = 'INSTRQQ')) do
                 tempptr := tempptr^.next;
              if (tempptr <> nil) then begin
                 datalo := tempptr^.loaddr;
                 datahi := tempptr^.hiaddr
                 end; { if }

{ find the hi instr address }
              while (tempptr <> nil) do begin
                 while ((tempptr <> nil) and (tempptr^.class = 'INSTRQQ')) do
                    tempptr := tempptr^.next;
                 if (tempptr <> nil) then begin
                    datahi := tempptr^.hiaddr;
                    tempptr := tempptr^.next
                    end { if }
                 end { while }
           end; { set_limits } procedure address_list(memname:mem_type);
              { an address list is in param_list and this routine will parse
                 out the complete list and insert each address pair in an
                 ordered link list. Each address pair in the link list is
                 identified as to which group it came from, ie instr, const
                 if this is heap then we want one and only one pair. The
                 low number of the pair should be a multiple of 16. }
              var
                 loaddr, hiaddr : longint; { the lo and hi of addr pair }
              begin { address_list }
                 getoperand;
                 getpair(loaddr,hiaddr,'HEX');
                 if not(gotpair)
                    then sourcerror(6,null)
                    else if (memname <> 'HEAPQQ')
                          then repeat
                                 if ((loaddr mod 16) <> 0)
                                    then sourcerror(17,null);
                                 insertaddrpair(loaddr,hiaddr,memname);
                                 getoperand;
                                 getpair(loaddr,hiaddr,'HEX')
                               until not(gotpair)
                          else begin
                                 { with heap we should only have 1 pair }
                                 if ((loaddr mod 16) <> 0)
                                    then sourcerror(17,null);
                                 insertaddrpair(loaddr,hiaddr,memname);
                                 { at this point we should be done with the
                                   first four memory groups - lets set some
                                   constants }
                                 set_limits;
                                 { make sure there are no more operands }
                                 getoperand;
                                 if gotoperand then sourcerror(7,null)
                                 end
              end; { address_list }
```

```
    begin { memory_map }
        if (memname = 'INSTRQQ')
            then check_line(instr_state-1,instr_state,instr_state,comment)
        else if (memname = 'CONSTQQ')
                then check_line(const_state-1,const_state,const_state,comment
        else if (memname = 'DATAQQ')
                    then check_line(data_state-1,data_state,data_state,comment)
        else if (memname = 'HEAPQQ')
                    then check_line(heap_state-1,heap_state-1,heap_state,comment)
        address_list(memname)
    end; { memory_map } procedure reset;
    { this routine checks out the RESET MEMORY line for syntax
      we only want to see a YES or a NO. We also make sure we dont
      overlap with anything else by inserting the memory needed
      for the reset vector in the address list. }
    { this line is only used by ICS MC }
    var
        loaddr, hiaddr : longint; { lo and hi addr for reset code }
    begin { reset }
        check_line(reset_state-1,reset_state-1,reset_state,not(comment));
        getoperand;
        if not(gotoperand) then sourcerror(6,null);
        if ((operand <> 'YES') and (operand <> 'NO'))
            then sourcerror(14,null);
        if (operand = 'YES') then begin
            reset_memory := true;
            loaddr := (one_meg - 16);
            hiaddr := (one_meg - 12);
            insertaddrpair(loaddr,hiaddr,'RESETQQ')
            end; { if }
        getoperand;
        if gotoperand then sourcerror(7,null)
    end; { reset } procedure svcs;
    { this routine checks out the SERVICE_CALLS directive. We generate
      linker "D" command to specify the ports to be used and an "m"
      command to make room for the service request block. We must also
      check to see that we dont overlap with any memory declarations
      stated for instr, const, globals, and reset vector.
      NOTE: the linker must see all "m" commands before any "L" commands.
      We also review all the address info now and generate all
      the linker "L" and "m" commands we need for Instr, Const
      and Global. We dont generate any linker commands for 'HEAP'.
      For the Service Request block we generate a linker "L" and "m"
      commands. We save some status for later so we can make sure we
      fit in smallcode and/or smalldata if the user has declared it.
      We also make sure we dont overlap with anything else by inserting
      the memory needed for the SRB in the address list.
      svcport must start on an even 16 byte boundry and
      srbvloc must be on an even byte boundry and it takes up
      32 bytes therefor it can start as high up as 1meg-32. }
    var
        srbvloc : num_str; { service request block location }
        svcport : num_str; { first i/o port used to initiate svcs }
        commapos : integer; { position of the comma between the two addrs }
        srblength : integer; { length of srbvloc }
        svclength : integer; { length of svcport }
        tempptr : addrptr; { pointer used to walk down address linked list }
        tempaddr : longint; { a temp var to hold addresses }
        loaddr, hiaddr : longint; { lo and hi addr of SRB }
    procedure m_commands(class:mem_type;ext:mem_ext);
        { this routine actually generates the linker m commands.
          only 3 address pairs will appear on a line }
        var
            paircount : integer; { how many pairs have we found }
            tempptr : addrptr; { our pointer to run down the link list }
            found : boolean; { did we find the type of pair we want }
            lostr, histr : num_str; { to convert addresses back to strings }
```

```
begin { m_commands }
    paircount := 0;
    found := false;
    tempptr := addrroot^.next;
    while (tempptr <> nil) do begin
        if (tempptr^.class = class) then begin
            paircount := paircount + 1;

if not(found) then begin
                { it's the first one, print the m command }
                found := true;
                write(LCfile,'-m ',class,ext,'=')
            end;

if (paircount = 4) then begin
                { we've gone over 3, start a new continuation line }
                paircount := 1;
                writeln(LCfile,' *');
                write(LCfile,'              ')
            end;

{ print the address range }
            convert_to_hex(tempptr^.loaddr,lostr);
            convert_to_hex(tempptr^.hiaddr,histr);
            write(LCfile,lostr,'-',histr,' ')
        end;
        tempptr := tempptr^.next
    end;

{ if we found any, put a return at the end of the last line }
    if found then writeln(LCfile)
end; { m_commands } procedure L_commands(class:mem_type;ext:mem_ext);
    { this routine actually generates the linker L commands. }
    var
        tempptr : addrptr; { our pointer to run down the link list }
    begin { L_commands }
        tempptr := addrroot^.next;
        while (tempptr <> nil) do
            if (tempptr^.class <> class)
                then tempptr := tempptr^.next
                else begin
                    tempptr := nil;
                    writeln(LCfile,'-L class=',class,' range ',class,ext)

end { else }
    end; { L_commands } begin { svcs }
    check_line(svcs_state-1,svcs_state-1,svcs_state,comment);
    svcs_used := false;
    getoperand;
    if not(gotoperand) then sourcerror(6,null);
    if (operand <> 'NONE') then begin
        { defaults }
        svcport := 'OFFFOH';
        srbvloc := '40H';
        svcs_used := true;

if (operand <> 'DEFAULT') then begin
            srblength := length(operand);
            { it must be of reasonable length }
            if ((srblength > num_str_len) or (srblength < 2))
                then sourcerror(8,null);
            srbvloc := operand;
            { it must end with 'H' }
```

```
            if (srbvloc[srblength] <> 'H') then sourcerror(12,null);
            tempaddr := int(srbvloc);
            { it must be less than or equal to 1MEG - the table size }
            if (tempaddr > (one_meg - srbsize)) then sourcerror(9,null);
            { it must be on an even byte boundry }
            if ((tempaddr mod 2) <> 0) then sourcerror(17,null);

{ now we do the svc port location }
            getoperand;
            if not(gotoperand) then sourcerror(6,null);
            svclength := length(operand);
            { it must be of reasonable length }
            if ((svclength > num_str_len) or (svclength < 2))
              then sourcerror(8,null);
            svcport := operand;
            { it must end with 'H' }
            if (svcport[svclength] <> 'H') then sourcerror(12,null);
            { now we check out the number }
            tempaddr := int(svcport);
            { it must start on a 16 byte boundry }
            if ((tempaddr mod 16) <> 0) then sourcerror(17,null);
            { it can not be any higher than 64K - 16 }
            if (tempaddr > (sixty_four_k - 16)) then sourcerror(9,null)
            end; { if }

{ put it in the address list and see if we get an overlap }
         loaddr := int(srbvloc);
         { the high end of it is lo + table size -1 }
         hiaddr := loaddr + srbsize - 1;
         insertaddrpair(loaddr,hiaddr,'SRBVQQ');

{ and the "D" command for the port locations }
            writeln(LCfile,'-D SVCLOCZZ=',svcport)
            end; { if }

{ now make sure there are no extra operands }
         getoperand;
         if gotoperand then sourcerror(7,null);

{ produce the m and L commands for the for memory groups }
         m_commands('INSTRQQ','.ROM');
         m_commands('CONSTQQ','.ROM');
         m_commands('DATAQQ','.RAM');
         m_commands('SRBVQQ','.RAM');
         L_commands('INSTRQQ','.ROM');
         L_commands('CONSTQQ','.ROM');
         L_commands('DATAQQ','.RAM');
         L_commands('SRBVQQ','.RAM')

end; { svcs }
{
*******************************************************************
                  proc_int.text
*******************************************************************
This file has the logic to process all the source lines in the
Interrupt section of the ICS source file. That is from
INTERRUPT_CONFIGURATION thru and including END. The last two
statements in the ICS source file, RESTART_LABEL and END
are not really part of the interrupt section but here they
are here anyway. The directives dealing with interrupts do not
produce any linker commands. These directives are mainly
used by ICS MC to generate the assembly code for the interrupt
vector table and the routines to save and restore registers.
However, ICS LC, this program, does a bunch of consistancy
checks throughout the group of interrupt directives. } procedure int_list(entrytype:int_type);
         { this routine inserts interrupt types declaration into the
           link list. If duplicates are found an error is reported.
```

This routine handles a whole list of interrupt types, as
found in the directives: INTERRUPT_TYPES_USED, EXCEPT_FOR
and VECTOR. Also the addresses of the types used will be
put into the address link list to see if there are any
overlaps. }
```
const
    int_vector_size = 4; { size of the actual vector in memory }
var
    first_entry : boolean; { is this the first in the current list }
    except : boolean; { is our current vector entry excepted }
    itype : integer; { the current type to be inserted into int list }
    loaddr, hiaddr : longint; { the lo and hi addr range to be
                                inserted into memory list } procedure insert_single(itype:integer);
    { this routine puts a new entry into the interrupt
      types link list. If a type already exists and has been
      declared with the same attribute (EXCEPT FOR, VECTOR)
      then an error is reported. INIT is used when first
      enterring a type into the list. }
    var
        inserted : boolean; { have we put the current type in the list }
        tempptr : intptr; { a temp pointer to run down the list } procedure getnew(var newptr:intptr);
        { this routine actually inserts the new record in the link list }
        var
            tempptr : intptr;
        begin { getnew }
            if (entrytype <> 'INIT')
                then sourcerror(29,itype)
                else begin
                    inserted := true;
                    tempptr := newptr;
                    new(newptr);
                    newptr^.itype := itype;
                    newptr^.next := tempptr;
                    newptr^.except := false;
                    newptr^.vector := false
                    end
        end; { getnew } procedure checktype;
        { when a match is found we must make sure that the entry in the
          link list does not have the same entry type as the one we are
          trying to put in now }
        begin { checktype }
            inserted := true;
            { if already declared as init then error }
            if (entrytype = 'INIT') then sourcerror(28,itype)
            if (entrytype = 'VECTOR')
                then begin
                    { make sure vector attribute is not declared twice }
                    if (tempptr^.next^.vector)
                        then sourcerror(25,itype)
                        else tempptr^.next^.vector := true;
                    { make sure that the vector directive uses types
                      that all have the same except status }
                    if (first_entry)
                        then begin
                            except := tempptr^.next^.except;
                            first_entry := false
                            end
```

```
                    else if (except <> tempptr^.next^.except)
                            then sourcerror(26,itype)
                end
            else { make sure that the except attribute is not
                    declared twice }
                if (tempptr^.next^.except)
                    then sourcerror(27,itype)
                    else tempptr^.next^.except := true
    end; { checktype } begin { insertsingle }
        inserted := false;
        tempptr := introot;
        while not(inserted) do
            if (tempptr^.next = nil)
                then getnew(tempptr^.next)
                else if (itype < tempptr^.next^.itype)
                        then getnew(tempptr^.next)
                else if (itype = tempptr^.next^.itype) then checktype
                else tempptr := tempptr^.next
    end; { insertsingle } procedure insertpair;
    { this routine given a interrupt range pair will insert the
      range into the link list with the proper attribute. If
      this is the first decl we put it in the addr list too. }
    var
        lo_int, hi_int : longint; { the range of types for this pair }
    begin { insertpair }
        getpair(lo_int,hi_int,'DEC');
        if not(gotpair) then sourcerror(6,null);
        for itype := lo_int to hi_int do insertsingle(itype);

{ if this is the first decl of types used lets put
          them in the address list }
        if (entrytype = 'INIT') then begin
            loaddr := (lo_int * int_vector_size);
            hiaddr := (hi_int * int_vector_size) + (int_vector_size - 1);
            insertaddrpair(loaddr,hiaddr,'INTRQQ')
            end { if }
    end; { insertpair } begin { int_list }
    first_entry := true;
    if not(gotoperand) then sourcerror(6,null);
    repeat
        if (operand[1] = '[')
            then insertpair
            { num string must be of reasonable length }
            else if (length(operand) > num_str_len)
                    then sourcerror(8,null)
            { we dont want hex numbers }
            else if (operand[length(operand)] = 'H')
                    then sourcerror(24,null)
            else begin
                itype := int(operand);
                insertsingle(itype);

{ if this is the first decl of types used lets put
                  them in the address list }
                if (entrytype = 'INIT') then begin
                    loaddr := (itype * int_vector_size);
                    hiaddr := (itype * int_vector_size) +
                              (int_vector_size - 1);
                    insertaddrpair(loaddr,hiaddr,'INTRQQ')
```

```
                    end { if }
                 end; { else }
         getoperand
      until not(gotoperand)
   end; { int_list } procedure int_config;
   { this routine handles the INTERRUPT CONFIGURATION directive
     for syntax }
   begin { int_config }
      check_line(int_state-1,int_state-1,int_state,not(comment));
      getoperand;
      if not(gotoperand) then sourcerror(6,null);
      if (operand = 'NONE')
         then state := no_int_state { skip all the interrupt lines }
      else if (operand <> 'RAM') and (operand <> 'ROM')
               then sourcerror(14,null);
      getoperand;
      if gotoperand then sourcerror(7,null)
   end; { int_config } procedure types_used;
   { this routine gets all the types the user wants to use and
     puts them into the linked list }
   begin { types_used }
      check_line(types_state-1,types_state,types_state,not(comment));
      getoperand;
      int_list('INIT')
   end; { types_used } procedure save_fp;
   { this routine checks out the SAVE FLOATING POINT directive for syntax
     The param_list should be YES or NO. }
   begin { save_fp }
      check_line(save_state-1,save_state-1,save_state,not(comment));
      getoperand;
      if not(gotoperand) then sourcerror(6,null);
      if ((operand <> 'YES') and (operand <> 'NO'))
         then sourcerror(14,null);
      getoperand;
      if gotoperand then sourcerror(7,null)
   end; { save_fp } procedure except_for;
   { this routine checks out the EXCEPT FOR line for syntax.
     this routine makes sure the excepts are among those declared on
     then INTERRUPT CONFIGURATION line and that not types are excepted
     more than once }
   begin { except_for }
      check_line(except_state-1,except_state,except_state,not(comment));
      getoperand;
      if not(gotoperand) then sourcerror(6,null);
      if (operand <> 'NONE')
         then int_list('EXCEPT')
         else begin
                 getoperand;
                 if gotoperand then sourcerror(7,null)
              end
   end; { except_for }
```

```
procedure fault_notice;
    { this routine checks out the FAULT NOTIFICATION directive for syntax
      and checks the parameters }
    begin { fault_notice }
        check_line(fault_state-1,fault_state-1,fault_state,not(comment));
        getoperand;
        if not(gotoperand) then sourcerror(6,null);

if (operand <> 'PASCAL_RTS') and (operand <> 'STOP') then begin
            { first operand was the user handler }
            getoperand; { it should be OWN_CODE or it shouldnt be there }
            if (gotoperand) and (operand <> 'OWN_CODE')
                then sourcerror(7,null)
            end;
        getoperand;
        if gotoperand then sourcerror(7,null)
    end; { fault_notice } procedure vector;
    { this routine checks the VECTOR directive for syntax. }
    begin { vector }
        check_line(vector_state-1,vector_state,vector_state,not(comment));
        getoperand;
        if not(gotoperand) then sourcerror(6,null);
        if (operand <> 'NONE')
            then begin
                { it was the handler name }
                getoperand; { next operand should be IN_LINE, OWN_CODE or
                              the start of the type list }
                if not(gotoperand) then sourcerror(6,null);
                if (operand = 'OWN_CODE') or (operand = 'IN_LINE')
                    then getoperand; { prime it up for the int list }
                int_list('VECTOR')
                end
            else begin
                getoperand;
                if gotoperand then sourcerror(7,null)
                end
    end; { vector } procedure restart;
    { this routine checks the RESTART LABEL directive for syntax.  At this
      point we also do some checking on the interrupt declarations.
      We also tell the linker where the entry point is. This directive
      can be proceeded by VECTOR or INTERRUPT CONFIGURATION with a
      operand of NONE. } procedure checkints;
    { this routine checks out the link list created by the vector and
        except for lines. If any type was declared with a EXCEPT FOR
        and not a VECTOR an error is reported }
    var
        tempptr : intptr;
    begin { checkints }
        tempptr := introot;
        while (tempptr^.next <> nil) do begin
            tempptr := tempptr^.next;
            if (tempptr^.except) and not(tempptr^.vector)
                then sourcerror(23,tempptr^.itype)
            end { while }
    end; { checkints }
```

```
    begin { restart }
        checkints;
        check_line(restart_state-1,restart_state-2,restart_state,not(comment
        getoperand;
        if not(gotoperand) then sourcerror(6,null);
        writeln(LCfile,'-x ',litoperand);
        getoperand;
        if gotoperand then sourcerror(7,null)
    end; { restart } procedure end_stmt;
        { this routine checks the END directive for syntax. }
        begin
            check_line(end_state-1,end_state-1,end_state,not(comment));
            getoperand;
            if gotoperand then sourcerror(7,null)
        end;

{
*************************************************************
                        proc_main.text
*************************************************************
This file has the main looping logic to step through the ICS
source file. It also has some initialization and one utility
for the file processing.
} procedure processline;
        { just a big case statement of the directives }
        begin
            uppercase(param);
            if (param[1] = ';') then begin
                if (liston or objecton) then writeln(MCfile,cmdline)
                end
            else if (param = 'PASCAL_CONFIGURATION')   then pascal_config
            else if (param = 'HARDWARE_CONFIGURATION') then hw_config
            else if (param = 'INSTRUCTIONS_ROM')   then memory_map('INSTRQQ')
            else if (param = 'CONSTANTS_ROM')      then memory_map('CONSTQQ')
            else if (param = 'GLOBAL_VAR_RAM')     then memory_map('DATAQQ')
            else if (param = 'HEAP_STACK_RAM')     then memory_map('HEAPQQ')
            else if (param = 'RESET_MEMORY')   then reset
            else if (param = 'SERVICE_CALLS') then svcs
            else if (param = 'SOFTWARE_CONFIGURATION') then sw_config
            else if (param = 'MODULE')             then module
            else if (param = 'LIBRARY')            then library
         { commented out for version 1, which only has smallcode - smalldata }
         { else if (param = 'RTS_SUPPORT')              then rts           }
            else if (param = 'FILE_SUPPORT')           then file_support
            else if (param = 'INTERRUPT_CONFIGURATION') then int_config
            else if (param = 'INTERRUPT_TYPES_USED')   then types_used
            else if (param = 'SAVE_FLOATING_POINT')    then save_fp
            else if (param = 'EXCEPT_FOR')             then except_for
            else if (param = 'FAULT_NOTIFICATION')     then fault_notice
            else if (param = 'VECTOR')                 then vector
            else if (param = 'RESTART_LABEL') then restart
            else if (param = 'END')          then end_stmt
            else begin
                { its an unrecognized directive }
                if (liston or objecton) then writeln(MCfile,' ',cmdline);
                sourcerror(3,null)
                end
        end; { processline }
```

```
procedure getnextparam;
    { peels the next parameter off the parameter block (pblock)
      and places it in param. If no parameters were left then
      gotparam goes false }
    begin { getnextparam }
        {$R-} { turn off range checking for a bit }
        gotparam := paramnum <= pblock.nump; { any left? }
        if (gotparam) then begin
            paramlength := 0;
            { find end of param }
            while ((pblockptr + paramlength) <= maxlength)
                    and (pblock.pchar[pblockptr + paramlength] <> chr(null))
                    do paramlength := paramlength + 1;
            { copy it into param }
            moveleft(paramlength,param,1);
            moveleft(pblock.pchar[pblockptr],param[1],paramlength);
            { point to next param in pblock }
            pblockptr := pblockptr + paramlength + 1;
            paramnum := paramnum + 1 { next parameter for next time }
            end { if }
        {$R+} { bring back the range checking }
    end; { getnextparam } procedure getnextline;
    { this routine reads a line of input from the sourcefile.
      this line is parsed and each parameter is placed in
      the pblock. Each group of non-blank characters is placed
      in the pblock terminated by a null. The number of groups
      placed is specified by nump. }
    var
        lineptr : integer; { current char pointer }
        linelength : integer; { length of cmdline }
    begin { getnextline }
        {$R-} { turn off range checking for a bit }
        readln(sourcefile,cmdline);
        linelength := length(cmdline);
        if (linelength > maxlength) then begin
            linelength := maxlength;
            writeln(errorfile,cmdline);
            sourcerror(1,null)
            end;
        lineptr := 1;
        pblockptr := 1; { start at beginning of pblock }
        pblock.nump := 0; { no params yet } repeat
            { ignor leading blanks }
            while (cmdline[lineptr] = ' ') and (lineptr <= linelength)
                do lineptr := lineptr + 1;
            { assume we at our first parameter }
            if (lineptr <= linelength) then pblock.nump := pblock.nump + 1;
            { now keep going till we hit EOL or a blank,
              copy into pblock too  as we go }
            while (cmdline[lineptr] <> ' ') and (lineptr <= linelength) do be
                    pblock.pchar[pblockptr] := cmdline[lineptr];
                    lineptr := lineptr + 1;
                    pblockptr := pblockptr + 1
                    end;
            { trail parameter with a null }
            pblock.pchar[pblockptr] := chr(null);
            pblockptr := pblockptr + 1
        until (lineptr > linelength);

paramnum := 1; { make it ready to use }
        pblockptr := 1
        {$R+} { bring back the range checking }
    end; { getnextline }
```

```
begin { processfile }
    { lets set up some things for the dynamic memory used in
      checking the address pairs for instrs, consts, globals,
      and heap. Also set up the root of the link list }
    new(addrroot);
    addrroot^.loaddr := 0;
    addrroot^.hiaddr := 0;
    addrroot^.class := 'NULL';
    addrroot^.next := nil;

{ lets set up some things for the dynamic memory used int
      checking the interrupt types }
    new(introot);
    introot^.itype := -1;
    introot^.next := nil;
    introot^.except := false;
    introot^.vector := false;

{ set up some initial configurations }
    { no reset memory vector }
    reset_memory := false;
    { SMALLCODE+, SMALLDATA+ }
    smallcode := true;
    smalldata := true;
    { we use service calls }
    svcs_used := true;
    { do not have an 8087 }
    have87 := false;

hexdigit := ['0'..'9','A'..'F'];
    decdigit := ['0'..'9'];

{ now on with the show }
    state := start_state;
    errorcount := 0;
    while not eof(sourcefile) do begin
        getnextline;
        getnextparam;
        if not(gotparam)
            then begin
                if liston or objecton then writeln(MCfile)
                end
            else processline
        end; { while }
    if (state = (end_state - 1)) then begin
        state := end_state;
        if (liston or objecton) then writeln(MCfile,' END')
        end;
    if (state <> end_state) then sourcerror(2,null)
    end; { processfile }

*********************************
                proc_sw.text
*********************************************************************
This file has the logic to handle all the source lines in the
Software Configuration section of the ICS source file. That is from
SOFTWARE_CONFIGURATION thru and including FILE_SUPPORT.
} procedure include_obj_file;
        { just a generalized routine to add an object module.
          we expect one and only one in the param_list. The file
          name is not checked. A linker "O" command is generated. }
        begin { include_obj_file }
            getoperand;
            if not(gotoperand) then sourcerror(6,null);
            if (operand <> 'NONE') then writeln(LCfile,'-O ',litoperand);
            getoperand;
            if gotoperand then sourcerror(7,null)
        end; { include_obj_file }
```

```
procedure sw_config;
   { this routine checks the SOFTWARE CONFIGURATION directive for syntax.
     the parameter will be the name of the file that contains the
     object module for the main program. the file name is not checked.
     A linker "O" command is generated. }
   begin { sw_config }
      check_line(sw_state-1,sw_state-1,sw_state,comment);
      include_obj_file
   end; { sw_config } procedure module;
   { this routine checks the MODULE directive for syntax. The parameter
     will be the name of a file that contains an object module.
     The filename is not checked.  A linker "O" command is generated. }
   begin { module }
      check_line(mod_state-1,mod_state,mod_state,comment);
      include_obj_file
   end; { module } procedure library;
   { this routine checks the LIBRARY directive for syntax. The parameter
     will be the name of a file that contains a user library. The
     file name is not checked. A linker "O" command is generated. }
   begin { library }
      include_obj_file
   end; { library } procedure append_rts_type;
   { this routine is used to build the proper rts library name.
     scsd, scld, lcsd or lcld. When picking the proper library,
     this procedure will append the proper lib version onto the
     the filename just written out to the linker command file. }
   begin { append_rts_type }
      if (smallcode)
         then if (smalldata)
                 then writeln(LCfile,scsd)
                 else writeln(LCfile,scld)
         else if (smalldata)
                 then writeln(LCfile,lcsd)
                 else writeln(LCfile,lcld)
   end; { append_rts_type } procedure rts;
   { this routine checks the RTS SUPPORT directive for syntax and to see
     that if small data or small code is declared that the addresses
     previously specified fit with in 64K. If were in SMALLCODE+ then
     we create a global CODEBASE equal to the lowest instr address.
     If we're in SMALLDATA+ then we create a global DATABASE equal to
     the lowest address of const, globals and heap. }
   var
      hex_addr : num_str; { buffer to hold various addresses in hex }
   begin { rts }
      check_line(rts_state-1,rts_state-1,rts_state,not(comment));
      getoperand;
      if not(gotoperand) then sourcerror(6,null);
      if (operand = 'SMALLCODE+')
         then begin
                 convert_to_hex(instrlo,hex_addr);
                 writeln(LCfile,'-D CODEBASEQQ=',hex_addr);
                 smallcode := true
              end
```

```
            else if (operand = 'SMALLCODE-')
                then smallcode := false
                else sourcerror(14,null);

getoperand;
    if not(gotoperand) then sourcerror(6,null);
    if (operand = 'SMALLDATA+')
        then begin
            convert_to_hex(datalo,hex_addr);
            writeln(LCfile,'-D DATABASEQQ=',hex_addr);
            smalldata := true
            end
        else if (operand = 'SMALLDATA-')
            then smalldata := false
            else sourcerror(14,null);

if ((smallcode) and ((instrhi - instrlo) >= sixty_four_k))
        then sourcerror(18,null);
    if ((smalldata) and ((datahi - datalo) >= sixty_four_k))
        then sourcerror(19,null);

{ and make sure there are no more operands }
    getoperand;
    if gotoperand then sourcerror(7,null)
    end; { rts }

{ ***** TEMP PROCEDURE FOR VERSION 1 ***** }
procedure v1_rts;
    var
        hex_addr : num_str; { buffer to hold various addresses in hex }
    begin { v1_rts }
        convert_to_hex(instrlo,hex_addr);
        writeln(LCfile,'-D CODEBASEQQ=',hex_addr);
        convert_to_hex(datalo,hex_addr);
        writeln(LCfile,'-D DATABASEQQ=',hex_addr);
        if ((smallcode) and ((instrhi - instrlo) >= sixty_four_k))
            then sourcerror(18,null);
        if ((smalldata) and ((datahi - datalo) >= sixty_four_k))
            then sourcerror(19,null)
    end; { v1_rts } procedure file_support;
    { this routine checks the FILE SUPPORT directive for syntax }
    { we write out to the linker command file the high level I/O
      routine library (if I/O is used). We follow it with the main
      RTS library and the proper Floating Point library.
      Next the low level I/O (posi or user supplied if used)
      is written out. We then follow it again
      with the error lib file. This is to resolve any calling
      back and forth. (the linker is one pass thru the libs.) }
    begin { file_support }
        { ****** for version 1 call v1_rts }
        v1_rts;

check_line(file_state-1,file_state-1,file_state,comment);

getoperand;
        if not(gotoperand) then sourcerror(6,null);

if (operand <> 'NONE') then begin
            write(LCfile,'-O ',hi_io_rts);
            append_rts_type
            end;
```

```
            { and the proper floating point library }
            if (have87)
                then write(LCfile, '-O ',fp_87_rts)
                else write(LCfile, '-O ',fp_86_rts);
            append_rts_type;

{ now put out the main rts library }
            write(LCfile, '-O ',standard_rts);
            append_rts_type;

{ and the error rts lib }
            write(LCfile, '-O ',error_rts);
            append_rts_type;

if (operand = 'DEFAULT')
                then begin
                    write(LCfile, '-O ',posi_rts);
                    append_rts_type;
                    if not(svcs_used) then sourcerror(20,null)
                    end
            else if (operand = 'NONE') then begin
                    write(LCfile, '-O ',no_io_rts);
                    append_rts_type
                    end
            else writeln(LCfile, '-O ',litoperand);
            getoperand;
            if gotoperand then sourcerror(7,null);

{ include the convenience procedures library }
            write(LCfile, '-O ',conv_rts);
            append_rts_type
        end; { file_support }
{
**************************************************************************
                        proc_util.text
**************************************************************************
this file actually processes the ICS source file. All the decls for
the file processing part are located here. Also a bunch of utilities
for the file processing part are here too.
} segment procedure processfile;
        { this segment does the actual handling of the ICS source
        file. The output is a linker command file and an assembly
        source file. Included in this file are the global var
        declarations for the segment and a bunch of utilities. } const
        { here is the state table }
        { Every time we see a new directive we go into the state
          associated with that directive. In this way we can make
          sure we process the directives in the proper order. Some
          states may be repeated consecutivly but they all must
          appear at least one and in the proper order. EXCEPT in
          in the case when INTERRUPT_CONFIGURATION is declared to
          be NONE. In this case we skip from int_state to no_int_state,
          skipping all the states in between, at that point we proceed
          on to the restart_state. }

{ ****** some of the states listed below are marked 'null',
          these states are not being used for version 1 of the compiler
          they should appear in version 2. In that case restore these
          states back into the program and increment all states that
          appear after these states } start_state = 0;      pascal_state = 1;     hw_state = 2;
            instr_state = 3;      const_state = 4;      data_state = 5;
            heap_state = 6;       reset_state = 7;      svcs_state = 8;
            sw_state = 9;         mod_state = 10;       lib_state = 11;
            rts_state = null;     file_state =  12;
            int_state = 13;       types_state = 14;     save_state = 15;
            except_state = 16;    fault_state =17;      vector_state = 18;
            no_int_state = 19;    restart_state = 20;   end_state = 21;
```

```
{ these are the rts files }
{ some of this stuff will not be used in version one
  ie no large code or data, very little error checking }
standard_rts = '/lib/8086/pas.rts.';  { main rts lib, it contains
                                       set support, heap, etc. }
error_rts    = '/lib/8086/pas.err.';  { error handling routines }
hi_io_rts    = '/lib/8086/pas.hiio.'; { high level io routines }
posi_rts     = '/lib/8086/pas.posi.'; { posi routines }
fp_87_rts    = '/lib/8086/pas.fp87.'; { 8087 floating point routines }
fp_86_rts    = '/lib/8086/pas.fp86.'; { 8086 floating point routines }
conv_rts     = '/lib/8086/pas.conv.'; { convenience procedures }
no_io_rts    = '/lib/8086/pas.noio.'; { stubbed out io }
{ these are the standard extensions for the four sets of libraries }
scsd = 'scsd';  { SMALLCODE+,SMALLDATA+ }
scld = 'scld';  { SMALLCODE+,SMALLDATA- }
lcsd = 'lcsd';  { SMALLCODE-,SMALLDATA+ }
lcld = 'lcld';  { SMALLCODE-,SMALLDATA- } comment = true; { a flag used to designate a ICS source line
                  is to be commented out. If the line is
                  commented out ICS MC does not need the
                  information. If the line is not commented
                  out then ICS MC needs to see the information } num_type_len = 3; { length for number request type }
int_type_len = 6; { length for interrupt attribute }
num_str_len = 7;  { length of number strings, OddddH }
mem_ext_len = 4;  { length of memory extension }
mem_type_len = 7; { length of memory class strings }
maxlength = 126;  { maximum allowable length of a ICS source line }
                  { this number is chosen because the LAS assembler
                    has a maximum of 127. As we pass our source
                    lines to the assembler we must insert a blank
                    or a semicolon in front of it }
maxlenplus = 127; { size we make our buffers, if last char is
                    filled then we have a buffer overflow } one_meg = 1048576;
sixty_four_k = 65536;
int_high = 255; { the highest interrupt type }
hex_max = 1048575; { the highest hex number string we ever want }
dec_max = int_high; { the highest decimal number string we ever want } srbsize = 32; { size of the service request block } type
    num_type = string[num_type_len]; { requests for types of numbers;
                                       "HEX" or "DEC" }
    int_type = string[int_type_len]; { for describing interrupt type
                                       attributtes; "VECTOR" and "EXCEPT", etc. }
    num_str = string[num_str_len]; { contains a hex or dec number }
    mem_ext = string[mem_ext_len]; { ext's for mem types; ".ROM", ".RAM" }
    mem_type = string[mem_type_len]; { memory classes; "INSTRQQ", "DATAQQ",
                                       "CONSTQQ", HEAPQQ", "RESETQQ", "INTRQQ", "SRBVQQ" }
    maxstr = string[maxlenplus]; { buffers that hold all or part
                                   of input lines }
    addrpair = record { records used in link list for memory maps }
                 { each address pair declared in INSTR, CONST, DATA,
                   and HEAP is place in a linked list in accending
                   order. Also placed in the list is the space needed
                   for the RESET VECTOR, the SRB table and all of
                   the interrupts. A check is made to make sure that
                   no memory requirements overlap. }
              loaddr, hiaddr : longint; { lo and high of address pair }
              class : mem_type; { "INSTRQQ", "DATAQQ", etc. }
              next : ^addrpair
           end; { record }
```

```
    addrptr = ^addrpair;
    intrec = record { records used in link list for int types }
                    { each interrupt type declared in TYPES USED and
                      EXCEPT FOR is place in a linked list in accending
                      order. A check is made to make sure that no type
                      is declared more than once or given the EXCEPT
                      decl more than once }
                itype : integer; { interrupt type number }
                vector, except : boolean; { is it used in a EXCEPT FOR
                                           or a INT's USED stmt }
                next : ^intrec
             end; { record }
    intptr = ^intrec;

var
    have87 : boolean; { do we really have an 8087? }
    reset_memory : boolean; { do we supply the reset vector? }
    svcs_used : boolean; { do we use service calls at all? }

{ theses next vars are used to verify small code and data }
    instrlo, instrhi : longint; { very lowest and highest of INSTRQQ }
    datalo, datahi : longint; { very lowest and highest of DATAQQ, CONSTQQ
                               and HEAPQQ }
    smallcode, smalldata : boolean; { did the user specify smallcode
                                     and/or data. }
    addrroot : addrptr; { start of link list for address checking }
    introot : intptr; { start of link list for interrupt checking } pblock : packed record { contains groups of non blank characters
                             from the current source file line
                             terminated by a null }
                  nump : integer; { number of groups }
                  pchar : packed array [1..maxlenplus] of char
                          { groups of non-blank chars }
              end;
    cmdline : maxstr; { buffer for source lines }
    gotparam : boolean; { successful return from getnextparam }
    param : maxstr; { contains current argument from pblock }
    paramlength : integer; { length of current parameter }
    paramnum : integer; { the nth argument from pblock }
    pblockptr : integer; { points to start of argument in pblock }
    param_list : maxstr; { contains parameter list for current line }
    gotoperand : boolean; { did we get an operand out of param_list }
    litoperand : maxstr; { buffer to hold operand taken from param_list }
    operand : maxstr; { uppercase version of litoperand }
    gotpair : boolean; { did we get a pair of numbers from getpair }
    hexdigit, decdigit : set of char; { sets of valid digits }
    state : integer; { current state of state machine } procedure processline; forward;
procedure getnextparam; forward;

procedure print(literal:userstr);
    { does a write of a string to standard error and
      the output list file. Primarily used by sourcerror. }
    begin { print }
        write(errorfile,literal);
        if (liston or objecton) then write(MCfile,literal)
    end; { print }
```

```
procedure printnum(number:integer);
   { does a write of a number to standard error and
     the output list file. Primarily used by sourcerror. }
   begin { printnum }
      write(errorfile,number);
      if (liston or objecton) then write(MCfile,number)
   end; { printnum } procedure println(literal:userstr);
   { does a writeln of a string to standard error and
     the output file. Primarily used by sourcerror. }
   begin { println }
      writeln(errorfile,literal);
      if (liston or objecton) then writeln(MCfile,literal)
   end; { println } procedure printtype(int_level:integer);
   { prints a commonly used message and specified number to
     standard error and the output linker command file.
     Primarily used by sourcerror. }
   begin { printtype }
      print(' Interrupt type ');
      printnum(int_level)
   end; { printnum } procedure sourcerror(errnum,int_level:integer);
   { a general error and/or warning reporting routine to insert
     error messages in the assembly source file and send them to
     standard error. If error number is equal to one then it is
     a warning. If the error number is equal to two then the error
     was caught in the procedure processfile. All other errors
     are caught in procedures subordinate to or in processline.
     These procedures must be aborted when the error is found
     and return control back to processfile. When an error is found
     the error flag is set and the error counter is incremented.
     Some errors need to report an extra piece of information,
     namely an interrupt type (or level). All other errors ignore
     this number. } procedure error_prologue;
      { This is the first thing we do when sourcerror is called.
        The only reason this is in a seperate procedure is
        because if we left it in sourcerror the procedure would
        be too big to compile. And that's a fact jack! }
      begin { error_prologue }
         writeln(errorfile,cmdline);
         if (errnum = 1)
            then begin
               { only a warning }
               { comment out the warning message in the asm file }
               if (liston or objecton) then write(MCfile,'; ');
               print('*** ICS WARNING:  ')
            end
         else begin
               error := true;
               errorcount := errorcount + 1;
               print('*** ICS ERROR:  ')
            end;
         printnum(errnum);
      end; { error_prologue }
```

```
procedure case_one;
   { The only reason this is in a seperate procedure is
     because if we left it in sourcerror the procedure would
     be too big to compile. And that's a fact jack! }
   begin { case_one }
      case errnum of
      { ***** NUMBER 1 IS ONLY A WARNING ***** }
         1 : println(' Line exceeds maximum length');
      { ***** THE REST OF THESE ARE ERRORS ***** }
         2 : println(' Incomplete ICS program');
      { ***** THE REST OF THESE EXIT FROM PROCESSLINE ***** }
         3 : println(' Unrecognized directive');
         4 : println(' Directive out of sequence');
         5 : println(' Too many operand groups');
         6 : println(' Expected operand but none found');
         7 : println(' Found operand where not expected');
         8 : println(' Invalid number');
         9 : println(' Number out of range');
        10 : println(' Number pair expected');
        11 : println(' Invalid number pair');
        12 : println(' Hex number expected');
        13 : println(' Bad syntax');
        14 : println(' Operand not of correct type');
        15 : { not used } ;
        16 : println(' Memory overlap');
        17 : println(' Number on bad boundry');
        18 : println(' Instruction declarations exceed 64K');
        19 : println(' Data delarations exceed 64K');
        20 : println(' No Service Calls for File Support');
        21 : { not used } ;
        22 : { not used } ;
      end { case }
   end; { case_one } procedure case_two;
   { The only reason this is in a seperate procedure is
     because if we left it in sourcerror the procedure would
     be too big to compile. And that's a fact jack! }
   begin { case_two }
      case errnum of
        23 : begin
                printtype(int_level);
                print(' is declared in the EXCEPT_FOR directive(s)');
                println(' but not in the VECTOR directive(s)')
             end;
        24 : println(' Decimal number expected');
        25 : begin
                printtype(int_level);
                println(' is declared twice in the VECTOR directive(s)'
             end;
        26 : println(' VECTOR directive has mixed interrupt type usage'
        27 : begin
                printtype(int_level);
                println(' is declared twice in the EXCEPT_FOR directive
             end;
        28 : begin
                printtype(int_level);
                print(' is delcared twice in the INTERRUPT_TYPES_USED')
                println(' directive(s)')
             end;
        29 : begin
                printtype(int_level);
                print(' is not declared in the INTERRUPT_TYPES_USED');
                println(' directive(s)')
             end
      end; { case }
   end; { case_two }
```

```
begin { sourcerror }
    errorprologue;
    case_one;
    case_two;
    if (errnum > 2) then exit(processline)
end; { sourcerror } function int(digitstr:num_str):longint;
    { just a handy dandy function to convert a number string
      into a longint. The number string can be hex or decimal.
      If its hex it must start with a decimal digit and end
      with an 'H'. In either case the string should not be
      over num_str_len characters long. If decimal number
      exceed the dec_max ( the highest interrupt)
      or if hex numbers exceed hex_max then an error will
      be flagged. }
    var
        index: integer; { pointer into number string }
        base : integer; { base of number we are lookin at }
        strlength : integer; { length of number string }
        temp : longint; { intermediate value for number }
        validigit : set of char; { set of valid digits for current base } function value(ch:char):integer;
        { convert a hex or dec digit to a integer }
        var
            temp : integer; { intermediate value for number }
        begin { value }
            temp := ord(ch) - ord('0');
            if (temp > 9) then temp := temp - (ord('A') - ord('9')) + 1;
            value := temp
        end; { value } begin { int }
        strlength := length(digitstr);
        if (strlength = 0) then sourcerror(8,null);
        if (digitstr[strlength] <> 'H')
            then begin
                base := 10;
                validigit := decdigit
                end
            else begin
                base := 16;
                validigit := hexdigit;
                strlength := strlength - 1
                end;
        if (strlength = 0) then sourcerror(8,null);
        if (digitstr[1] in decdigit)
            then temp := value(digitstr[1])
            else sourcerror(8,null);
        for index := 2 to strlength do
            if (digitstr[index] in validigit)
                then temp := (temp * base) + value(digitstr[index])
                else sourcerror(8,null);
        if (base = 10) and (temp > dec_max) then sourcerror(9,null);
        if (base = 16) and (temp > hex_max) then sourcerror(9,null);
        int := temp
    end; { int }
```

```
procedure convert_to_hex(number:longint;var number_string:num_str);
   { just a handy dandy routine to convert a number back into
     number string. The number string will be in hex with a
     leading "0". The number we get better be below 1MEG or
     were in a bunch of trouble. }
   var
      len : integer;  { current length of number_string } procedure convert(number:longint);
      { does all the work for convert_to_hex }
      var
         ch : char;
      begin { convert }
         if (number > 15)
            then begin
                 convert(number div 16);
                 convert(number mod 16)
                 end
            else begin
                 if (number > 9)
                    then ch := chr(number+55)
                    else ch := chr(number+48);
                 number_string := concat(number_string,' ');
                 len := len + 1;
                 number_string[len] := ch
                 end
      end; { convert } begin { convert_to_hex }
      number_string := '0';
      len := 1;
      convert(number);
      number_string := concat(number_string,'H')
   end; { convert_to_hex }
procedure uppercase(var instring : maxstr);
   { This routine converts instring to all uppercase }
   var
      index : integer;
   begin { uppercase }
      for index := 1 to length(instring) do
         if (ord(instring[index]) >= ord('a')) and
            (ord(instring[index]) <= ord('z'))
            then instring[index] := chr(ord(instring[index]) +
                                       (ord('A') - ord('a')))
   end; { uppercase } procedure getoperand;
   { We assume that param_list has something in it to grab.
     This routine grabs the first operand out of param_list and. The
     operand is removed from param_list and placed in litoperand.
     An uppercase only version of litoperand is placed in operand.
     This uppercase version is used for checking keywords.
     Operands are seperated by commas, except for number pairs
     which are enclosed in brackets and have a comma embedded in them.
     Only one level of brackets is allowed. Once we grab the operand
     we check too see if there is any thing left in param_list. If there
     is then it must meet two criteria, 1) the first char must be a
     comma and 2) it must not be the only char. }
   var
      endpos : integer; { points to the end of the operand in param_list
   begin { getoperand }
      {$R- }
      gotoperand := false;
```

```
        if (length(param_list) <> 0) then begin
            if (param_list[1] = '[')
                then begin
                    endpos := pos(']',param_list);
                    if (endpos = 0) then sourcerror(11,null)
                    end
                else begin
                    endpos := pos(',',param_list) -1;
                    if (endpos = -1) then endpos := length(param_list)
                    end;
            litoperand := copy(param_list,1,endpos);
            delete(param_list,1,endpos);

{ now check what is left }
            if (length(param_list) <> 0) then begin
                if (param_list[1] <> ',') then sourcerror(13,null);
                if (length(param_list) = 1) then sourcerror(13,null);
                delete(param_list,1,1)
                end; { if }
            operand := litoperand;
            uppercase(operand);

gotoperand := true;
            paramlength := length(param_list)
            end { if }
        {$R+ }
    end; { getoperand } procedure check_line(state1,state2,newstate:integer;comment:boolean);
    { a generalized procedure that handles common functions in processing
      all directives in the source file. State1 and State2 are the 2
      possible states we should have come from. These states might be the
      same.  Newstate is the state
      we are in now. If comment is true we comment out the line in the
      asm source. We also put the first (and hopefully only parameter
      group into param_list. If we are processing the END directive
      (state = end_state) then there should not be any parameters.
      If we are processing pascal_state we do not check the parameters
      at all. }
    var
        oldstate : integer; { the state we were in when we got here }
    begin { check_line }
        oldstate := state;
        state := newstate;
        if (liston or objecton) then
            if comment
                then writeln(MCfile,';',cmdline)
                else writeln(MCfile,' ',cmdline);
        if (oldstate <> state1) and (oldstate <> state2)
            then sourcerror(4,null);
        if (newstate <> pascal_state) then begin
            if (newstate <> end_state) then begin
                getnextparam;
                if not(gotparam)
                    then sourcerror(6,null)
                    else if (param[1] = ';')
                            then sourcerror(6,null)
                            else param_list := param
                end; { if }
            getnextparam;
            { if we get anything now it should be a comment field }
            if gotparam
                then if (param[1] <> ';')
                        then sourcerror(5,null);
            paramlength := length(param_list)
            end { if }
    end; { check_line } procedure getpair(var lonum, hinum : longint; base:num_type);
```

```
{ this routine assumes that operand has a number pair in operand.
  Then it takes the operand and splits it up into
  2 numbers. The pair should start with '[' and have a comma
  between the numbers and a ']' at the end. Each number should
  be atmost num_str_len characters long. }
var
    commapos : integer; { where is the comma }
    lostr, histr : num_str; { the lo and hi number strings }
begin { getpair }
    gotpair := false;
    if gotoperand then begin
        if (operand[1] <> '[') then sourcerror(10,null);

{ get rid of brackets }
        delete(operand,length(operand),1);
        delete(operand,1,1);

{ we better find a comma }
        commapos := pos(',',operand);
        if (commapos = 0) then sourcerror(11,null);

{ the first number must be of reasonable size }
        if ((commapos > (num_str_len + 1)) or (commapos < 2))
            then sourcerror(8,null);
        lostr := copy(operand,1,commapos-1);
        delete(operand,1,commapos);

{ we must make sure there are no other commas }
        commapos := pos(',',operand);
        if (commapos <> 0) then sourcerror(11,null);

{ the second number must be of reasonable size }
        if (length(operand) > num_str_len) or (length(operand) = 0)
            then sourcerror(8,null);
        histr := operand;

{ if they should be hex numbers ... }
        if (base = 'HEX') then begin
            { they should end with "H" }
            if (lostr[length(lostr)] <> 'H') or
               (histr[length(histr)] <> 'H')
               then sourcerror(12,null);
            { they should be more than 1 char long }
            if (length(lostr) = 1) or (length(histr) = 1)
               then sourcerror(8,null)
            end; { if }

{ now turn them into long integers }
        lonum := int(lostr);
        hinum := int(histr);
        { now make sure the first number is less than the second }
        if (lonum >= hinum) then sourcerror(11,null);

gotpair := true
        end { if }
    end; { getpair }
procedure insertaddrpair(loaddr,hiaddr:longint; memname:mem_type);
    { this routine takes the current loaddr, hiaddr pair of class memname
      and inserts then into the link list of address pairs.
      the list is ordered from low to hi. As the pairs are inserted
      checks are made to see that no address pairs overlap. }
    var
        inserted : boolean; { did we insert the current pair yet? }
        tempptr : addrptr; { the pointer we run along the link list } procedure getnew(var newptr:addrptr);
        { this routine creates the new record, fills its fields
          and puts it in the list between the record that contains
          newptr and the record newptr points to }
```

```
              var
                  tempptr : addrptr; { temp var to set up links }
              begin { getnew }
                  inserted := true;
                  tempptr := newptr;
                  new(newptr);
                  newptr^.loaddr := loaddr;
                  newptr^.hiaddr := hiaddr;
                  newptr^.class := memname;
                  newptr^.next := tempptr
              end; { getnew } begin { inseraddrtpair }
           inserted := false;

{ start searching link list at root }
           tempptr := addrroot;
           while not(inserted) do
               if (tempptr^.next = nil)
                  then getnew(tempptr^.next)
                  else if (hiaddr < tempptr^.next^.loaddr)
                       then getnew(tempptr^.next)
                       else tempptr := tempptr^.next;

{ did the record we just placed overlap on to the next record? }
           if ( (tempptr <> addrroot) and
                (tempptr^.hiaddr >= tempptr^.next^.loaddr) )
             then sourcerror(16,null)
       end; { insertaddrpair }
   procedure pascal_config;
       { handles everything to do with the PASCAL CONFIGURATION directive.
         The parameter will be the module name for the asm file created,
         the module name is not checked for proper asm syntax }
       begin
           check_line(pascal_state-1,pascal_state-1,pascal_state,comment)
           { we dont check anything on this line, but it must be there }
         end;
         .title    ICS INVOKER
         .CSECT    ICS
         mov       (sp)+,r0           ;Remove the number of args from the stack
         mov       #arg0,(sp)         ;Set pointer to new arg 0
         mov       #fname,-(sp)       ;Name the processor to call
         mov       sp,argblk          ;Set pointer for arg block
         trap      0
         .word     exec
         mov       #2,r0              ;Write to standard error
         trap      0
         .word     write
         mov       #1,r0              ;Trust no one
         trap      1                  ;good bye
exec:    trap      11.                ;exec call
         .word     fname
argblk:  .word fname:   .ascii    \/bin/8086/pas.sys\<0>
arg0:    .ascii    \/lib/8086/ics.lc\<0>
         .even write:   trap      4
         .word     msgbeg
         .word     msgend-msgbeg
msgbeg:  .ascii    *ics: cannot execute /bin/8086/pas.sys*<12><15>
msgend:
         .ascii    *@(#)/bin/8086/ics V01.00-00    (8560)"*
         .ascii    *@(#)Built: 5-7-82"*
         .ascii    *@(#)Copyright (C) 1982 Tektronix, Inc. "*
         .end
```

```
            .title    ICSP INVOKER
            .CSECT    ICSP
            mov       (sp)+,r0        ;Remove the number of args from the stack
            mov       #arg0,(sp)      ;Set pointer to new arg 0
            mov       #fname,-(sp)    ;Name the processor to call
            mov       sp,argblk       ;Set pointer for arg block
            trap      0
            .word     exec
            mov       #2,r0           ;Write to standard error
            trap      0
            .word     write
            mov       #1,r0           ;Trust no one
            trap      1               ;good bye exec:       trap      11.             ;exec call
            .word     fname
argblk:     .word fname:      .ascii    \/bin/8086/pas.sys\<0>
arg0:       .ascii    \/lib/8086/icsp.driver\<0>
            .even write:      trap      4
            .word     msgbeg
            .word     msgend-msgbeg
msgbeg:     .ascii    *icsp: cannot execute /bin/8086/pas.sys*<12><15>
msgend:
            .ascii    *@(#)/bin/8086/icsp V01.00-00   (8560)"*
            .ascii    *@(#)Built: 5-7-82"*
            .ascii    *@(#)Copyright (C) 1982 Tektronix, Inc."*
            .end
```

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
                        ics.ps
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

These are the files of the ICS LC 8560 system. Its five second mission
is to seek out strange new ICS source files and pattern an LAS
Linker command file and an LAS 8086 Assembly language source file
after its image. If all goes well in this process, ICS (as its
last dieing act) will feed the LAS 8086 Assembly language source file
to the LAS 8086 Assembler (along with a macro file (ICS MC) which
contains all sorts of goddies) and out should come an object module
which will later be linked in with all sorts of stuff to create a
runable PASCAL program.

There are two major sections to the following files, they are the driver
and the file processing. The files belonging to driver DO NOT begin with
"proc". The files belonging to the file processing DO begin with "proc".

THE DRIVER

The driver has five major functions.
1) Global declarations;
2) Gettin the time and date from the operating system;
3) Handling the invocation line;
4) File handling;
5) Calling the LAS 8086 Assembler;

1) Global declarations;
This section contains all the variable, type and constant declarations
used by the main (and possibly other sections) program. The variables
typically are External file names, Internal file names, General use
buffers and associated pointers and flags, and a couple of extra things
like error flags and counters.

2) Gettin the time and date from the operating system;
It sounds simple but its not. UNIX does not quite make life easy in
this area so a fair amount of code had to be written to acomplish this.

3) Handling the invocation line;
This includes handling all the options, setting up input and output
file names, making sure there are no duplicate file names, making
sure the source file exists, making sure there are no illegal file names
and making sure all output files can be written to.

4) File handling;
This goes hand and hand with Handling the invocation line. All files
are opened up and ready to be used by the file processing part. After the
file processing part is done control comes back to the file handling
which closes all the files.

5) Calling the LAS 8086 Assembler;
If everything went ok without any errors then the assembler is called.
If everything didn't go ok then we close up shop and go back to star
base command.

THE FILE PROCESSING

The file processing is examined in one pass. It has four major functions.
1) Check individual source lines for validity.
2) Cross check lines for consistancy.
3) Create Linker Command File.
4) Create Assembly source file.

1) Check individual source lines for validity.
Each line is checked for syntax and reasonableness. Each line will
generate one assembly source line (possibly commented out) and zero
or more Linker command file lines.

2) Cross check lines for consistancy.
As each source line is processed it is cross checked with all of
the preceeding lines. If any inconsistancy is found an error is
reported.

3) Create Linker Command File.
As each line is processed the Linker command file is appended as needed.

4) Create Assembly source file.
Each line of the ICS source file becomes a line in the assembly
source file. As each ICS source line is copied in to the assembly
source file, either a blank (" ") or a semicolon (";") is placed
at the beginning of the line. If the information is not needed for
ICS MC, the line is commented out (preceed by a ";"). If the
information is needed for ICS MC, the line is copied as is except
the directive name is moved out of the label field (preceed by a " ").

AND HERE ARE THE FILES
}

{$I decl.text}
{ This file has all of the global
declarations for const, var and type. It also has a couple of
forwarded procedures. }

{$I getime.text}
{ This file is the code that gets the date and time from the OS
and translates it in to ENGLISH }

{$I init.text}
{ This file does all of the one time initialization. This includes
handling the invocation line (as stated above) and some of the file
handling }

{$I proc_util.text}
{ This file has most of the general utilities used by the various
portions of the FILE PROCESSING part of ICS. Also located in this
file are some var declarations that are used throughtout the FILE
PROCESSING part. Also included is the logic for the source line
PASCAL_CONFIGURATION. }

```
{$I proc_hw.text}
{ This file has the logic to process all the source lines in the
H/W section of the ICS source file. That is from HARDWARE_COFIGURATION
thru and including SERVICE_CALLS }

{$I proc_sw.text}
{ This file has the logic to process all the source lines in the
S/W section of the ICS source file. That is from SOFTWARE_CONFIGURATION
thru and including FILE_SUPPORT. }

{$I proc_int.text}
{ This file has the logic to process all the source lines in the
Interrupt section of the ICS source file. That is from
INTERRUPT_CONFIGURATION thru and including END. The last two statements
int the ICS source file RESTART_LABEL and END are not really part
of.interrupts but what the hey, I stuck them here anyway. }

{$I proc_main.text}
{ This file has the main looping logic to step thru the ICS source file.
It also has some initialization and one utility for the FILE PROCESSING
part. }

{$I ics_main.text}
{ This file has the main program for the whole ics system. It has a couple
of general utilities and the logic to close up the files and call the
assembler }

{$I listoption}
program ics_mp;
{ Copyright (C) 1982 Tektronix, Inc. }
{ This program is invoked by ICS (ics.lc) to generate the assembly
  language source code that corresponds to the directives in the
  ICS source file.  After creating the asm source file, ics.mp
  returns to ics.lc, which invokes the assembler.  The asm source
  file contains some macro invocations.  These macros are defined
  in ics.mc. }

{ First build to evaluation 4/7/82
  Modified to allow for lowercase directives and parameters 4/8/82 }

{ PROCEDURE HIERARCHY:
main program
  internalerror
  initialize
  get_cmd_parameters
    get_param
  generate_code
    initfiles
    splitline
    do_directive
      getoperand, split, capitalize
      resume, global
      hardware_configuration
      reset_memory
      interrupt_configuration
      intrpt_types_used
      save_floating_point
      except_for
      fault_notification
      vector
      restart_label
    finishfiles
} type
  pathname = string;

var
  icsfile,asmfile : pathname;
  ics,asm : text;
  error : boolean;
  nlines : integer;   {for diagnostic purposes}
```

```
procedure internalerror(message:string);
{ Displays the specified error message and aborts the program. }
begin
  writeln;
  writeln('*** ICS internal error at line ',nlines:1,': ',message);
  writeln('Please report this error to your Tektronix service rep.');
  error:=true;
  unitread(0,error,0,0,6);
end {internalerror};

procedure initialize;
begin
  nlines:=0;
end {initialize};

procedure get_cmd_parameters;
{ Picks the parameters out of the command line that invoked this program. }
const pblockreq = 5;
var
  tossme : pathname;
  pblockptr : integer;
  pblock : packed record
      nump : integer;
      pchar : packed array [1..256] of char;
    end;

procedure get_param (var parameter:pathname);
  { Picks a parameter out of the command line. }
  var ch : string[1];
  begin
    ch:='X';
    parameter:='';
    while pblock.pchar[pblockptr]<>chr(0) do
      begin {Add the character to the parameter.}
        ch[1]:=pblock.pchar[pblockptr];
        parameter:=concat(parameter,ch);
        pblockptr:=pblockptr+1;
      end;
    { Skip past the NUL to the next parameter. }
    pblockptr:=pblockptr+1;
  end {get_param};

begin {get_cmd_parameters}
  {$R- }
  unitread(0,pblock,0,0,pblockreq);
  {$R+ }
  pblockptr:=1;
  get_param(tossme); {Skip the interpreter name.}
  get_param(tossme); {Skip the pcode file name.}
  get_param(icsfile); {Get the ICS source filename.}
  get_param(asmfile); {Get the name of the asm source file.}
end {get_cmd_parameters};

{$I codegen.text} begin {main program}
  initialize;
  get_cmd_parameters;
  generate_code;
  error:=false;
  unitread(0,error,0,0,6);
end {program}.

procedure generate_code;
{ The guts of the program.  Reads through the ICS source file
and generates the asm language source file. }
const
  comment_prefix = ';';
  maxlinelength = 126;
  maxsymlength = 16;
```

```
type
  longstring = string[maxlinelength];
  dirstring = string[30];
  shortsym = string[maxsymlength];
  intrpt_index = 0..255;
  intrpt_set = set of intrpt_index;
  globindex = 0..300;
  int_con_type = (ram,rom,none);
  fault_type = (jump_to_user,call_user,stop,pas_rts);
var
  line,params,operand : longstring;
  directive : dirstring;
  section : shortsym;  {current asm section}
  comment : boolean;
  gotoperand : boolean;
  tab : char;  {tab character}
  globlist : array[globindex] of shortsym;  {currently defined globals}
  nglobal : globindex;
  have_87,have_reset_memory,save_fp : boolean;
  sav_86_needed,sav_87_needed : boolean;
  fault_handling : fault_type;
  fault_routine : longstring;
  used_set,except_set,vector_set : intrpt_set;
  int_config : int_con_type;

procedure initfiles;

begin
    rewrite(asm,asmfile);
    reset(ics,icsfile);
  end {initfiles};

procedure capitalize(var name:string);
var
  i,n : integer;
begin
  n:=length(name);
  if n>0 then for i:=1 to n do
    if name[i] in ['a'..'z'] then name[i]:=chr(ord(name[i])-32);
end {capitalize};

procedure splitline (var comment : boolean;
                       var directive : dirstring;
                       var params : longstring);
  { Splits the input line into a directive name and parameter field.
    If the line is a comment, the directive and params are undefined. }
  var blankpos : integer;
  begin {splitline}
    { Delete leading blanks. }
    while pos(' ',line)=1 do delete(line,1,1);
    if (line='') or (pos(';',line)=1)
      then comment:=true
      else
        begin
          comment:=false;
          blankpos:=pos(' ',line);
          if blankpos=0
            then { just a directive name }
              begin
                directive:=line;
                params:='';
              end
            else { There's a parameter field, too.}
              begin
                directive:=copy(line,1,blankpos-1);
                delete(line,1,blankpos);
                { Delete intervening blanks. }
                while pos(' ',line)=1 do delete(line,1,1);
                blankpos:=pos(' ',line);
                if blankpos=0
                  then params:=line
                  else params:=copy(line,1,blankpos-1);
              end; { directive + params }
```

```
            capitalize(directive);
        end; { not a comment }
  end {splitline};

{*** Macro replacement routines start here. ***}
{ These routines handle all the necessary ICS directives.  The logic
  for these routines was formerly implemented in the macro library
  using conditional assembly techniques. } procedure getoperand;
{ Picks a parameter out of the params string.}
var endpos : integer;
begin
  if params=''
    then
      begin
        gotoperand:=false;
        operand:='';
      end
    else
      begin
        gotoperand:=true;
        if params[1]='['
          then { Special case -- parameter contains a comma.}
            endpos:=pos(']',params)
          else
            begin
              endpos:=pos(',',params)-1;
              if endpos=-1 then endpos:=length(params);
            end;
        if endpos=0 then internalerror
            (concat('Ill-formed parameter:  ',params));
        operand:=copy(params,1,endpos);
        capitalize(operand);
        { Delete parameter and comma.}
        delete(params,1,endpos);
        if length(params)>0 then delete(params,1,1);
      end;
end {getoperand};

procedure split(numrange:longstring; var ilo,ihi:integer);
{ numrange is a string that contains a number or range of numbers.
  Split returns the low number in ilo and the high number in ihi.}
var
  commapos : integer;

function decimalnum(strng:string) : integer;
  { converts the specified string to a decimal number. }
  var
    i,num,ndigits : integer;
    badnumber : boolean;
  begin
    { Delete leading zeros.}
    while (pos('0',strng)=1) and (length(strng)>1) do delete(strng,1,1);
    ndigits:=length(strng);
    badnumber:=(ndigits<1) or (ndigits>3);
    num:=0;
    if not badnumber then
      for i:=1 to ndigits do
        if strng[i] in ['0'..'9']
          then num:=num*10 + ord(strng[i])-ord('0')
          else badnumber:=true;
    badnumber:=num>255;
    if badnumber
      then internalerror(concat('Bad number syntax:  ',strng))
      else decimalnum:=num
  end {decimalnum};

begin {split}
  if pos('[',numrange)=1
    then {We have a range.}
      begin
        { Delete brackets.}
```

```
            delete(numrange,1,1);
            delete(numrange,length(numrange),1);
            commapos:=pos(',',numrange);
            if (commapos<2) or (commapos=length(numrange))
               then internalerror(concat('Bad range syntax: ',numrange))
               else
                  begin
                     ilo:=decimalnum(copy(numrange,1,commapos-1));
                     delete(numrange,1,commapos);
                     ihi:=decimalnum(numrange);
                  end
         end {range}
      else {Just one number.}
         begin
            ilo:=decimalnum(numrange);
            ihi:=ilo;
         end;
end {split};

procedure init_flags;
{ Initializes all values that may be used later in the program.
  Some of these values should be defined when certain directives are
  processed.  However, this initialization should prevent the program
  from crashing on a bad ICS source file. }
begin
   tab:=chr(9);
   section:='ICS.INSTR';
   nglobal:=0;
   have_87:=false;
   have_reset_memory:=false;
   save_fp:=false;
   sav_86_needed:=false;
   sav_87_needed:=false;
   fault_handling:=stop;
   fault_routine:='';
   used_set:=[];
   except_set:=[];
   vector_set:=[];
end {init_flags};

procedure resume(newsection:longstring);
{ Creates a RESUME directive to switch to the specified section,
  if necessary. }
begin
   if section<>newsection then
      begin
         section:=newsection;
         writeln(asm,tab,'RESUME ',section);
      end;
end {resume};

procedure global(symbol:longstring);
{ Declares the symbol global if it isn't already. }
var
   g : globindex;
   sym : shortsym; { the symbol, truncated to 16 char. }
begin
   { Search globlist for symbol. }
   if length(symbol)<=maxsymlength
      then sym:=symbol
      else sym:=copy(symbol,1,maxsymlength);
   { Store what we're looking for at end of list in case it isn't
     there already. }
   globlist[nglobal+1]:=sym;
   g:=1;
   while sym<>globlist[g] do g:=g+1;
   if g>nglobal then
      begin
         nglobal:=nglobal+1; { Add symbol to list. }
         writeln(asm,tab,'GLOBAL ',symbol);
      end;
end {global};
```

```
procedure call_interrupt(routine, int_type: longstring; in_line: boolean);
{ Generates a call to the specified routine and the register save and
  restore routines that surround it.
  in_line is true if registers are to be saved in-line.
  int_type is used to determine whether or not to save floating point
  registers.  If int_type is 'FAULT', they're not saved.  Otherwise
  int_type is assumed to be the ASCII representation of an interrupt
  type or range of types.  The (first) type is compared against the
  SAVE_FLOATING_POINT and EXCEPT_FOR directives to determine whether
  fp registers are saved.
  int_type = 'FAULT' also means the 'VECTOR$ SET $' can be omitted. }
var
  ilo,ihi : intrpt_index;
  saveflpt : boolean;
begin
  if int_type='FAULT'
    then saveflpt:=false
    else
      begin
        split(int_type,ilo,ihi);
        saveflpt:=(save_fp <> (ilo in except_set));
      end;
  { Generate the code.  Start by switching to ICS.INSTR and marking
    the spot for later use in the interrupt vector(s). }
  resume('ICS.INSTR');
  if int_type<>'FAULT' then writeln(asm, 'VECTOR$', tab, 'SET $');
  if in_line
    then
      begin
        writeln(asm, tab, 'SAV_86_INLINE$');
        if saveflpt
          then
            begin
              if have_87
                then writeln(asm, tab, 'SAV_87_INLINE$')
                else writeln(asm, tab, 'SAVEFPSW$');
              writeln(asm, tab, 'CALL ', routine);
              if have_87
                then writeln(asm, tab, 'RES_87_INLINE$')
                else writeln(asm, tab, 'RESTOREFPSW$');
            end { saving fp registers }
          else writeln(asm, tab, 'CALL ', routine);
        writeln(asm, tab, 'RES_86_INLINE$');
      end
    else { not in-line }
      begin
        sav_86_needed:=true;
        writeln(asm, tab, 'CALL SAV.86$');
        if saveflpt
          then
            begin
              if have_87
                then
                  begin
                    sav_87_needed:=true;
                    writeln(asm, tab, 'CALL SAV.87$');
                  end
                else writeln(asm, tab, 'SAVEFPSW$');
              writeln(asm, tab, 'CALL ', routine);
              if have_87
                then writeln(asm, tab, 'CALL RES.87$')
                else writeln(asm, tab, 'RESTOREFPSW$');
            end { saving fp registers }
          else writeln(asm, tab, 'CALL ', routine);
        writeln(asm, tab, 'CALL RES.86$');
      end;
  writeln(asm, tab, 'IRET');
  resume('ICS.VROM');
end {call_interrupt};

procedure hardware_configuration;
begin
  getoperand;
  have_87:=(operand='8086-8087') or (operand='8088-8087');
end;
```

```
procedure reset_memory;
begin
  getoperand;
  have_reset_mem:=(operand='YES');
end;

procedure interrupt_configuration;
begin
  getoperand;
  if operand='ROM' then
    begin
      int_config:=rom;
      writeln(asm,tab,'SECTION ICS.VROM,ABSOLUTE');
      section:='ICS.VROM';
    end
  else if operand='RAM' then
    begin
      int_config:=ram;
      writeln(asm,tab,'SECTION ICS.VRAM,ABSOLUTE');
      writeln(asm,tab,'SECTION ICS.VROM,CLASS=CONSTQQ');
      section:='ICS.VROM';
    end
  else int_config:=none;
end {interrupt_configuration};

procedure tally_list(var tally_set:intrpt_set);
{ Adds all the interrupt types listed in the parameter field into
  the set tally_set. }
var i,ilo,ihi : intrpt_index;
begin
  getoperand;
  if operand<>'NONE' then
    repeat
      split(operand,ilo,ihi);
      for i:=ilo to ihi do tally_set:=tally_set+[i];
      getoperand;
    until not gotoperand;
end {tally_list};

procedure intrpt_types_used;
begin
  tally_list(used_set);
end;

procedure save_floating_point;
begin
  getoperand;
  save_fp:=(operand='YES');
end;

procedure except_for;
begin
  tally_list(except_set);
end;

procedure fault_notification;
begin
  getoperand;
  if operand='STOP' then fault_handling:=stop
  else if operand='PASCAL_RTS' then fault_handling:=pas_rts
  else
    begin
      fault_routine:=operand;
      getoperand;
      if gotoperand
        then fault_handling:=jump_to_user
        else fault_handling:=call_user;
    end;
end {fault_notification};

procedure do_vector(vector_address:longstring; i:intrpt_index);
{ Creates an interrupt vector to vector_address for interrupt type i. }
```

```
begin
    writeln(asm,tab,'WORD ',vector_address,'-CODEBASEQQ,',
      'BITS(CODEBASEQQ,4,16)  ; vector for interrupt type ',i:1);
end {do_vector};

procedure vector;
var
  routine,vector_address : longstring;
  i,ilo,ihi : intrpt_index;
begin
  getoperand;
  if operand<>'NONE' then
    begin
      routine:=operand;
      global(routine);
      { Set up register save and restore routines, if necessary }
      getoperand;
      if operand='OWN_CODE' then
        begin
          vector_address:=routine;
          getoperand;
        end
      else if operand='IN_LINE' then
        begin
          vector_address:='VECTOR$';
          getoperand;
          call_interrupt(routine,operand,true);
        end
      else { neither OWN_CODE nor IN_LINE }
        begin
          vector_address:='VECTOR$';
          call_interrupt(routine,operand,false);
        end;
      { Generate interrupt vectors. }
      repeat
        split(operand,ilo,ihi);
        { Set location for this range of vectors. }
        if int_config=rom then writeln(asm,tab,'ORG 4*',ilo:1);
        for i:=ilo to ihi do
          begin
            vector_set:=vector_set+[i];
            if int_config=ram { Store each vector location with the vector. }
              then writeln(asm,tab,'WORD 4*',i:1);
            do_vector(vector_address,i);
          end;
        getoperand;
      until not gotoperand;
    end {param<>NONE};
end {vector};

procedure restart_label;
{ This directive specifies the transfer address and marks the end of the
  interrupt handling directives.  This procedure ties up the loose ends
  of the interrupt handling code and generates the program initialization
  code. }
var
  transfer_address : longstring;

procedure clean_up_interrupts;
  { Called by restart_label to handle undefined interrupts and RAM vectors. } procedure check_undefined_types;
    var
      undef_set : intrpt_set;
      i : intrpt_index;
      fault_vector : longstring;
      orgword : string[4];

procedure make_fault;
      { Sets up the code for handling undefined interrupts. }
      begin
        if fault_handling=jump_to_user
          then
            begin
```

```
                global(fault_routine);
                fault_vector:=fault_routine;
              end
          else
            begin
              fault_vector:='FAULT$';
              resume('ICS.INSTR');
              writeln(asm,'FAULT$',tab,'EQU $');
              case fault_handling of
                call_user : begin
                              global(fault_routine);
                              call_interrupt(fault_routine,'FAULT',false);
                            end;
                stop      : begin
                              writeln(asm,tab,'HLT');
                              writeln(asm,tab,'JMP FAULT$');
                            end;
                pas_rts   : writeln(asm,tab,'REPORT_FAULT$')
              end {case}
            end {else}
      end {make_fault};

begin {check_undefined_types}
    undef_set:=used_set - vector_set;
    if undef_set<>[] then
      begin
        { Create the fault handling code. }
        writeln(asm,'; The following code handles interrupt types',
          ' that aren''t mentioned in VECTOR directives.');
        make_fault;
        { Create an interrupt vector for each undefined type. }
        resume('ICS.VROM');
        if int_config=rom
          then orgword:='ORG'
          else orgword:='WORD';
        for i:=0 to 255 do
          if i in undef_set then
            begin
              writeln(asm,tab,orgword,' 4*',i:1);
              do_vector(fault_vector,i);
            end;
      end {undefined types}
  end {check_undefined_types};

procedure reserve_ram;
{ Reserves space for the interrupt vectors in ICS.VRAM. }
var
  blockbase,i : intrpt_index;
  in_a_group : boolean;

procedure end_of_group(blockend:intrpt_index);
  { Takes care of the group that begins with blockbase
    and ends with blockend. }
  begin
    writeln(asm,tab,'ORG 4*',blockbase:1);
    write(asm,tab,'BLOCK ',4*(1+blockend-blockbase):1,tab,
          '; reserved for interrupt ');
      if blockend>blockbase
        then write(asm,'vectors ',blockbase:1,'-',blockend:1)
        else write(asm,'vector ',blockbase:1);
      writeln(asm);
      in_a_group:=false;
    end {end_of_group};

begin {reserve_ram}
    resume('ICS.VROM');
    writeln(asm,tab,'WORD 400H',tab,'; Mark end of vectors in ROM.');
    resume('ICS.VRAM');
    { Generate an ORG and BLOCK directive for each group of interrupt
      vectors. }
    in_a_group:=false;
    for i:=0 to 255 do
```

```
            if (not in_a_group) and (i in used_set) then
              begin
                blockbase:=i;
                in_a_group:=true;
              end
            else if in_a_group and (not (i in used_set)) then
              end_of_group(i-1);
         { If we need a vector for type 255, we're still in a group. }
         if in_a_group then end_of_group(255);
       end {reserve_ram};

begin {clean_up_interrupts}
      check_undefined_types;
      if int_config=ram then
        begin
          writeln(asm,'; Reserve RAM for the interrupt vectors. ');
          reserve_ram;
          resume('ICS.INSTR');
          writeln(asm,tab,'COPY_VECTORS$');
        end;
    end {clean_up_interrupts};

begin {restart_label}
    getoperand;
    transfer_address:=operand;
    if transfer_address<>'PASCAL_BEGIN' then global(transfer_address);
    if int_config<>none then clean_up_interrupts;
    resume('ICS.INSTR');
    if sav_86_needed then writeln(asm,tab,'SAVE_RESTORE_86$');
    if sav_87_needed then writeln(asm,tab,'SAVE_RESTORE_87$');
    writeln(asm,tab,'START_PROGRAM$');
    if int_config=ram then writeln(asm,tab,'CALL COPYVECTORS$',
      tab,'; Copy interrupt vectors from ROM to RAM');
    if have_87 then writeln(asm,tab,'INITIALIZE_87$');
    writeln(asm,tab,'JUMP_TO_PASCAL$');
    if have_reset_memory then writeln(asm,tab,'RESET_VECTOR$ ',
      transfer_address);
  end {restart_label};

{* end of macro replacement routines *} procedure do_directive;
  begin
    if directive='HARDWARE_CONFIGURATION' then hardware_configuration
    else if directive='RESET_MEMORY' then reset_memory
    else if directive='INTERRUPT_CONFIGURATION'
      then interrupt_configuration
    else if directive='INTERRUPT_TYPES_USED'
      then intrpt_types_used
    else if directive='SAVE_FLOATING_POINT'
      then save_floating_point
    else if directive='EXCEPT_FOR' then except_for
    else if directive='FAULT_NOTIFICATION' then fault_notification
    else if directive='VECTOR' then vector
    else if directive='RESTART_LABEL' then restart_label;
    { else do nothing }
  end {do_directive};

procedure finishfiles;
  begin
    close(ics);
    writeln(asm,tab,'END');
    close(asm,lock);
  end {finishfiles};

begin {generate_code}
  initfiles;
  init_flags;
  while not eof(ics) do
    begin
      readln(ics,line);
      writeln(asm,comment_prefix,line);
```

```
        splitline(comment,directive,params);
        if not comment then do_directive;
      end;
    finishfiles;
  end {generate_code};

ICS macro definitions for 8086: X02.00-00
Copyright (C) 1982 Tektronix, Inc.
        NAME    ICS.MODULE
        SECTION ICS.INSTR,CLASS=INSTRQQ
        GLOBAL  HEAPBASEQQ,STKBASEQQ
        GLOBAL  CODEBASEQQ,DATABASEQQ
        GLOBAL  PASCAL_BEGIN,MAINQQ
        GLOBAL  FPSWQQ
        ASSUME  DS:DATABASEQQ
        NOLIST
First version to use pre-processor program: 4/4/82
Updated REPORT_FAULT$ 4/6/82
        N$$W__  0

MACRO   SAV_86_INLINE$
        PUSH    AX
        PUSH    BP
        PUSH    BX
        PUSH    CX
        PUSH    DX
        PUSH    SI
        PUSH    DI
        PUSH    DS
        PUSH    ES
        MOV     BP,#0   ; Traceback stops at this interrupt.
        ENDM MACRO   RES_86_INLINE$
        POP     ES
        POP     DS
        POP     DI
        POP     SI
        POP     DX
        POP     CX
        POP     BX
        POP     BP
        POP     AX
        ENDM MACRO   SAVEFPSW$
        PUSH    FPSWQQ
        MOVW    FPSWQQ,#0      ; Clear FP status word for RTS routines.
        ENDM

MACRO   RESTOREFPSW$
        POP     FPSWQQ
        ENDM

MACRO   SAV_87_INLINE$
        SAVEFPSW$
        SUB     SP,#94
        MOV     BP,SP
        ESC     #2EH,[BP]      ; FNSAVE
        WAIT
        ENDM
        MACRO   RES_87_INLINE$
        MOV     BP,SP
        ESC     #2CH,[BP]      ; FRSTOR
        ADD     SP,#94
        RESTOREFPSW$
        ENDM

MACRO   REPORT_FAULT$
        MOV     BP,#0   ; Undefined interrupt. Cancel traceback.
        MOV     AX,#0   ; Call error routine to end program.
        PUSH    AX      ; Pass 'undefined interrupt' error code.
        MOV     AX,#11
        PUSH    AX
```

```
        GLOBAL  RUNERRQQ
        CALL    RUNERRQQ
        ENDM
;
        MACRO   COPY_VECTORS$
; This routine copies the interrupt vectors from ROM to RAM.
COPYVECTORS$ MOV AX,#0    ; ES+DI points to ICS.VRAM (0-3FF).
        MOV     ES,AX
        MOV     SI,#(ICS.VROM-DATABASEQQ)       ; DS+SI points to ICS.VROM.
NEXTCOPY$ MOV   AX,[SI]         ; Check next vector location.
        CMP     AX,#400H        ; Return if it's too high.
        JNC     COPYDONE$
        INC     SI
        INC     SI
        MOV     DI,AX
        MOV     CX,#2           ; Copy the 2-word vector to RAM.
        REP     MOVW
        JMP     NEXTCOPY$
COPYDONE$ RET
        ENDM
;
        MACRO   SAVE_RESTORE_86$
; SAV.86 saves the 8086 registers on the stack and RES.86 retrieves them.
; The Flags word, the CS, and the IR are saved and restored by normal
; interrupt processing; the SP and SS are also not saved.
SAV.86$ PUSH    BP
        MOV     BP,SP           ; Cram (AX) into the stack
        XCHG    AX,2[BP];       and save the return address in AX.
        PUSH    BX
        PUSH    CX
        PUSH    DX
        PUSH    SI
        PUSH    DI
        PUSH    DS
        PUSH    ES
        MOV     BP,#0           ; Traceback stops at this interrupt.
        PUSH    AX
        RET
RES.86$ POP     AX              ; Return address to AX.
        POP     ES
        POP     DS
        POP     DI
        POP     SI
        POP     DX
        POP     CX
        POP     BX
        MOV     BP,SP           ; Cram the return address into the stack
        XCHG    AX,2[BP];       and restore the saved contents of AX.
        POP     BP
        RET
        ENDM
;
        MACRO   SAVE_RESTORE_87$
; SAV.87 saves the 8087 context using an FNSAVE instruction (ESC 2EH).
; RES.87 restores the 8087 context using an FRSTOR instruction (ESC 2CH).
; Save area = top of stack.
SAV.87$ POP     AX              ; Return address to AX.
        SAVEFPSW$
        SUB     SP,#94          ; Make room on the stack.
        MOV     BP,SP
        ESC     #2EH,[BP]       ; FNSAVE
        WAIT
        PUSH    AX
        RET
RES.87$ POP     AX              ; Return address to AX.
        MOV     BP,SP
        ESC     #2CH,[BP]       ; FRSTOR
        ADD     SP,#94          ; Clear restored context from stack.
        RESTOREFPSW$
        PUSH    AX
        RET
        ENDM
;
```

```
        MACRO    START_PROGRAM$
; Code to be executed at RESET starts here.
; Initialize the stack pointer, heap pointers, and segment registers.
PASCAL_BEGIN EQU $
        MOV      AX,#BITS(DATABASEQQ,4,16)     ; Initialize segment registers.
        MOV      DS,AX
        MOV      SS,AX
        MOV      SP,#(STKBASEQQ-DATABASEQQ)    ; Initialize stack pointer.
        AND      SP,#0FFFEH      ; SP must be even.
        MOV      SI,#(HEAPBASEQQ-DATABASEQQ)   ; Initialize heap pointers.
        MOV      AX,SI
        ADD      AX,#4
        MOV      [SI],AX
        MOVW     2[SI],#0FFFFH
        ENDM
;
        MACRO    INITIALIZE_87$
; Initialize the 8087.
        ESC      #1CH,BX ; FINIT
        MOV      BP,SP   ; Load 03BF into control word...
        MOVW     -2[BP],#03BFH   ; using top of stack.
        ESC      #0DH,-2[BP]     ; FLDCW
        ENDM
;
        MACRO    JUMP_TO_PASCAL$
        MOVW     FPSWQQ,#0       ; Clear floating point status word.
; Set the ES register equal to DS and SS.
        MOV      AX,DS
        MOV      ES,AX
; Clear BP.
        MOV      BP,#0
; All done.  Start Pascal program.
; The JMPS instruction initializes the CS register.
        JMPS     MAINQQ,CODEBASEQQ    ;Jump to Pascal program.
        ENDM
;
        MACRO    RESET_VECTOR$
; Finally, generate the RESET vector.
        SECTION  ICS.RESET,ABSOLUTE
        ORG      0FFFF0H
        JMPS     "1",CODEBASEQQ  ;RESET vectors to this jump.
        ENDM
;
        .        LIST    ME
                 LIST
```

I Claim:

1. A method of integrating machine independent software written in a high level language with the hardware and software characteristics of a selected processor system to generate an executable load module in the same high level language with selected machine codes merged therewith to be run on the selected processor system, the method comprising the steps of:
   a. interactively preparing a source file containing software, hardware and interrupt configuration specifications of the selected processer system in response to inputs from a designer;
   b. processing the source file of step a. to generate a linker command file and a configuration object file; and
   c. linking the machine independent software with the configuration object file under the control of the linker command file created in step b. to generate the executable load module for the processor system.

2. A method as in claim 1 wherein step a. includes the steps of:
   d. prompting the designer to input processor system hardware and interrupt specifications; and
   e. generating a source file containing those specifications.

3. A method of claim 2 wherein said configuration object file of step b. includes interrupt vectors, interrupt service routines, a reset routine and a program initialization routine for the prototype processor.

4. A method as in claim 3 wherein said linker command file of step b. includes routines for linking together the machine independent software, the configuration object file and appropriate run-time support library routines for the high level language.

5. A method as in claim 4 wherein step c. also links selected routines from a run-time library for the high level language together with the software and the configuration object file.

6. An integration control system for integrating machine independent software written in a high level language with the hardware and software characteristics of a selected processor sysstem to generate an executable load module in the same high level language with selected machine codes merged therewith to be run on the selected processor system, the system comprising:
   first means for interactively preparing a source file containing software, hardware and interrupt configuration specifications of the selected processor system in response to inputs from a designer;
   second means for processing the source file from the first means to generate a linker command file and a configuration object file; and third means for linking the machine independent software with the configuration object file from the second means under the control of the linker command file from the second means to generate the executable load module for the processor system.

7. A system as in claim 6 wherein the first means includes:
fourth means for prompting the designer to input processor system software, hardware and interrupt specifications; and
fifth means responsive to the fourth means for generating a source file containing those specifications.

8. A system as in claim 7 wherein said configuration object file includes interrupt vectors, interrupt service routines, a reset routine and a program initialization routine for the prototype processor.

9. A system as in claim 8 wherein said linker command file includes routines for linking together the machine independent software, the configuration object file and appropriate run-time support library routines for the high level language.

10. A system as in claim 9 wherein the third means also links selected routines from a run-time library for the high level language together with the software and configuration object file.

* * * * *